(12) United States Patent
Niwa et al.

(10) Patent No.: US 12,450,465 B2
(45) Date of Patent: Oct. 21, 2025

(54) SCALABLE PARTIALLY SHARED MULTI-TASK NEURAL NETWORK SYSTEM, METHOD, AND PROGRAM

(71) Applicants: NIPPON TELEGRAPH AND TELEPHONE CORPORATION, Tokyo (JP); VICTORIA UNIVERSITY OF WELLINGTON, Wellington (NZ)

(72) Inventors: Kenta Niwa, Tokyo (JP); Willem Bastiaan Kleijn, Wellington (NZ)

(73) Assignees: NTT, Inc., Tokyo (JP); VICTORIA UNIVERSITY OF WELLINGTON, Wellington (NZ)

( * ) Notice: Subject to any disclaimer, the term of this patent is extended or adjusted under 35 U.S.C. 154(b) by 1025 days.

(21) Appl. No.: 17/046,292

(22) PCT Filed: Apr. 12, 2019

(86) PCT No.: PCT/JP2019/015972
§ 371 (c)(1),
(2) Date: Oct. 8, 2020

(87) PCT Pub. No.: WO2019/198814
PCT Pub. Date: Oct. 17, 2019

(65) Prior Publication Data
US 2021/0073615 A1  Mar. 11, 2021

(30) Foreign Application Priority Data

Apr. 12, 2018 (JP) .............................. JP2018-076813
Apr. 12, 2018 (JP) .............................. JP2018-076816
(Continued)

(51) Int. Cl.
*G06N 3/04* (2023.01)

(52) U.S. Cl.
CPC ..................................... *G06N 3/04* (2013.01)

(58) Field of Classification Search
CPC ............ G06N 3/04; G06N 3/00; G06N 3/045; G06N 3/048; G06N 3/063; G06N 3/084
See application file for complete search history.

(56) References Cited

U.S. PATENT DOCUMENTS 5,295,227 A  3/1994  Yokono
5,524,178 A *  6/1996  Yokono ................. G06N 3/045
706/16
(Continued)

FOREIGN PATENT DOCUMENTS

JP  5-197705 A  8/1993
JP  2017-211799 A  11/2017

OTHER PUBLICATIONS

Zhao, A survey of neural network ensembles (Year: 2005).*
(Continued)

*Primary Examiner* — Abdullah Al Kawsar
*Assistant Examiner* — Tewodros E Mengistu

(57) ABSTRACT

Techniques for achieving a scalable DNN and a multi-task DNN, for example, are provided. A neural network system is a neural network system including a plurality of models. Each one of the plurality of models is a DNN including a plurality of layers. Some or all of the plurality of models include at least one layer for which some or all of model variables are equivalent or common (hereinafter referred to as a "shared layer") and also include at least one layer for which the model variables are not equivalent nor common (hereinafter referred to as an "unshared layer").

10 Claims, 25 Drawing Sheets

(30) Foreign Application Priority Data

Apr. 12, 2018 (JP) .............................. JP2018-076817
Oct. 29, 2018 (JP) .............................. JP2018-202397

(56) References Cited

U.S. PATENT DOCUMENTS

| | | | |
|---|---|---|---|
| 2015/0347820 A1* | 12/2015 | Yin .......................... | G06N 3/08 |
| | | | 382/118 |
| 2017/0344881 A1* | 11/2017 | Okuno ................. | G06V 10/764 |
| 2018/0157972 A1* | 6/2018 | Hu ......................... | G06V 20/56 |
| 2018/0366107 A1* | 12/2018 | Huang ................... | G10L 15/16 |
| 2019/0122081 A1* | 4/2019 | Shin ....................... | G06N 3/082 |
| 2019/0130275 A1* | 5/2019 | Chen ...................... | G06N 3/047 |
| 2019/0180184 A1* | 6/2019 | Deng ..................... | G06N 3/045 |
| 2020/0334520 A1* | 10/2020 | Chen ..................... | G06F 40/216 |

OTHER PUBLICATIONS

Saito (2016) "Deep Learning from Scratch—Learning Theory and Implementation of Deep Learning with Python", O'Reilly Japan, Inc., published in Sep. 2016, pp. 124-157.

Ryu et al. (2016) "Primer on Monotone Operator Methods", Appl. Comput. Math., 15(1):3-43.

Sherson et al. (2017) "Derivation and Analysis of the Primal-Dual Method of Multipliers Based on Monotone Operator Theory", https://arxiv.org/abs/1706.02654.

Niwa et at. (2018) "Bregman Monotone Operator Splitting", published on Jul. 13, 2018 on Cornell University Library arXiv.org (URL:https://arxiv.org/abs/1807.04871).

* cited by examiner

Algorithm 1 Conventional PDMM based Edge-consensus Algorithm

Initialization of $z^0_{i|j}, p^0_i, \zeta^0_i$
for $t = 0, \ldots, T-1$ do

▷ Latent variable update　　(Update of latent variable)
　for all $i \in \mathcal{V}$ do
　　$p^{t+1}_i = \arg\min_{p_i}\left(F_{1,i}(p_i) - \sum_{j \in \mathcal{N}(i)}\left\langle z^t_{i|j}, A_{i|j}p_i\right\rangle + \frac{1}{2\gamma}\|A_{i|j}p_i + A_{j|i}\zeta^t_j\|^2_2\right)$, ▷ Dual variable update　　(Update of dual variable)
　for all $i \in \mathcal{V}, j \in \mathcal{N}(i)$ do
　　$\lambda^{t+1}_{i|j} = z^t_{i|j} - 2\kappa A_{i|j}p^{t+1}_i$, ▷ Transmit data　　(Exchange latent variable and dual variable
　for all $i \in \mathcal{V}, j \in \mathcal{N}(i)$ do　　between connected nodes)
　　$\xi^{t+1}_{i|j} = \text{Transmit}_{j \to i}\{\lambda^{t+1}_{j|i}\}$,
　　$\zeta^{t+1}_i = \text{Transmit}_{j \to i}\{p^{t+1}_j\}$, ▷ Dual variable update　　(Update of dual variable)
　for all $i \in \mathcal{V}, j \in \mathcal{N}(i)$ do
　　$z^{t+1}_{i|j} = \begin{cases} \xi^{t+1}_{i|j} & \text{(P-R splitting)} \\ \alpha\xi^{t+1}_{i|j} + (1-\alpha)z^t_{i|j} & \text{(D-R splitting)} \end{cases}$ end for

FIG. 14

Algorithm 1 B-MOS based Edge-consensus Algorithm

Initialization of $z_{i|j}^0, p_i^0, \zeta_i^0$
for $t = 0, \ldots, T-1$ do
   ▷ Latent variable update    (Update of latent variable)
   for all $i \in \mathcal{V}$ do
$$p_i^{t+1} = \arg\min_{p_i}\left(F_{1,i}(p_i) - \sum_{j \in \mathcal{N}(i)} \langle z_{i|j}^t, A_{i|j} p_i \rangle + \frac{1}{2\gamma} \|A_{i|j} p_i + A_{j|i} \zeta_i^t\|_2^2\right).$$
   ▷ Dual variable update    (Update of dual variable)
   for all $i \in \mathcal{V}, j \in \mathcal{N}(i)$ do
$$\lambda_{i|j}^{t+1} = z_{i|j}^t - 2H_{D_{i|j}}^{-1}(z_{i|j}^t) A_{i|j} p_i^{t+1},$$
   ▷ Transmit data    (Exchange latent variable and dual variable
   for all $i \in \mathcal{V}, j \in \mathcal{N}(i)$ do  between connected nodes)
$$\xi_{i|j}^{t+1} = \text{Transmit}_{j \to i}\{H_{D_{j|i}}(z_{j|i}^t) \lambda_{j|i}^{t+1}\},$$
$$\zeta_i^{t+1} = \text{Transmit}_{j \to i}\{p_j^{t+1}\},$$
   ▷ Dual variable update    (Update of dual variable)
   for all $i \in \mathcal{V}, j \in \mathcal{N}(i)$ do
$$z_{i|j}^{t+1} = \begin{cases} H_{D_{i|j}}^{-1}(z_{i|j}^t) \xi_{i|j}^{t+1} & \text{(P-R splitting)} \\ \alpha \cdot H_{D_{i|j}}^{-1}(z_{i|j}^t) \xi_{i|j}^{t+1} + (1-\alpha) z_{i|j}^t & \text{(D-R splitting)} \end{cases}$$
end for

FIG. 15

Algorithm 1 B-MOS based Edge-consensus Algorithm

Initialization of $z_{i|j}^0, p_i^0$
for $t = 0, \ldots, T-1$ do
  ▷ Dual variable update    (Update of dual variable)
  for all $i \in \mathcal{V}, j \in \mathcal{N}(i)$ do
    $\lambda_{i|j}^{t+1} = z_{i|j}^t - 2H_{D_{i|j}}^{-1}(z_{i|j}^t)\left(A_{i|j}(p_i^t - H_{F_{1,i}}^{-1}(p_i^t)\partial F_{1,i}(p_i^t))\right)$
  ▷ Latent variable update    (Update of latent variable)
  for all $i \in \mathcal{V}$ do
    $p_i^{t+1} = p_i^t - H_{F_{1,i}}^{-1}(p_i^t)\left(\partial F_{1,i}(p_i^t) - \sum_{j \in \mathcal{N}(i)} A_{i|j}^T w_{i|j}^{t+1}\right)$
  ▷ Transmit data    (Exchange dual variable between connected nodes)
  for all $i \in \mathcal{V}, j \in \mathcal{N}(i)$ do
    $\xi_{i|j}^{t+1} = \text{Transmit}_{j \to i}\{H_{D_{j|i}}(z_{j|i}^t) \lambda_{j|i}^{t+1}\}$
  ▷ Dual variable update    (Update of dual variable)
  for all $i \in \mathcal{V}, j \in \mathcal{N}(i)$ do
    $z_{i|j}^{t+1} = \begin{cases} H_{D_{i|j}}^{-1}(z_{i|j}^t) \xi_{i|j}^{t+1} & \text{(P-R splitting)} \\ \alpha \cdot H_{D_{i|j}}^{-1}(z_{i|j}^t) \xi_{i|j}^{t+1} + (1-\alpha)z_{i|j}^t & \text{(D-R splitting)} \end{cases}$
end for

SCALABLE PARTIALLY SHARED MULTI-TASK NEURAL NETWORK SYSTEM, METHOD, AND PROGRAM

CROSS-REFERENCE TO RELATED APPLICATIONS

This application is a U.S. 371 Application of International Patent Application No. PCT/JP2019/015972, filed on 12 Apr. 2019, which application claims priority to and the benefit of JP Application No. 2018-076813, filed on 12 Apr. 2018, JP Application No. 2018-076816, filed on 12 Apr. 2018, JP Application No. 2018-076817, filed on 12 Apr. 2018, and JP Application No. 2018-202397, filed on 29 Oct. 2018, the disclosures of which are hereby incorporated herein by reference in their entireties.

TECHNICAL FIELD

The present invention relates to techniques for machine learning.

BACKGROUND ART

Machine learning has been booming in recent years. For machine learning, it is increasingly common to use a framework that acquires mapping between collected data and information that should be output through learning with data and supervised data. In some cases, a cost function is used instead of supervised data.

A model with its mapping described using a deep neural network (DNN) is generally called an end-to-end model. In the end-to-end model, only input and output are given, and the input-output relationship is described by a DNN considering the relationship between them as a black-box. Known techniques for generating a DNN include a technique described in Non-patent Literature 1.

In the conventional end-to-end model, the input-output relationship is a black-box, and while DNNs having the same input and output exist on a network being directly or indirectly connected with each other, the individual DNNs are operating independently. For example, on the internet, there are multiple speech recognition DNNs that receive a speech signal as input and output a character string corresponding to the speech signal, where each speech recognition DNN performs DNN training independently and carries out speech recognition using the independently trained DNN. This also applies to the case of operating multiple DNNs on a single apparatus. For example, in the case of operating a DNN having the task of recognizing speech and outputting a recognition result and a DNN having the task of generating a response to the speech and outputting it on a single PC, these DNNs operate on the single PC but operate independently from each other.

Next, consider the problem of minimizing cost which is handled in learning of a latent variable of a model to be subjected to machine learning. This minimization problem is formulated as below.

(Problem)

Assume that a cost function G is additively split into a function $G_1$ and a function $G_2$. Here, the functions $G_1$, $G_2$ are both assumed to be closed proper convex functions (hereinafter, a closed proper convex function is called just a convex function).

$$G(w) = G_1(w) + G_2(w)$$

Here, $w \in R^m$ (m is an integer equal to or greater than 1) holds, and $G_i: R^m \to R \cup \{\infty\}$ (i=1, 2) holds. That is, w is an element of an m-dimensional real vector space $R^m$, and $G_i$ is a function that takes the m-dimensional real vector w as input and outputs a (one-dimensional) real number.

Although the input to $G_i$ was described as being a vector, it may also be a matrix or a tensor. As a matrix and a tensor can be represented with a vector, the following description assumes that the input to $G_i$ is a vector.

The problem of optimizing a latent variable w so as to minimize the cost G is represented as below.

$$\min_w (G_1(w) + G_2(w)) \quad (1\text{-}1)$$

An optimal solution $w^*$ (also called a stationary point of w) of this problem is obtained when the subdifferential of the cost G contains a 0 vector (zero vector).

$$0 \in \partial G_1(w) + \partial G_2(w) \quad (1\text{-}2)$$

Here, $\partial G_i$ represents the subdifferential of $G_i$. The reason for using the symbol "∈" instead of the symbol "=", which represents an equal sign meaning that the input and the output are in one-to-one correspondence, is that when a convex function $G_i$ contains discontinuities, its subdifferential will be in multi-point output correspondence at the discontinuities.

Before describing a conventional method for determining the optimal solution $w^*$, several specific problems associated with Formula (1-1) are introduced.

«Specific Problem 1: Consensus Problem in Edge Computing»

Consider a graph G(v,e) with V nodes connected in a given manner (where v is a set of nodes and e is a set of edges).

$$v = \{1, \ldots, V\}$$

$$N(i) = \{j \in v | (i,j) \in e\}$$

Here, N(i) represents a set of indices of nodes connected with the ith node.

FIG. 12 shows a situation in which V nodes (servers) are connected in accordance with an edge structure e (where V=5). The problem of optimizing the whole structure while exchanging latent variables and their auxiliary variable (for example, dual variables), rather than exchanging enormous data accumulated at each node between nodes, is the consensus problem in edge computing.

Cost represented by a convex function present at the ith node is expressed as below.

$$F_{1,i} (i \in v)$$

In this example, for facilitating the understanding of the problem, a square error for supervised data $s_i$ will be used as a specific example of cost $F_{1,i}$.

$$F_{1,i} = \frac{1}{2U(i)} \Sigma_{u \in u(i)} \|s_{i,u} - p_i^T v_{i,u}\|_2^2$$

Here, T represents transposition and $\|\cdot\|_p$ represents $L_p$ norm. Also, $u(i) = \{1, \ldots, U(i)\}$ holds.

This cost $F_{1,i}$ is the cost function for the problem of optimizing a latent variable $p_i (p_i \in R^{p'})$ using U(i) data tuples $(v_{i,u}, s_{i,u})$ by taking a p'-dimensional vector $v_i \in R^{p'}$ as input data and so as to output supervised data $s_i$. The index shows that data and the number of pieces of data U(i) differ from node to node. In general, though data accumulated at each node is different, they may be the same. A tuple of input data and supervised data will be referred to as learning data. Also, m=p'V holds hereinafter.

Although in this example the problem is formulated using supervised data, it can also be formulated without using supervised data.

For parallel computing by multiple servers positioned at the same location, it can also be formulated as the same problem as the consensus problem mentioned above. For example, this can be the case when parallel calculations are performed using a multitude of computers to rapidly learn models for speech recognition, image recognition, or the like. In this case, the data set accumulated at each server will be basically the same.

In the consensus problem, a stationary point at which the cost is minimized will be searched for while applying restriction so that the value of the latent variable p will be the same among the nodes.

$$\min_{p_i} \sum_{i \in v} F_{1,i}(p_i) \quad (2\text{-}1)$$
$$\text{s.t. } A_{i|j} p_i + A_{j|i} p_j = 0 \; \forall \, i \in v, \forall \, (i,j) \in e$$

Here, $p_i \in R^{p'}$ and $A_{i|j} \in R^{p' \times p'}$ hold. $A_{i|j}$ is a real number matrix of p'×p' representing consensus parameters. This matrix $A_{i|j}$ can be any matrix, but when there is an intention to "carry out learning so that the value of the latent variable will be the same among the nodes", a simple matrix like the one below can be used, for example.

$$A_{i|j} = \begin{cases} I & (i > j, j \in N(i)) \\ -I & (j > i, j \in N(i)) \end{cases}$$

Here, I is an identity matrix.

In solving a cost minimization problem under a linear constraint like Formula (2-1), the method of Lagrange multiplier is often used. Using a dual variable $v_{i,j} \in R^{p'}$, a Lagrange function L is defined as below.

$$L = \sum_{i \in v} \left( F_{1,i}(p_i) + \sum_{j \in N(i)} \langle v_{i,j}, -A_{i|j} p_i - A_{j|i} p_j \rangle \right)$$
$$= \sum_{i \in v} \left( F_{1,i}(p_i) - \sum_{j \in N(i)} \langle v_{i,j}, A_{i|j} p_i \rangle \right)$$

Solving Formula (2-1) corresponds to solving the problem of Formula (2-2) below (a primal problem). However, this problem is often difficult to solve directly.

When $F_{1,i}$ is a closed proper convex function, strong duality holds, that is, integrity between Formula (2-2) and Formula (2-3) holds at an optimal point. Thus, in general, the problem of Formula (2-3) (a dual problem) is solved instead of solving Formula (2-2).

$$\min_{p_i} \max_{v_{i,j}} L \quad (2\text{-}2)$$

$$\geq \max_{v_{i,j}} \min_{p_i} L \quad (2\text{-}3)$$

$$= \max_{v_{i,j}} \min_{p_i} \sum_{i \in v} \left( F_{1,i}(p_i) - \sum_{j \in N(i)} \langle v_{i,j}, A_{i|j} p_i \rangle \right) \quad (2\text{-}4)$$
$$= -\min_{v_{i,j}} \sum_{i \in v} F_{1,i}^* \left( \sum_{j \in N(i)} A_{i|j}^T v_{i,j} \right)$$

Here, $F_{1,i}^*$ represents a convex conjugate function of a convex function $F_{1,i}$.

$$F_{1,i}^* \left( \sum_{j \in N(i)} A_{i|j}^T v_{i,j} \right) = \max_{p_i} \left( \sum_{j \in N(i)} \langle v_{i,j}, A_{i|j} p_i \rangle - F_{1,i}(p_i) \right)$$

When $F_{1,i}$ is a convex function, $F_{1,i}^*$ is also a convex function.

Formula (2-4) represents the problem of finding a dual variable $v_{i,j}$ that minimizes the convex function $F_{1,i}^*$. To solve Formula (2-1), Formula (2-4) should be solved; however, with the format of Formula (2-4), it is not possible to enable processing that updates the latent variable for each node asynchronously. Thus, lifting is performed so that the dual variable $v_{i,j}$ belongs to each node. Specifically, the dual variable $v_{i,j}$ is split into a dual variable $\lambda_{i|j} \in R^{p'}$ belonging to the ith node and a dual variable $\lambda_{j|i} \in R^{p'}$ belonging to the jth node, and a restriction to make these variables match each other is added.

$$\lambda_{i|j} = \lambda_{j|i} (i,j) \in e$$

FIGS. 13A and 13B show how the lifting of the dual variable can be performed. FIG. 13A represents that it is the variable $v_{i,j}$ that controls an error in the consensus between a node i and a node j. However, this requires updating while synchronizing the ith latent variable and jth latent variable. Accordingly, in order to enable the ith latent variable and the jth latent variable to be updated asynchronously as well, the undirected edge in FIG. 13A is rewritten into two directed edges as shown in FIG. 13B. As these two edges are generated from a single undirected edge, a restriction for matching is required, but the synchronization problem in updating of variables can be solved.

With the lifting of the dual variable, the problem of Formula (2-4) is rewritten to the following problem (a linear-constrained optimization problem).

$$\min_{\lambda_{i|j}} \sum_{i \in v} F_{1,i}^* \left( \sum_{j \in N(i)} A_{i|j}^T \lambda_{i|j} \right) \quad (2\text{-}5)$$
$$\text{s.t. } \lambda_{i|j} = \lambda_{j|i} \; \forall \, i \in v, \forall \, (i,j) \in e$$

By using a vector or a matrix to represent variables which have been separately written in V sets, Formula (2-5) is represented as shown below. Of course, the meaning of the formula remains unchanged, representing the same problem.

$$\min_{\lambda} F_1^*(A^T \lambda) \; \text{s.t. } \lambda_{i|j} = \lambda_{j|i} \; \forall \, i \in v, \forall \, (i,j) \in e \quad (2\text{-}6)$$

Here, a convex conjugate function $F_1^*$ will be as the formula below.

$$F_1^*(A^T \lambda) = \max_p (\langle \lambda, Ap \rangle - F_1(p))$$

Here, $F_1: R^m \to R \cup \{\infty\}$ and $F_1^*: R^m \to R \cup \{\infty\}$ (m=p'V) hold.

Also, the variables that have been written separately for each set of V nodes (that is, $p_i$, $\lambda_{i|j}$, $A_{i|j}$) will be as shown below.

$$p = [p_1^T, \cdots, p_V^T]^T$$

$$\lambda = [\lambda_{1|2}^T, \cdots, \lambda_{1|V}^T, \lambda_{2|1}^T, \cdots, \lambda_{2|V}^T, \cdots, \lambda_{V|1}^T, \cdots, \lambda_{V|V-1}^T]^T$$

$$A = \begin{bmatrix} A_{1|2}^T, \cdots, A_{1|V}^T & & O \\ & A_{2|1}^T, \cdots, A_{2|V}^T & \\ & & \ddots \\ O & & A_{V|1}^T, \cdots, A_{V|V-1}^T \end{bmatrix}^T$$

Here, in describing the restriction that the dual variables after lifting match each other, an indicator function $F_2$ having an appropriate property in terms of matching of the variables is further used. Using the indicator function $F_2$, the problem of Formula (2-6) is reduced to the following problem.

$$\min_\lambda F_1^*(A^T\lambda) + F_2(\lambda) \quad (2\text{-}7)$$

Here, the indicator function $F_2$ is defined as follows.

$$F_2(\lambda) = \begin{cases} 0 & (I-P)\lambda = 0 \\ +\infty & (\text{otherwise}) \end{cases}$$

Here, P is a permutation matrix. The elements of the permutation matrix P are all 0 or 1, having the property of $P^2=I$. Multiplying the vector $\lambda$ with the matrix P is equivalent to processing for interchanging dual variables $\lambda_{i|j}$, $\lambda_{j|i}$ ($\lambda_{j|i} \Leftrightarrow \lambda_{i|j}$) corresponding to the edges between the node $i$ and the node $j$ as:

$$[\lambda_{2|1}^T, \ldots, \lambda_{V|1}^T, \ldots, \lambda_{1|2}^T, \ldots, \lambda_{V|2}^T, \ldots \\ \lambda_{1|V}^T, \ldots, \lambda_{V-1|V}^T]^T = P[\lambda_{1|2}^T, \ldots, \lambda_{1|V}^T, \\ \lambda_{2|1}^T, \ldots, \lambda_{2|V}^T, \ldots, \lambda_{V|1}^T, \ldots, \lambda_{V|V-1}^T]^T$$

It can be seen here that by applying replacement like the one below to Formula (2-7), the consensus problem in edge computing (that is, Formula (2-7)) is reduced to Formula (1-1).

$$w \leftarrow \lambda$$

$$G_1(w) = F_1^*(A^T w)$$

$$G_2(w) = F_2(w)$$

The following is another example.

«Specific Problem 2: Generic Model Generation Problem in Recognition Task for Image/Speech/Language»

As a method of generating a generic model in recognition task for image/speech/language or the like, learning of the latent variable p using a cost such as the one below is known to be effective (see Reference Non-patent Literature 2-1). (Reference Non-patent Literature 2-1: V. Vapnik, "Principles of Risk Minimization for Learning Theory", Advances in Neural Information Processing Systems 4 (NIPS1991), pp. 831-838, 1992.)

$$\min_p \left( \frac{1}{n} \sum_{i=1}^n F_1(\langle a_i, p \rangle) + F_2(p) \right) \quad (2\text{-}8)$$

$$= \min_p \max_\lambda \left( \frac{1}{n} \langle \lambda, Ap \rangle - \frac{1}{n} \sum_{i=1}^n F_1^*(\lambda) + F_2(p) \right) \quad (2\text{-}9)$$

$$= -\min_\lambda \left( \frac{1}{n} \sum_{i=1}^n F_1^*(\lambda) + F_2^*\left(\frac{1}{n} A^T \lambda\right) \right)$$

Here, $p \in R^m$ represents the latent variable, $\lambda \in R^m$ represents the dual variable, and $A=[a_1, \ldots, a_n]^T \in R^{n \times m}$ represents input data.

It can be seen that by applying replacement like the one below to Formula (2-8), the generic model generation problem in recognition task for image/speech/language (that is, Formula (2-8)) is reduced to Formula (1-1).

$$w \leftarrow p$$

$$G_1(w) = \frac{1}{n} \sum_{i=1}^n F_1(\langle a_i, w \rangle)$$

$$G_2(w) = F_2(w)$$

It can be also seen that Formula (2-9) is also reduced to Formula (1-1) by applying replacement like the one below.

$$w \leftarrow \lambda$$

$$G_1(w) = \frac{1}{n} \sum_{i=1}^n F_1^*(w)$$

$$G_2(w) = F_2^*\left(\frac{1}{n} A^T w\right)$$

For example, a square error or cross-entropy can be used for $F_1$, and $L_1$ norm can be used as a regularization term for $F_2$. Of course, $F_1$ and $F_2$ are not limited to them.

$$F_1(\langle a_i, p \rangle) = \frac{1}{2} \|\langle a_i, p \rangle - s\|_2^2$$

$$F_2(p) = \|p\|_1$$

Here, s is supervised data for desired output information. $a_i$ is a vector constituting the aforementioned input data $A=[a_1, \ldots, a_n]^T \in R^{n \times m}$.

This can be also used for a task other than recognition task, for example, for removal of noise in image/speech.

«Conventional Method for Determining Optimal Solution w*»

In this section, a conventional solution is briefly described. As mentioned earlier, the problem to be solved is Formula (1-1). Also, the optimal solution w* of the problem represented by Formula (1-1) (the stationary point of w) is obtained when the subdifferential of the cost G contains a 0 vector (zero vector) as shown by Formula (1-2). When $G_i$ is a convex function, the subdifferential $\partial G_i$ of $G_i$ will be a monotone operator.

In order to solve Formula (1-2) to determine the optimal solution w*, the subdifferential is converted to a continuous linear mapping. This method of conversion is called monotone operator splitting (Non-patent Literature 2). The monotone operator splitting is also called monotone operator decomposition. While there are various methods of monotone operator splitting, two kinds of monotone operator splitting are shown herein: Peaceman-Rachford (P-R) type and Douglus-Rachford (D-R) type, which can ensure the nonexpansiveness of the cost associated with recursive updating of variables (that is, a property that the cost decreases along with updating of the variables).

Although a specific derivation procedure is omitted, transforming Formula (1-2) provides P-R operator splitting and D-R operator splitting. In the transformation, a Resolvent operator $\Omega_n$ and a Cayley operator $\Psi_n$ are used (n=1, 2).

$$\Omega_n = (I + \kappa \partial G_n)^{-1} (\kappa > 0)$$

$$\Psi_n = 2\Omega_n - I$$

Here, I represents an identity operator, and $^{-1}$ represents an inverse operator.

An auxiliary variable z ($z \in R^m$) for w ($w \in R^m$) is also introduced. Their relationship is connected by the Resolvent operator as below.

$$w \in \Omega_1(z)$$

The P-R operator splitting and the D-R operator splitting are respectively represented by Formulas (3-1) and (3-2).

$$z \in \Psi_2 \Psi_1(z) \quad (3\text{-}1)$$

$$z \in \alpha \Psi_2 \Psi_1(z) + (1-\alpha) z (\alpha \in (0,1)) \quad (3\text{-}2)$$

From Formulas (3-1) and (3-2), it can be seen that introduction of an averaging operator into the P-R operator splitting provides the D-R operator splitting.

In the following, taking the consensus problem in edge computing as an example, a variable updating algorithm which is a recursive variable update rule derived from Formulas (3-1) and (3-2) is described. This consensus problem is represented by Formula (2-7) but with $\lambda$ replaced by w, as shown below.

$$\min_w F_1^*(A^T w) + F_2(w) \quad (2\text{-}7')$$

$$F_2(w) = \begin{cases} 0 & (I-P)w = 0 \\ +\infty & (\text{otherwise}) \end{cases}$$

$$G_1(w) = F_1^*(A^T w)$$

$$G_2(w) = F_2(w)$$

Then, a Resolvent operator $\Omega_2$ and a Cayley operator $\Psi_2$ will be as follows.

$$\Omega_2 = (I + \kappa \partial F_2)^{-1} (\kappa > 0)$$

$$\Psi_2 = 2\Omega_2 - I = P$$

If the indicator function $F_2$ is used, that the Cayley operator $\Psi_2$ corresponds to the permutation matrix P is shown in Non-patent Literature 3.

When represented as recursive variable update rules, Formula (3-1) and Formula (3-2) will be the following. Formula (3-5) corresponds to the P-R operator splitting of Formula (3-1), and Formula (3-6) corresponds to the D-R operator splitting of Formula (3-2).

$$w^{t+1} = \Omega_1(z^t) = (I + \kappa \partial G_1)^{-1}(z^t) \quad (3\text{-}3)$$

$$\lambda^{t+1} = \Psi_1(z^t) = (2\Omega_1 - I)(z^t) = 2w^{t+1} - z^t \quad (3\text{-}4)$$

$$z^{t+1} = \begin{cases} \Psi_2(\lambda^{t+1}) = P\lambda^{t+1} & (3\text{-}5) \\ \alpha \Psi_2(\lambda^{t+1}) + (1-\alpha) z^t = \alpha P \lambda^{t+1} + (1-\alpha) z^t & (3\text{-}6) \end{cases}$$

Here, the variables w, $\lambda$, z ($w \in R^m$, $\lambda \in R^m$, $z \in R^m$, m=p'V) are variables that are obtained through the Resolvent operator or the Cayley operator, and they are all dual variables. t is a variable representing the number of updates performed.

As can be seen from the definition of the function $F_1^*$, Formula (3-3) contains updating of the latent variable p and the dual variable w. As a method of updating these variables, a method described in Non-patent Literature 3 is shown. Formula (3-3) is transformed in the following manner.

$$(I + \kappa \partial G_1)(w) \in z \quad (3\text{-}7)$$

$$0 \in \kappa \partial G_1(w) + w - z$$

$$w^{t+1} = \arg \min_w \left( G_1(w) + \frac{1}{2\kappa} \|w - z^t\|_2^2 \right)$$

$$= \arg \min_w \left( F_1^*(A^T w) + \frac{1}{2\kappa} \|w - z^t\|_2^2 \right)$$

In deriving the third formula from the second formula in the transformation above, integral form was used.

Since $F_1^*$ contains optimization calculation for the latent variable p, there are two methods to solve Formula (3-7). Here, a method that optimizes the latent variable p first and fixes p at its optimal value before optimizing the dual variable w will be derived. For sequential optimization calculation for the latent variable p (that is, for calculating $p^{t+1}$ from $p^t$), a penalty term related to p is added to the cost contained in $F_1^*$ and calculation is performed.

$$p^{t+1} = \arg \min_p \left( F_1(p) - \langle z^t, Ap \rangle + \frac{1}{2\gamma} \|Ap\|_2^2 \right) \quad (3\text{-}8)$$

Here, the third term in argmin on the right side of Formula (3-8) is the penalty term, with $\gamma > 0$. Use of the penalty term enables sequential optimization calculation for the latent variable p.

Then, with the latent variable p fixed, optimization of the dual variable w contained in Formula (3-7) is performed.

$$w^{t+1} = \arg \min_w \left( F_1^*(A^T w) + \frac{1}{2\kappa} \|w - z^t\|_2^2 \right) \quad (3\text{-}9)$$

$$= \arg \min_w \left( \langle w, Ap^{t+1} \rangle - F_1(p^{t+1}) + \frac{1}{2\kappa} \|w - z^t\|_2^2 \right)$$

$$= z^t - \kappa A p^{t+1}$$

Formula (3-4) can be calculated in the following manner.

$$\lambda^{t+1} = 2w^{t+1} - z^t = z^t - 2\kappa A p^{t+1} \quad (3\text{-}10)$$

As seen from Formula (3-10), $\lambda$ can now be calculated without using w.

From the foregoing, the recursive variable update rule (Formula (3-3) to Formula (3-6)) will be as follows.

$$p^{t+1} = \arg \min_p \left( F_1(p) - \langle z^t, Ap \rangle + \frac{1}{2\gamma} \|Ap\|_2^2 \right) \quad (3\text{-}8)$$

-continued $$\lambda^{t+1} = z^t - 2\kappa A p^{t+1} \quad (3\text{-}10)$$

$$z^{t+1} = \begin{cases} P\lambda^{t+1} & (3\text{-}5) \\ \alpha P\lambda^{t+1} + (1-\alpha)z^t & (3\text{-}6) \end{cases}$$

Enabling this update rule to update the variables on each node provides the algorithm shown in FIG. 14. Note that Transmit$_{j \to i}\{\cdot\}$ represents an operation to transmit the variables from the node j to the node i.

PRIOR ART LITERATURE

Non-Patent Literature

Non-patent Literature 1: Koki Saito, "Deep Learning from Scratch-Learning Theory and Implementation of Deep Learning with Python", O'Reilly Japan, Inc., published in September 2016.

Non-patent Literature 2: E. K. Ryu and S. Boyd, "Primer on Monotone Operator Methods", Appl. Comput. Math., 15 (1): 3-43, 2016.

Non-patent Literature 3: T. Sherson, R. Heusdens, W. B. Kleijn, "Derivation and Analysis of the Primal-Dual Method of Multipliers Based on Monotone Operator Theory", arxiv.org/abs/1706.02654, 2017.

SUMMARY OF THE INVENTION

Problems to be Solved by the Invention

A first challenge is described first.

One of techniques for optimizing multiple mappings that exist being directly or indirectly connected to each other by exchange of latent variables is consensus algorithms in edge computing.

Many of the consensus algorithms, however, are constructed as techniques that are only appliable when the cost function is handled as a convex function. Thus, for a DNN with the cost being a non-convex function, no algorithms have been proposed in which model variables are shared among multiple models. Consequently, it has been impossible to share model variables among multiple DNNs, whether they exist on a scalable DNN or a multi-task DNN network, for example, being directly or indirectly connected to each other or located on the same apparatus, or whether having the same task or different tasks.

This is the first challenge.

Next, a second challenge is described.

The conventional variable update rule is generated based on monotone operator splitting with the Resolvent operator or the Cayley operator. Such a conventional variable update rule has the problem of taking time for convergence to the optimal solution in some cases. That is, it has the problem of taking time to learn latent variables.

This is the second challenge.

Therefore, an object of the present invention is to provide a technique that enables sharing of model variables among multiple DNNs.

Means to Solve the Problems

An aspect of the present invention is a neural network system including a plurality of models, in which each one of the plurality of models is a DNN including a plurality of layers, and some or all of the plurality of models include at least one layer for which some or all of model variables are equivalent or common (hereinafter referred to as a "shared layer") and also include at least one layer for which the model variables are not equivalent nor common (hereinafter referred to as an "unshared layer").

Effects of the Invention

According to the present invention, the scalable DNN and multi-task DNN mentioned later, for example, can be achieved.

BRIEF DESCRIPTION OF THE DRAWINGS

FIG. 14 shows a conventional variable updating algorithm related to consensus problem in edge computing.
FIG. 15 shows a variable updating algorithm of the present application related to consensus problem in edge computing.
FIG. 16 shows a variable updating algorithm of the present application related to consensus problem in edge computing.

DETAILED DESCRIPTION OF THE EMBODIMENTS

Figure 1:
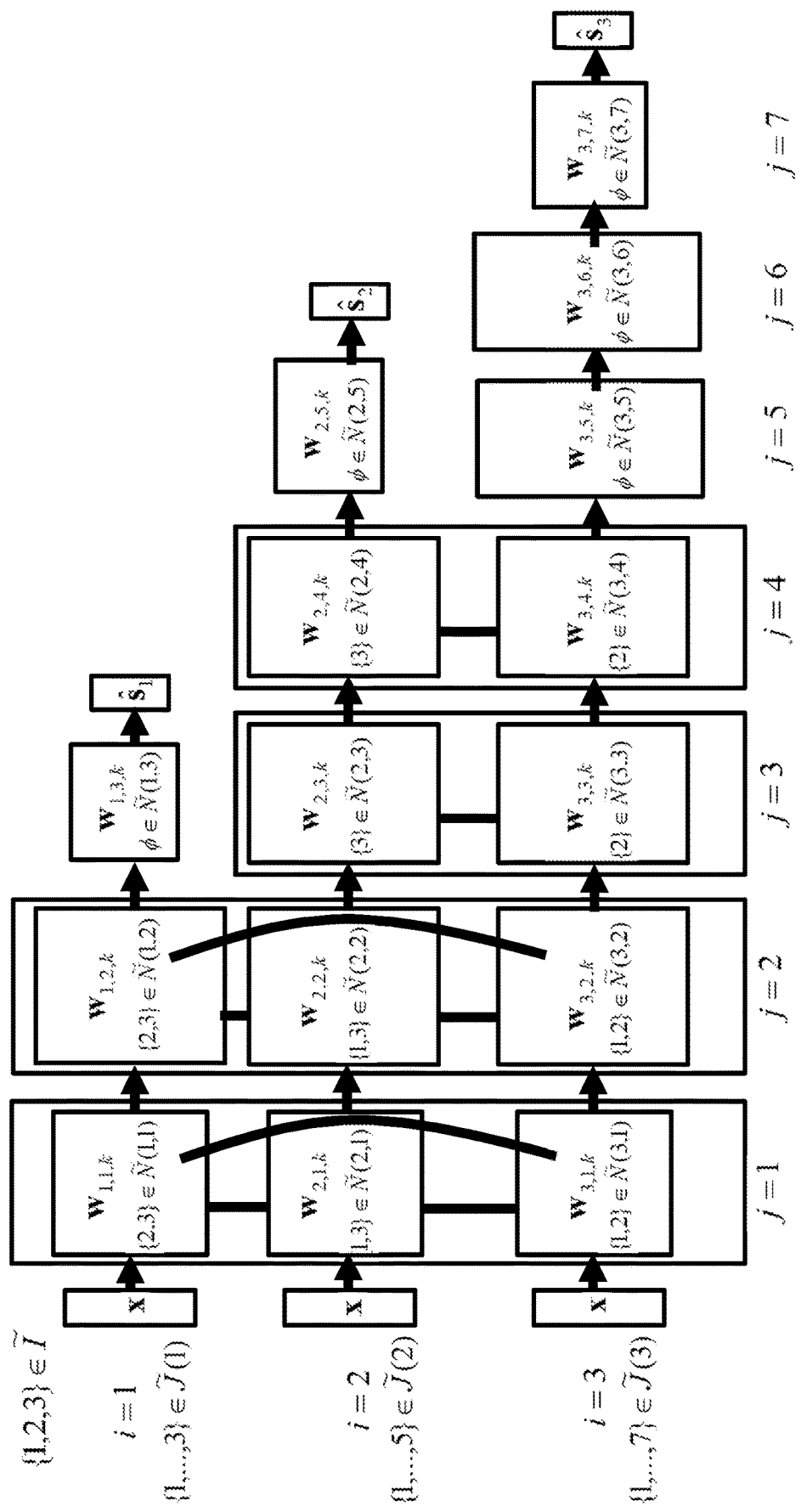
FIG. 1 is a diagram for describing technical background.

A first embodiment as an embodiment of this invention is now described with reference to drawings.

As mentioned above, the object of this invention is to provide a technique for enabling sharing of some model variables among multiple different DNNs. First, (Example 1) and (Example 2) are described below as exemplary applications of the technique for sharing some model variables among multiple different DNNs.

(Example 1) is a system of at least two or more DNNs, where the DNNs are different in the number of layers from each other but have the same task (that is, the inputs to the DNNs are equivalent and the outputs of the DNNs are also equivalent), and model variables are shared between any one layer of one DNN and any one layer of another DNN. This system is called a "scalable DNN" hereinafter. In general, a DNN can form a more complicated mapping as it has more layers and hence tends to provide more accurate results, but the overall computational complexity is increased. In order to gain the best result in a situation where the computational complexity is restricted and the restriction varies with time, a scalable DNN is desirable. For example, given that DNNs can provide a recognition rate of 70% with three layers, a recognition rate of 80% with ten layers, and a recognition rate of 95% with 100 layers with respect to the same task, a case where some of the variables constituting those DNNs overlap each other corresponds to such a "scalable DNN".

(Example 2) is a system of at least two or more DNNs that include relevant portions but are different in the task itself from each other, where either model variables are shared between any one layer of one DNN and any one layer of another DNN, or layers themselves are shared. This system is called a "multi-task DNN". Examples of combination of the multiple DNNs contained in a multi-task DNN include: a combination in which the inputs to the DNNs are equivalent but the outputs of the DNNs are not equivalent; a combination in which the inputs to the DNNs are not equivalent but the outputs of the DNNs are equivalent; a combination in which some of the inputs to the DNNs are equivalent but the rest of the inputs to the DNNs are not equivalent; and a combination in which some of the outputs of the DNNs are equivalent but the rest of the outputs of the DNNs are not equivalent. For example, a system having multiple related tasks as its output, such as the task of recognizing speech and outputting a recognition result, the task of generating a response to the same speech and outputting it, and the task of generating a robot motion for the same speech and outputting it, corresponds to a "multi-task DNN". Since these tasks are related to each other, a DNN structure (multi-task DNN structure) that branches the final output is considered be closer to natural laws, than building end-to-end models that handle their respective tasks independently (in this case, three kinds of models corresponding to the respective processes: recognition of speech, generation of a response to the speech, and generation of a robot motion for the speech), and this is also expected to decrease the overall computational complexity.

TECHNICAL BACKGROUND

In the following, a scheme for generating I independent end-to-end DNN models is described. I is a predefined integer equal to or greater than 2. As an example problem, a multi-class classification problem is considered. In the ith model, a cost function (cross-entropy) to be minimized is defined.

$$E_i(w_{i,j,k}) = -\sum_{b=1}^{B}\sum_{d=1}^{D} S_{i,b,d} \log P_{i,b,d} \quad \forall i \in \tilde{I},\ \forall j \in \tilde{J}(i),\ \forall k \in \tilde{K}(i,j)$$

Here, $E_i$ is the cost function of a model i (i=1, ..., I). As in this example, the cost function in a DNN is commonly a non-convex function. $w_{i,j,k}$ is a primal variable of the DNN model, more particularly, a weight coefficient vector for a node k in the jth layer of the model i. In the following, $w_{i,j,k}$ may be called the primal variable or may be called a model variable. B is the number of classification classes, being a predefined positive integer. D is the number of pieces of data, being a predefined positive integer. $S_{i,b,d}$ is labeled supervised data of the model i for a class b. Labeled supervised data common to all the models may also be used. In that case, the index i of $S_{i,b,d}$ would be unnecessary. $P_{i,b,d}$ is a probability value for the model i output by the DNN for the bth class. A probability value common to all the models may also be used. In that case, the index i of $P_{i,b,d}$ would be unnecessary.

Here, ~I which is a set of indices of the models; ~J(i) which is a set of the indices representing the layers constituting the model i; and a set of the indices representing the nodes in the jth layer of the model i. J(i) is the number of layers in the model i, being a predefined positive integer. ~I means that "~" is placed above I. The same applies to ~J(i,j), ~K(i,j), ~N(i,j), and so on.

~K(i,j) is defined as follows. K(i,j) is the number of nodes in the jth layer of the model i, being a predefined positive integer.

$$\tilde{I}=\{i|1,\ldots,I\}, \tilde{J}(i)=\{j|1,\ldots,J(i)\}, \tilde{K}(i,j)=\{k|1,\ldots,K(i,j)\}$$

A primal variable $w_{i,j,k}$ for the node k in the jth layer of the model i is defined as follows.

$$w_{i,j,k}=[W_{i,j,k,1},\ldots,W_{i,j,k,K(i,j-1)+1}]^T$$

In this definition, K(i,j−1)+1 is defined because coefficients for a bias term are typically also contained in the primal variable. Also, K(i,0)=M holds when the dimension of input information is M.

Then, the output of the model i is obtained in the following manner. $F_i$ is a function representing computation processing by the DNN. $x_d$ is the dth input data, and $p_{i,d}$ is a probability value for each of B classes corresponding to the dth input data $x_d$.

$$p_{i,d}=F_i(x_d)$$

Each of supervised data $s_{i,d}$, the dth input data $x_d$, and the probability value $p_{i,d}$ is a vector defined as follows.

$$s_{i,d}=[S_{i,1,d},\ldots,S_{i,B,d}]^T, x_d=[X_{1,d},\ldots,X_{M,d}]^T, p_{i,d}=[P_{i,1,d},\ldots,P_{i,B,d}]^T$$

$F_i$ is performed with the following operations.

for $i \in \tilde{I}$ for $j \in \tilde{J}$ $$\begin{cases} v_{i,1,d} = \sum_{k=1}^{K(i,1)} w_{i,1,k}^T \left[x_d^T, 1\right]^T, & (j = 1) \\ v_{i,j,d} = \sum_{k=1}^{K(i,j)} w_{i,j,k}^T \left[u_{i,j,d}^T, 1\right]^T, & (j \ne 1) \end{cases}$$

$$u_{i,j,d} = a_{i,j}(v_{i,j,d})$$

Here, $a_{i,j}$ is a non-linear activation function such as rectified linear unit (ReLU), sigmoid function, and cross-entropy function.

Optimization of the primal variable in a DNN often employs an approach that sequentially subtracts a first-order gradient of an error function as shown below.

$$w_{i,j,k}^{(t+1)} = w_{i,j,k}^{(t)} - \eta \nabla E_i(w_{i,j,k}^{(t)})$$

Here, $\eta$ is a positive number, for which a small number less than 1 is commonly used. $\nabla E_i$ is the first-order gradient with respect to the primal variable vector.

There are various methods to calculate the first-order gradient $\nabla E_i$ of the error function with regard to the primal variable. The most basic one is to combine the error back-propagation and the probabilistic gradient method. As practical techniques for obtaining an optimal solution with a small number of updates, the Adam method, the AdaGrad method, and the like are often used (see Non-patent Literature 1, for instance).

However, there has been no framework that learns models with introduction of a constraint to share some primal variables among multiple models.

In the following, a model generation apparatus and method with a constraint condition to share some primal variables among multiple models will be described. First, a problem is defined.

$$\min_{w_{i,j,k}} \sum_{i \in \tilde{I}} E_i(w_{i,j,k}) \text{ s.t. } A_{i|n,j} w_{i,j,k} + A_{n|i,j} w_{n,j,k} = b_{i|n,j,k}$$

$$\forall i \in \tilde{I}, \forall j \in \tilde{J}(i), \forall k \in \tilde{K}(i,j), \forall n \in \tilde{N}(i,j)$$

The constraint condition may be any condition that can be written in a linear expression; herein, the condition is described by the relationship between the node k in the jth layer of the model i and the node k in the jth layer of a model n. $\sim N(i,j)$ is a set of the indices of models that have constraint relationship with the jth layer of the model i.

For example, in the case of a scalable DNN, it may be implemented as shown below. Here, I is an identity matrix.

$$A_{i|n,j} = \begin{cases} I & (i > n, n \in \tilde{N}(i,j)) \\ -I & (i < n, n \in \tilde{N}(i,j)) \\ 0 & \text{(otherwise)} \end{cases}$$

$$b_{i|n,j,k} = 0$$

FIG. 1 shows an example of setting of $\sim N(i,j)$ in the case of generating models 1, 2, 3, for which model variables of the first and the second layers are equivalent or common among the models 1, 2, 3, and model variables of the third and the fourth layers are equivalent or common between models 2, 3. $\phi$ means an empty set. In FIG. 1, the model 1 consists of three layers, the model 2 consists of five layers, and the model 3 consists of seven layers. x is the input to each model, and ^S$_1$, ^S$_2$, and ^S$_3$ are the outputs from the models 1, 2, 3, respectively.

Here, being equivalent means that values have little difference between them and are substantially the same. Also, being common means that values are the same. That is, that the model variables of a certain layer are equivalent or common among multiple models means that the model variables of the layer are shared among the multiple models.

As a method of solving such an optimization problem with a constraint condition, the method of Lagrange multiplier is often used. A Lagrange function can be written as follows.

$$L_E(w_{i,j,k}, \lambda_{i|n,j,k}) = \sum_{i \in \tilde{I}} E_i(w_{i,j,k}) + \sum_{j \in \tilde{J}(i)} \sum_{k \in \tilde{K}(i,j)} \sum_{n \in \tilde{N}(i,j)} \lambda_{i|n,j,k}^T (A_{i|n,j} w_{i,j,k} + A_{n|i,j} w_{n,j,k})$$

Then, the problem is defined as below.

$$\min_{w_{i,j,k}} \max_{\lambda_{i|n,j,k}} L_E(w_{i,j,k}, \lambda_{i|n,j,k})$$

$$\forall i \in \tilde{I}, \forall j \in \tilde{J}(i), \forall k \in \tilde{K}(i,j), \forall n \in \tilde{N}(i,j)$$

If the cost $E_i$ is a convex function, there is a means to solve the problem; however, since $E_i$ is a non-convex function, the problem cannot be solved straightforwardly.

Thus, the optimization problem with constraint is to be solved by "using a proxy convex function serving as an upper bound on the cost $E_i$ in place of the cost $E_i$," for this problem.

Consider $G_i$ below as the proxy convex function to be used in place of the cost $E_i$. With x and y being arbitrary vectors, <x,y> represents an inner product of x and y.

$$G_i(w_{i,j,k}) = E_i(w_{i,j,k}^{(t)}) + \langle \nabla E_i(w_{i,j,k}^{(t)}), w_{i,j,k} - w_{i,j,k}^{(t)} \rangle + \frac{1}{2\eta} \|w_{i,j,k} - w_{i,j,k}^{(t)}\|_2$$

$E_i(w_{i,j,k}^{(t)})$ is a constant because it is the cost at the last update (time t). $\nabla E_i(w_{i,j,k}^{(t)})$ is a first-order gradient which is probabilistically computed using a mini batch set consisting of several samples. It is a computable quantity. With · being an arbitrary number, $\|\cdot\|_p$ means L-p norm.

There are two reasons to use this proxy convex function $G_i$.

A first reason is that differential of $G_i$ with respect to the primal variable $w_i$ gives an optimal solution for the primal variable $w_i$, and this corresponds to the approach of sequentially subtracting the first-order gradient of the error function like the conventional method. That is, as shown below, the optimization of the primal variable $w_i$ with respect to the convex function $G_i$ corresponds with a sequential subtraction step performed in the conventional method.

$$w_{i,j,k}^{(t+1)} = \operatorname*{argmin}_{w_{i,j,k}} G_i(w_{i,j,k}) = w_{i,j,k}^{(t)} - \eta \nabla E_i(w_{i,j,k}^{(t)})$$

A second reason is that no inconsistency occurs between minimization of $G_i$ and minimization of the original cost because if $\eta$ is made sufficiently small, $G_i$ will become an upper bound function of the original cost $E_i$.

Assume that a probabilistic gradient (to be more precise, probabilistic first-order gradient) of function $E_i$ is Lipschitz continuity as shown below.

$$\left\|\nabla E_i\left(w_{i,j,k}^{(t)}\right) - \nabla E_i(w_{i,j,k})\right\|_1 \leq \frac{1}{\eta}\left\|w_{i,j,k}^{(t)} - w_{i,j,k}\right\|_1,$$

This is an assumption that is satisfied in many cases if $\eta$ is a sufficiently small value. When the above formula is satisfied, $E_i$ is called a $1/\eta$ smooth function.

When $E_i$ is a $1/\eta$ smooth function, the inequality relationship below holds.

$$E_i(w_{i,j,k}) - E_i\left(w_{i,j,k}^{(t)}\right) - \left\langle \nabla E_i\left(w_{i,j,k}^{(t)}\right), w_{i,j,k} - w_{i,j,k}^{(t)}\right\rangle =$$

$$\int_0^1 \left\langle \nabla E_i\left(w_{i,j,k}^{(t)} + t\left(w_{i,j,k} - w_{i,j,k}^{(t)}\right)\right) - \nabla E_i\left(w_{i,j,k}^{(t)}\right), w_{i,j,k} - w_{i,j,k}^{(t)} \right\rangle dt \leq$$

$$\frac{1}{\eta}\left\|w_{i,j,k} - w_{i,j,k}^{(t)}\right\|_2 \int_0^1 |t|dt = \frac{1}{2\eta}\left\|w_{i,j,k} - w_{i,j,k}^{(t)}\right\|_2$$

From this, the following formula can be derived.

$$E_i(w_{i,j,k}) \leq G_i(w_{i,j,k}) =$$

$$E_i\left(w_{i,j,k}^{(t)}\right) + \left\langle \nabla E_i\left(w_{i,j,k}^{(t)}\right), w_{i,j,k} - w_{i,j,k}^{(t)}\right\rangle + \frac{1}{2\eta}\left\|w_{i,j,k} - w_{i,j,k}^{(t)}\right\|_2$$

Figure 2:
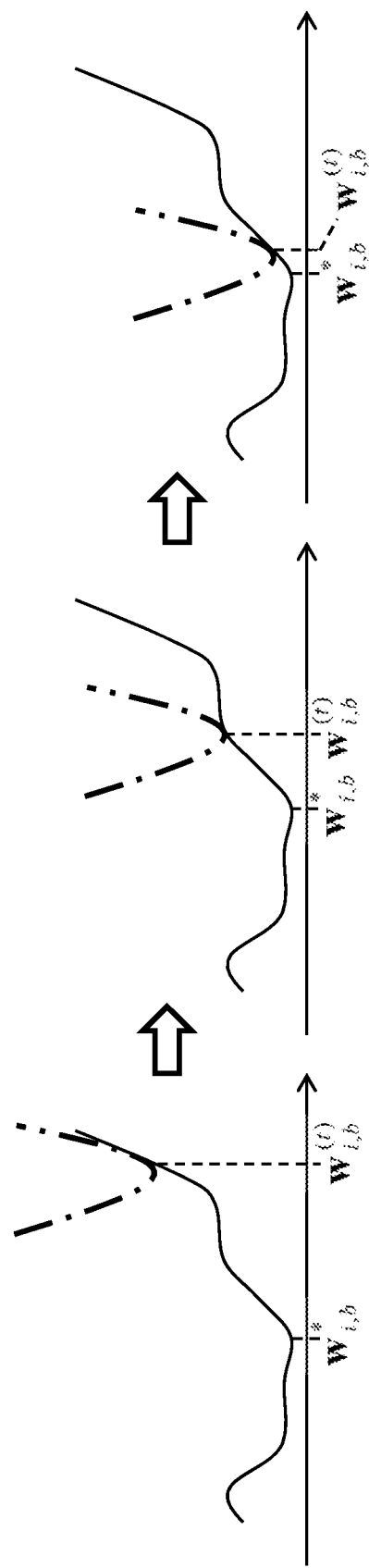
FIG. 2 is a diagram for describing technical background.

The concept of this formula is shown in FIG. 2. In FIG. 2, a solid line represents the original cost function $E_i$. In FIG. 2, the cost $E_i$ is written as a non-convex function. In FIG. 2, a dot-dashed line represents the proxy convex function $G_i$ serving as the upper bound.

If the assumption that $E_i$ is a $1/\eta$ smooth function holds, $G_i$ will be the upper bound function of the original cost $E_i$. Thus, there is no inconsistency between minimization of $G_i$ and minimization of $E_i$, for which reason we chose minimization of $G_i$, being a closed proper convex function easy to handle in optimization with constraint.

The proposed method seeks to solve the following problem.

$$\min_{w_{i,j,k}} \max_{\lambda_{i|n,j,k}} L_G(w_{i,j,k}, \lambda_{i|n,j,k})$$

$$\forall i \in \tilde{I}, \forall j \in \tilde{J}(i), \forall k \in \tilde{K}(i,j), \forall n \in \tilde{N}(i,j)$$

Here, the Lagrange function is represented by the formula below.

$$L_G(w_{i,j,k}, \lambda_{i|n,j,k}) =$$

$$\sum_{i \in \tilde{I}} G_i(w_{i,j,k}) + \sum_{j \in \tilde{J}(i)} \sum_{k \in \tilde{K}(i,j)} \sum_{n \in \tilde{N}(i,j)} \lambda_{i|n,j,k}^T (A_{i|n,j} w_{i,j,k} + A_{n|i,j} w_{n,j,k})$$

The first term on the right side of this Lagrange function formula is described by $G_i$ not by $E_i$.

While there are various methods to solve this problem, a method based on primal dual method of multiplier (PDMM) is proposed herein (see Reference Non-patent Literature 1-1, for instance). It is an algorithm that performs optimization for a dual variable $\lambda$ while applying strong constraint, being expected to provide fast convergence.

(Reference Non-patent Literature 1-1: T. Sherson, R. Heusdens, and W. B. Kleijn, "Derivation and Analysis of the Primal-Dual Method of Multipliers Based on Monotone Operator Theory", arXiv:1706.02654.)

The dual problem of the defined problem can be written as follows.

$$\max_{\lambda_{i|n,j,k}} \min_{w_{i,j,k}} \sum_{i \in \tilde{I}} G_i(w_{i,j,k}) +$$

$$\frac{1}{2} \sum_{j \in \tilde{J}(i)} \sum_{k \in \tilde{K}(i,j)} \sum_{n \in \tilde{N}(i,j)} \lambda_{i|n,j,k}^T (A_{i|n,j} w_{i,j,k} + A_{n|i,j} w_{n,j,k}) =$$

$$\max_{\lambda_{i|n,j,k}} \min_{w_{i,j,k}} \sum_{i \in \tilde{I}} G_i(w_{i,j,k}) + \sum_{j \in \tilde{N}(i)} \sum_{k \in \tilde{K}(i,j)} \sum_{n \in \tilde{N}(i,j)} \lambda_{i|n,j,k}^T A_{i|n,j} w_{i,j,k} =$$

$$\max_{\lambda_{j,k}} \min_{w_{j,k}} G(w_{j,k}) + \lambda_{j,k}^T A_j w_{j,k} = -\min_{\lambda_{j,k}} G^*(-A_j^T \lambda_{j,k})$$

Variables are defined as follows.

$$E\left(w_{j,k}^{(t)}\right) = -\sum_{i \in \tilde{I}} \sum_{b=1}^{B} \sum_{d=1}^{D} S_{i,b,d} \log P_{i,b,d}$$

$$G(w_{j,k}) = E\left(w_{j,k}^{(t)}\right) + \left\langle \nabla E\left(w_{j,k}^{(t)}\right), w_{j,k} - w_{j,k}^{(t)}\right\rangle + \frac{1}{2\eta}\left\|w_{j,k} - w_{j,k}^{(t)}\right\|_2$$

$$G^*(-A_j^T \lambda_{j,k}) = \max_{w_{j,k}}(-\lambda_{j,k}^T A_j w_{j,k} - G(w_{j,k}))$$

$$w_{j,k} = [w_{1,j,k}^T, \ldots, w_{I,j,k}^T]^T,$$

$$\lambda_{j,k} =$$

$$[\lambda_{1|2,j,k}^T, \ldots, \lambda_{1|I,j,k}^T, \lambda_{2|1,j,k}^T, \ldots, \lambda_{2|I,j,k}^T, \ldots, \lambda_{I|1,j,k}^T, \ldots, \lambda_{I|I-1,j,k}^T]^T,$$

$$A_j = \begin{bmatrix} A_{1|2,j} & & & & & O \\ \vdots & & & & & \\ A_{1|I,j} & & & & & \\ & A_{2|1,j} & & & & \\ & \vdots & & & & \\ & A_{2|I,j} & & & & \\ & & \ddots & & & \\ & & & A_{I|1,j} & & \\ & & & \vdots & & \\ O & & & & A_{I|I-1,j} \end{bmatrix}$$

Accordingly, the dual problem to be solved can be written as follows.

$$\min_{\lambda_{j,k}} G^*(-A_j^T \lambda_{j,k}) \text{ s.t. } \lambda_{i|n,j,k} = \lambda_{n|i,j,k}$$

This problem is equivalent to solving with a cost designed like below.

$$\min_{\lambda_{j,k}} G^*(-A_j^T \lambda_{j,k}) + \delta_{(I-P)}(\lambda_{j,k}), \; \delta_{(I-P)}(\lambda_{j,k}) = \begin{cases} 0 & (I-P)\lambda_{j,k} = 0 \\ +\infty & \text{otherwise} \end{cases}$$

To solve this problem, two kinds of dual auxiliary variables are introduced as the auxiliary variables for the dual variable. Let $y_{j,k}$ and $z_{j,k}$ be the two kinds of dual auxiliary variables. Note that the basic properties of the dual auxiliary variables $y_{j,k}$, $z_{j,k}$ are the same as that of the dual variable $\lambda_{j,k}$.

A step of optimizing the variables (the primal variable, the dual variable, and the dual auxiliary variables) based on P-R splitting, one of the operator splitting methods, can be written as follows.

$$z_{j,k} \in C_2 C_1 z_{j,k}$$

In the above formula, the symbol "∈" does not represent the elements of a set but means substituting the operation result of the right side into the left side. Although such a manipulation is usually represented with "=", an irreversible conversion could be performed when a discontinuous closed proper convex function is used as the cost function (an operation not in one-to-one correspondence can be possibly performed). As "=" is generally a symbol used for a conversion (function) with one-to-one correspondence, the symbol of "∈" will be used herein in order to distinguish from it.

Here, $C_n$, (n=1, 2) is a Cayley operator.

$$C_n \in 2R_n - I (n=1,2)$$

$R_n$ (n=1, 2) is a Resolvent operator.

$$R_n \in (I + \sigma_n T_n)^{-1} (n=1,2) \sigma_n > 0$$

$T_n$, (n=1, 2) is a monotone operator. Since $G^*$ and $\delta_{(I-P)}$ constituting the problem are proper convex closed functions, the partial differential with respect to its dual variable will be a monotone operator.

$$T_1 = A_j \partial G^*(-A_j^T) \; T_2 = \partial \delta_{(I-P)}$$

Although theoretical background is not detailed herein, P-R splitting is an optimization scheme that guarantees fast convergence. A decomposed representation of optimization $z_{j,k} \in C_2 C_1 z_{j,k}$ by P-R splitting gives the following.

$$z_{j,k} \in C_2 C_1 z_{j,k} \Rightarrow z_{j,k} \in C_2 y_{j,k}, y_{j,k} \in C_1 z_{j,k} = (2R_1 - I) z_{j,k} = 2R_1 z_{j,k} - z_{j,k} \Rightarrow z_{j,k} \in C_2 y_{j,k}, y_{j,k} \in 2\lambda_{j,k} - z_{j,k},$$
$$\lambda_{j,k} \in R_1 z_{j,k}$$

That is, $\lambda_{j,k}$, $y_{j,k}$, and $z_{j,k}$ are represented as follows.

$$\lambda_{j,k} \in R_1 z_{j,k} = (I + \sigma_1 T_1)^{-1} z_{j,k},$$

$$y_{j,k} \in C_1 z_{j,k} = (2R_1 - I) Z_{j,k} = 2\lambda_{j,k} - z_{j,k}$$

$$z_{j,k} \in C_2 y_{j,k} = P y_{j,k}$$

As to the correspondence of the Cayley operator $C_2$ to the permutation matrix P in the third formula, its proof is published in Reference Non-patent Literature 1-1. An update of the dual variable with the Resolvent operator in the topmost formula can be transformed as shown below. In the formulas below, the third formula is a transformation of the second formula into integral form.

$$z_{j,k} \in (I + \sigma_1 T_1) \lambda_{j,k},$$

$$0 \in \lambda_{j,k} - z_{j,k} + \sigma_1 T_1 \lambda_{j,k},$$

-continued $$0 \in \partial \left( \frac{1}{2\sigma_1} \| \lambda_{j,k} - z_{j,k} \|_2 + G^*(-A_j^T \lambda_{j,k}) \right)$$

In the conjugate convex function of G:

$$G^*(-A_j^T \lambda_{j,k}) = \max_{w_{j,k}} (-\lambda_{j,k}^T A_j w_{j,k} - G(w_{j,k})),$$

the optimal solution of w can be obtained as follows. This optimal solution can be obtained by making =0 be given by the differential equation in the parentheses of max in the conjugate convex function G* of G above.

$$-A_j^T \lambda_{j,k} - \nabla E(w_{j,k}^{(t)}) - \frac{1}{\eta}(w_{j,k} - w_{j,k}^{(t)}) = 0,$$

$$w_{j,k}^* = w_{j,k}^{(t)} - \eta(\nabla E(w_{j,k}^{(t)}) + A_j^T \lambda_{j,k})$$

Next, the optimal solution of the dual variable that satisfies the topmost operation of P-R splitting:

$$\lambda_{j,k} \in (I + \sigma_1 T_1)^{-1} z_{j,k},$$

is derived.

$$\lambda_{j,k}^* = \arg\min_{\lambda_{j,k}} \left( \frac{1}{2\sigma_1} \| \lambda_{j,k} - z_{j,k} \|_2 - \lambda_{j,k}^T A_j w_{j,k}^* - E(w_{j,k}^{(t)}) - \right.$$
$$\left. \langle \nabla E(w_{j,k}^{(t)}), w_{j,k}^* - w_{j,k}^{(t)} \rangle - \frac{1}{2\eta} \| w_{j,k}^* - w_{j,k}^{(t)} \|_2 \right)$$
$$= \left( \frac{1}{\sigma_1} I + \eta A_j A_j^T \right)^{-1} \left[ A_j (w_{j,k}^{(t)} - \eta \nabla E(w_{j,k}^{(t)})) + \frac{1}{\sigma_1} z_{j,k} \right]$$

Decomposing it such that an update is made on a per-model basis gives the following algorithm.

(0) Initialization $$w_{i,j,k}^{(0)}$$

$$z_{i|n,j,k}^{(0)} = 0$$

$w_{i,j,k}^{(0)}$ is initialized by an appropriate means, such as an autoencoder.

Assuming that updates are to be made T times, processing from (1) to (4) below is performed for $t \in \{0, \ldots, T-1\}$.

(1) Determine a first-order gradient. T is the total number of updates and is a positive integer, but is not a constant when online learning is assumed.

$$\forall i \in \tilde{I}, \forall j \in \tilde{J}(i), \forall k \in \tilde{K}(i,j)$$

$$\nabla E_i(w_{i,j,k}^{(t)})$$

The first-order gradient $\nabla E_i(w_{i,j,k}^{(t)})$ can be calculated using error backpropagation, probabilistic gradient descent, Adam, or AdaGrad, for example.

(2) Update the dual variable $$\forall i \in \tilde{I}, \forall j \in \tilde{J}, \forall k \in \tilde{K}(i,j), \forall n \in \tilde{N}(i,j)$$

$$\lambda_{i|n,j,k}^{(t+1)} = \left( \frac{1}{\sigma_1} I + \eta A_{i|n,j} A_{i|n,j}^T \right)^{-1} \left[ A_{i|n,j}(w_{i,j,k}^{(t)} - \eta \nabla E_i(w_{i,j,k}^{(t)})) + \frac{1}{\sigma_1} z_{i|n,j,k}^{(t)} \right]$$

(3) Update the primal variable $$\forall i \in \tilde{I}, \forall j \in \tilde{J}, \forall k \in \tilde{K}(i,j)$$

$$w_{i,j,k}^{(t+1)} = w_{i,j,k}^{(t)} - \eta\left(\nabla E_i\left(w_{i,j,k}^{(t)}\right) + \sum_{n \in \tilde{N}(i,j)} A_{i|n,j}^T \lambda_{i|n,j,k}^{(t+1)}\right)$$

(4) Update the auxiliary variable $$\forall i \in \tilde{I}, \forall j \in \tilde{J}(i), \forall k \in \tilde{K}(i,j),$$

$$y_{i|n,j,k}^{(t+1)} = 2\lambda_{i|n,j,k}^{(t+1)} - z_{i|n,j,k}^{(t+1)},$$

$$z_{i|n,j,k}^{(t+1)} = y_{n|i,j,k}^{(t+1)}$$

For the last step (4), D-R splitting-based update may also be used. For β, ½ is typically used.

$$z_{i|n,j,k}^{(t+1)} = \beta y_{n|i,j,k}^{(t+1)} + (1-\beta) z_{i|n,j,k}^{(t)} (0 \leq \beta \leq 1)$$

First Embodiment

«Model Generation Apparatus and Method»

In the following, an embodiment of a model generation apparatus and method is described.

Figure 3:
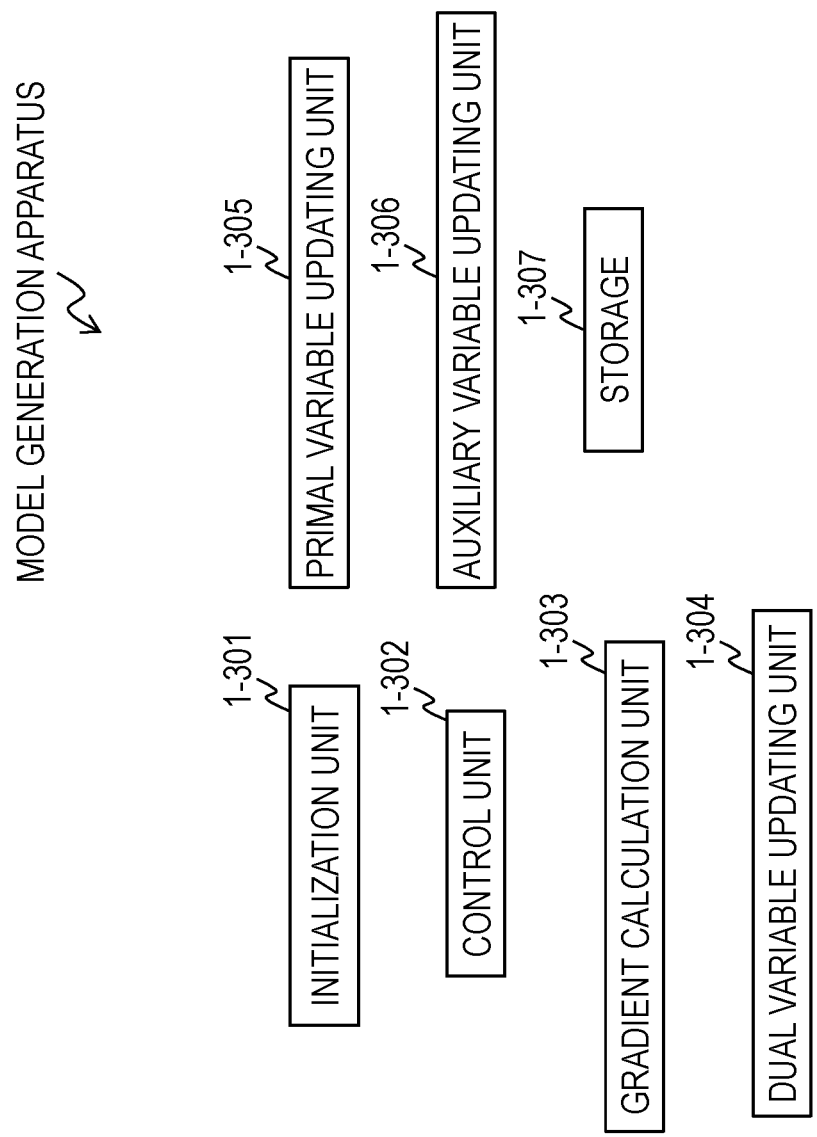
FIG. 3 is a block diagram for describing an example of a model generation apparatus.

The model generation apparatus includes, for example, an initialization unit 1-301, a control unit 1-302, a gradient calculation unit 1-303, a dual variable updating unit 1-304, a primal variable updating unit 1-305, an auxiliary variable updating unit 1-306, and a storage 1-307, as illustrated in FIG. 3.

It is assumed that data necessary for the processing and calculations described below is stored in the storage 1-307. The initialization unit 1-301, the control unit 1-302, the gradient calculation unit 1-303, the dual variable updating unit 1-304, the primal variable updating unit 1-305, the auxiliary variable updating unit 1-306, and the storage 1-307 perform the processing at steps S1 to S8 described below while writing data to the storage 1-307 as necessary.

Figure 4:
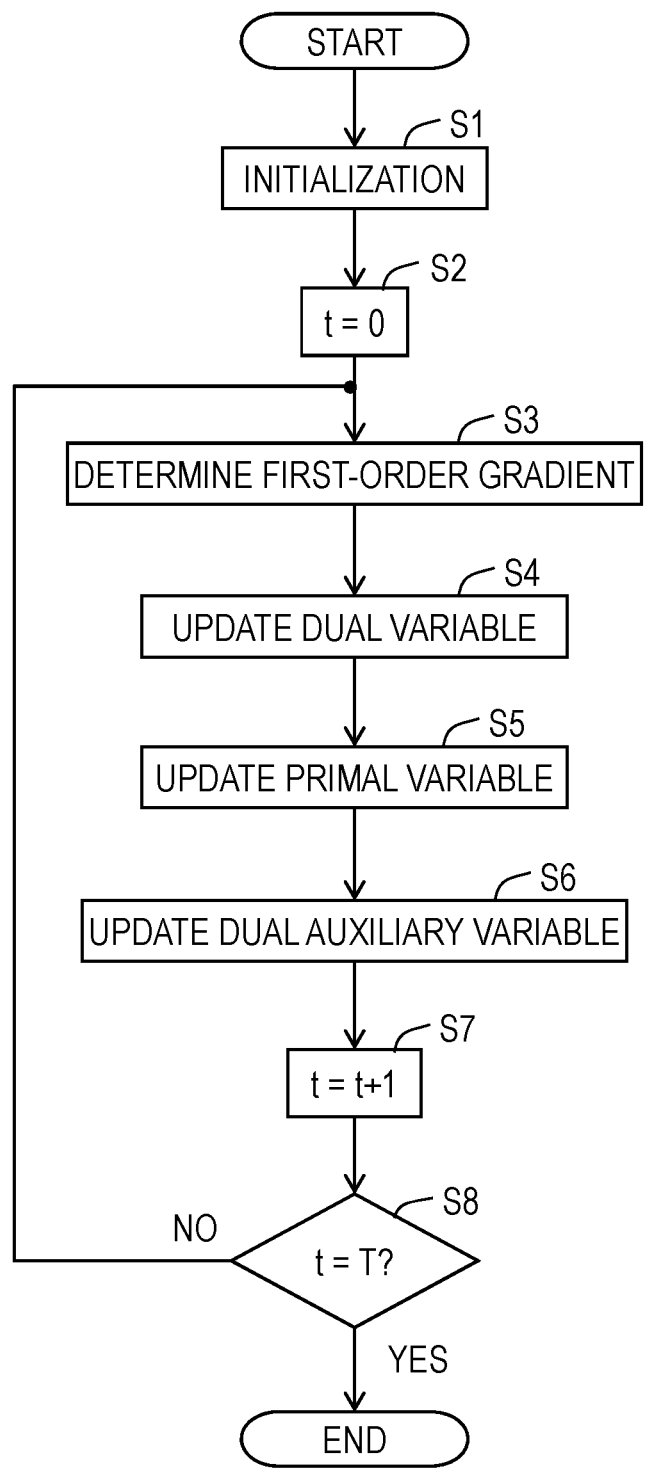
FIG. 4 is a flow diagram for describing an example of a model generation method.

The model generation method is implemented, for example, by the execution of the processing at steps S1 to S8 described in FIG. 4 and below by the components of the model generation apparatus.

For $^\forall i \in \sim I$, $^\forall j \in \sim J(i)$, $^\forall k \in \sim K(i,j)$, and $^\forall n \in \sim N(i,j)$, the initialization unit 1-301 initializes $w_{i,j,k}^{(0)}$ by an appropriate means such as an auto encoder. The initialization unit 1-301 also initializes $z_{i|,i,k}^{(0)}$ by setting it to $z_{i|,i,k}^{(0)}=0$, for example (step S1).

The control unit 1-302 sets t=0 (step S2).

For $^\forall i \in \sim I$, $^\forall j \in \sim J(i)$, and $^\forall k \in K(i,j)$, the gradient calculation unit 1-303 calculates a first-order gradient $\nabla E_i(w_{i,j,k}^{(t)})$ (step S3). The first-order gradient $\nabla E_i(w_{i,j,k}^{(t)})$ can be calculated using error backpropagation, probabilistic gradient descent, Adam, or AdaGrad, for example.

For $^\forall i \in \sim I$, $j \in \sim J(i)$, $k \in \sim K(i,j)$, and $^\forall n \in \sim N(i,j)$, the dual variable updating unit 1-304 calculates a dual variable $\lambda_{i|n,j,k}^{(t+1)}$ defined by the formula below (step S4).

$$\lambda_{i|n,j,k}^{(t+1)} = \left(\frac{1}{\sigma_1}I + \eta A_{i|n,j} A_{i|n,j}^T\right)^{-1} \left[A_{i|n,j}\left(w_{i,j,k}^{(t)} - \eta \nabla E_i\left(w_{i,j,k}^{(t)}\right)\right) + \frac{1}{\sigma_1} z_{i|n,j,k}^{(t)}\right]$$

For $^\forall i \in \sim I$, $j \in J(i)$, and $k \in \sim K(i,j)$, the primal variable updating unit 1-305 calculates a primal variable $w_{i,j,k}^{(t+1)}$ defined by the formula below (step S5).

$$w_{i,j,k}^{(t+1)} = w_{i,j,k}^{(t)} - \eta\left(\nabla E_i\left(w_{i,j,k}^{(t)}\right) + \sum_{n \in \tilde{N}(i,j)} A_{i|n,j}^T \lambda_{i|n,j,k}^{(t+1)}\right)$$

For $^\forall i \in \sim I$, $j \in \sim J(i)$, and $k \in \sim K(i,j)$, the auxiliary variable updating unit 1-306 calculates dual auxiliary variables $y_{i|n,j,k}^{(t+1)}$, $z_{i|n,j,k}^{(t+1)}$ defined by the formula below (step S6).

$$y_{i|n,j,k}^{(t+1)} = 2\lambda_{i|n,j,k}^{(t+1)} - z_{i|n,j,k}^{(t+1)},$$

$$z_{i|n,j,k}^{(t+1)} = y_{n|i,j,k}^{(t+1)}$$

The control unit 1-302 sets t=t+1 (step S7). That is, the control unit 1-302 increments t by one.

The control unit 1-302 determines whether t=T (step S8), and if t=T, ends the processing. If not t=T, it returns to the processing at step S3.

The above-described model generation apparatus can be summarized as follows.

Assume that I is a predetermined integer equal to or greater than 2, with i=1, . . . , I, and ~I={1, . . . , I}; the number of layers in the model i is J(i), with j=1, . . . , J(i), and ~J(i)={1, . . . , J(i)}; the number of nodes in the jth layer of the model i is K(i,j), with ~K(i,j)={k|1, . . . , K(i,j)}; ~N(i,j) is a set of the indices of models having constraint relationship with the jth layer of the model i; the primal variable after the tth update of the node k in the jth layer of the model i is $w_{i,j,k}^{(t)}$; the dual variable after the tth update of the node k in the jth layer of the model i with respect to the node k in the jth layer of the model n is $\lambda_{i|n,j,k}^{(t)}$; the dual auxiliary variables for $\lambda_{i|n,j,k}^{(t)}$ are $y_{i|n,j,k}^{(t)}$ and $z_{i|n,j,k}^{(t)}$; $E_i$, is the cost function of the model i; $\sigma_i$ is a predetermined positive number; η is a positive number; $A_{i|j}$ is defined by the formula below; I is an identity matrix; O is a zero matrix; and T is a positive number:

$$A_{i|n,j} = \begin{cases} I & (i > n, n \in \tilde{N}(i,j)) \\ -I & (i < n, n \in \tilde{N}(i,j)), \\ O & (\text{otherwise}) \end{cases}$$

The model generation apparatus includes: the initialization unit 1-301 for initializing $w_{i,j,k}^{(0)}$ and $z_{i|,i,k}^{(0)}$; the gradient calculation unit 1-303 for calculating the first-order gradient $\nabla E_i(w_{i,j,k}^{(t)})$ for $^\forall i \in \sim I$, $^\forall j \in \sim J(i)$, and $^\forall k \in \sim K(i,j)$ with t=0, . . . , T−1; the dual variable updating unit 1-304 for calculating the dual variable $\lambda_{i|n,j,k}^{(t+1)}$ defined by the formula below for $^\forall i \in \sim I$, $j \in \sim J(i)$, $k \in \sim K(i,j)$, and $^\forall n \in \sim N(i,j)$ with t=0, . . . , T−1:

$$\lambda_{i|n,j,k}^{(t+1)} = \left(\frac{1}{\sigma_1}I + \eta A_{i|n,j} A_{i|n,j}^T\right)^{-1} \left[A_{i|n,j}\left(w_{i,j,k}^{(t)} - \eta \nabla E_i\left(w_{i,j,k}^{(t)}\right)\right) + \frac{1}{\sigma_1} z_{i|n,j,k}^{(t)}\right];$$

the primal variable updating unit 1-305 for calculating the primal variable $w_{i,j,k}^{(t+1)}$ defined by the formula below for $^\forall i \in \sim I$, $j \in \sim J(i)$, and $k \in \sim K(i,j)$ with t=0, . . . , T−1:

$$w_{i,j,k}^{(t+1)} = w_{i,j,k}^{(t)} - \eta\left(\nabla E_i\left(w_{i,j,k}^{(t)}\right) + \sum_{n \in \tilde{N}(i,j)} A_{i|n,j}^T \lambda_{i|n,j,k}^{(t+1)}\right);$$

and the auxiliary variable updating unit 1-306 for calculating the dual auxiliary variables $y_{i|n,j,k}^{(t+1)}$, $z_{i|n,j,k}^{(t+1)}$ defined by the formulas below for $\forall i \in \sim I$, $j \in \sim J(i)$, and $k \in \sim K(i,j)$ with $t=0, \ldots, T-1$:

$$y_{i|n,j,k}^{(t+1)} = 2\lambda_{i|n,j,k}^{(t+1)} - z_{i|n,j,k}^{(t+1)},$$

$$z_{i|n,j,k}^{(t+1)} = y_{n|i,j,k}^{(t+1)}.$$

The initialization unit 1-301, the control unit 1-302, the gradient calculation unit 1-303, the dual variable updating unit 1-304, the primal variable updating unit 1-305, the auxiliary variable updating unit 1-306, and the storage 1-307 need not be implemented on the same computer; they may be implemented on multiple computers. In that case, the initialization unit 1-301, the control unit 1-302, the gradient calculation unit 1-303, the dual variable updating unit 1-304, the primal variable updating unit 1-305, the auxiliary variable updating unit 1-306, and the storage 1-307 implemented on multiple different computers send and receive data as necessary to perform the processing described above.

In the following description, a layer for which some or all of the model variables are equivalent or common will be called a "shared layer". That is, a "shared layer" is a layer for which at least some of the model variables are shared among multiple models. By contrast, a layer for which the model variables are not equivalent nor common is called an "unshared layer". That is, an "unshared layer" is a layer for which the model variables are not shared by the multiple models.

In the embodiment above, the auxiliary variable updating unit 1-306 performs the processing of $z_{i|n,j,k}^{(t+1)} = y_{n|i,j,k}^{(t+1)}$, in other words, processing such that the dual auxiliary variable $y_{n|n,j,k}^{(t+1)}$ of the dual variable $\lambda_{n|n,j,k}^{(t)}$ after the t+1th update of the node k in the jth layer of the model n with respect to the node k in the jth layer of the model i is set as the dual auxiliary variable $z_{i|n,j,k}^{(t+1)}$ of the dual variable $\lambda_{i|n,j,k}^{(t)}$ after the t+1th update of the node k in the jth layer of the model i with respect to the node k in the jth layer of the model n. As a result, the primal variables of the multiple models (that is, the model variables) calculated by the primal variable updating unit 1-305 approach the same value.

Since the dual auxiliary variables are intermediate products from the updating of the model variables, the dual auxiliary variables can also be regarded as part of the model variables. That is, it can be said that a shared layer performs updating of the model variables including exchanging of some or all of the model variables between corresponding layers of the multiple models.

«Neural Network Computation System and Method»

An embodiment of the neural network computation system and method is described below.

Figure 5:
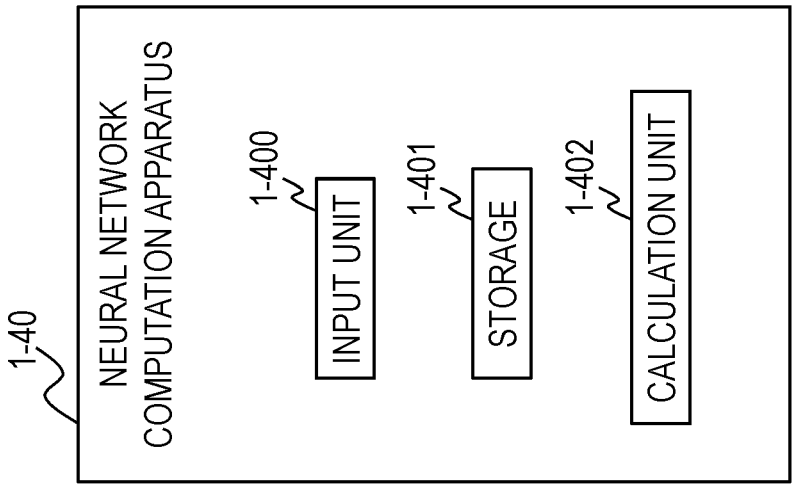
FIG. 5 is a block diagram for describing an example of a neural network computation system.

The neural network computation system includes, for example, a neural network computation apparatus 1-40 which performs neural network computations based on at least one of multiple models, as shown in FIG. 5. In the example of FIG. 5, the neural network computation system includes a single neural network computation apparatus 1-40, but the neural network computation system may include multiple neural network computation apparatuses 1-40 as mentioned later.

The neural network computation method is implemented by the execution of neural network computations based on at least one of multiple models by the neural network computation apparatus 1-40.

Here, it is assumed that some or all of the multiple models include at least one layer for which some or all of the model variables are equivalent or common and also include at least one layer for which the model variables are not equivalent nor common. That is, some or all of the multiple models include at least one layer which shares at least some of the model variables and also include at least one layer which does not share the model variables. Such at least one layer included in some or all of the multiple models for which some or all of the model variables are equivalent or common can be generated by the above-described model generation apparatus and method.

Also, the at least one layer for which some or all of the model variables are equivalent or common may be an input layer or multiple consecutive layers including the input layer.

Also, a same one layer may be used in the multiple models. That is, a layer itself may be shared among the multiple models.

The neural network computation apparatus 1-40 includes an input unit 1-400 to which input data x is input, a storage 1-401 storing multiple models generated by the model generation apparatus and method, and a calculation unit 1-402 for performing neural network computations based on the input data x input to the input unit 1-400 and any model read from the storage 1-401.

Here, "neural network computation" refers to obtaining at least output for at least one layer of the multiple models. For example, neural network computation is obtaining output ˆS for at least one of the multiple models using model variables that have been learned by all of the layers of the multiple models. As another example, neural network computation is obtaining the output ˆS for at least one of the multiple models during online learning, that is, while learning model variables by the above-described model generation apparatus and method in at least one layer of the multiple models. Note that neural network computation also includes obtaining an output for at least one layer contained in a model, rather than the final output ˆS of the model.

Figure 6:
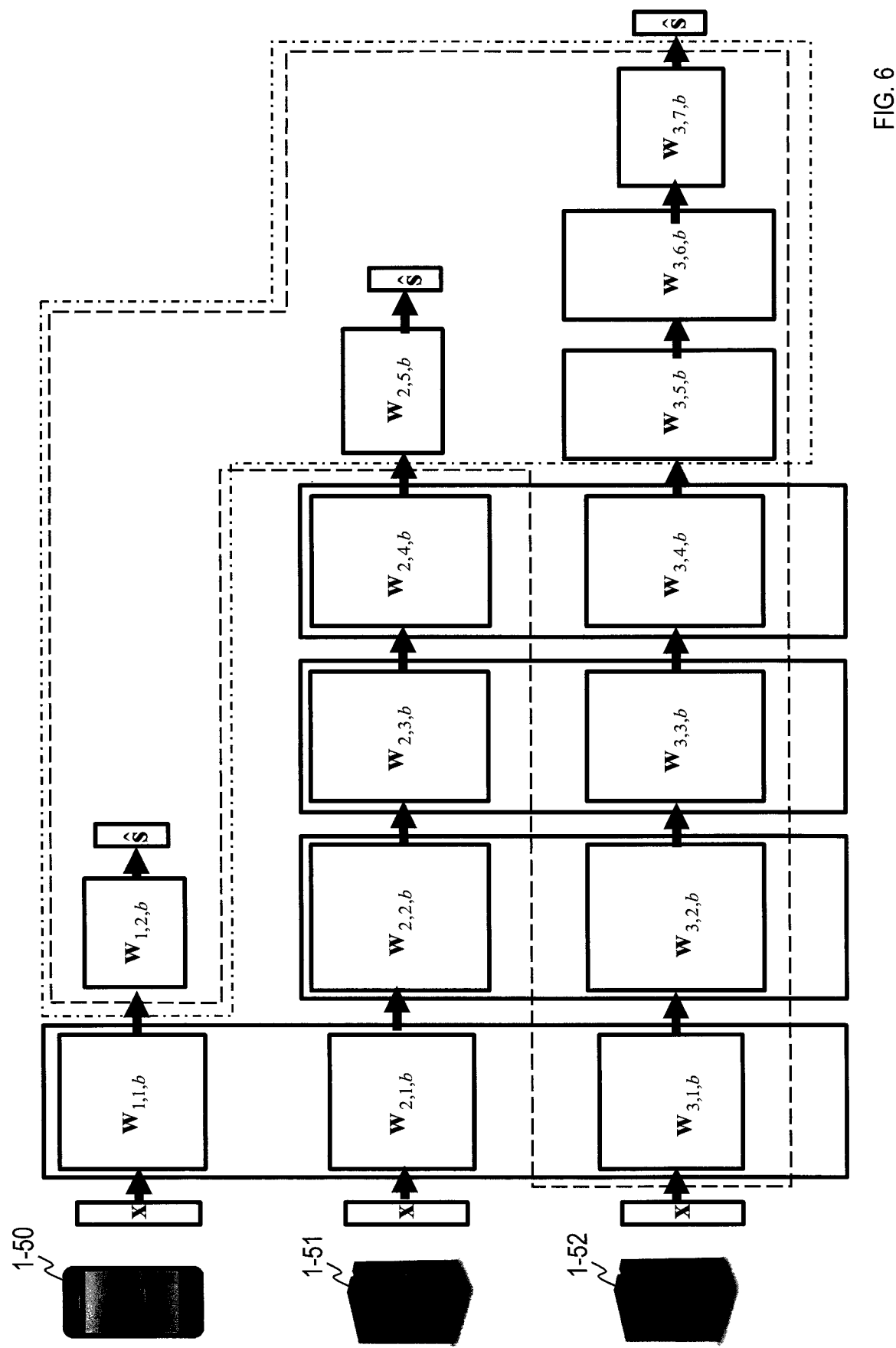
FIG. 6 is a diagram for describing an example of the neural network computation system and method.

The example of FIG. 6 assumes that three models exist. A first model is a low computation model for a neural network formed of two layers, a second model is a middle computation model for a neural network formed of five layers, and a third model is a high computation model for a neural network formed of seven layers. Assume also that the model variables of the first layer are equivalent among all the models, and the model variables of the second to the fourth layer are equivalent between the second model and the third model. That is, the three models in the example of FIG. 6 can be constructed by simultaneously or previously generating model variables of layers that are equivalent among multiple models (the layers in the portions surrounded by solid lines in FIG. 6) by the above-described model generation apparatus and method, and simultaneously or previously learning model variables of layers that are independent among the models (the layers in the portions surrounded by a dot-dashed line in FIG. 6) for each model. In other words, such a model can be constructed if the model variables in the portions surrounded by broken line in FIG. 6 are available.

In the example of FIG. 6, the neural network computation system includes an information portable terminal 1-50, a server 1-51, and a server 1-52. Each of the information portable terminal 1-50, the server 1-51, and the server 1-52 is the neural network computation apparatus 1-40. For the computing powers of the information portable terminal 1-50, the server 1-51, and the server 1-52, there is a relationship: the computing power of the information portable terminal 1-50<the computing power of the server 1-51<the computing power of the server 1-52.

As the information portable terminal 1-50 has low computing power, it performs computation based on the low computation model. As the server 1-51 has middle computing power, it performs computation based on the middle computation model. By doing so, computation results of higher accuracy can be acquired than when computation is performed with the low computation model. As the server 1-52 has high computing power, it performs computation based on the high computation model. By doing so, computation results of higher accuracy can be acquired than when computation is performed with the low or middle computation model.

In this manner, when some or all of the multiple models include at least one layer for which some or all of the model variables are equivalent or common, it can achieve a scalable DNN that can perform computation in conformance to the computing power of the neural network computation apparatus. For layers for which some or all of the model variables contained in the multiple models are equivalent or common, a scalable DNN with the multiple models contained therein more optimized can be achieved by operating the DNN while generating the model variables with the above-described model generation apparatus and method or previously generating the model variables with the above-described model generation apparatus and method.

In this manner, multiple models may be DNNs having the same task and being different in the number of layers from each other.

Figure 7:
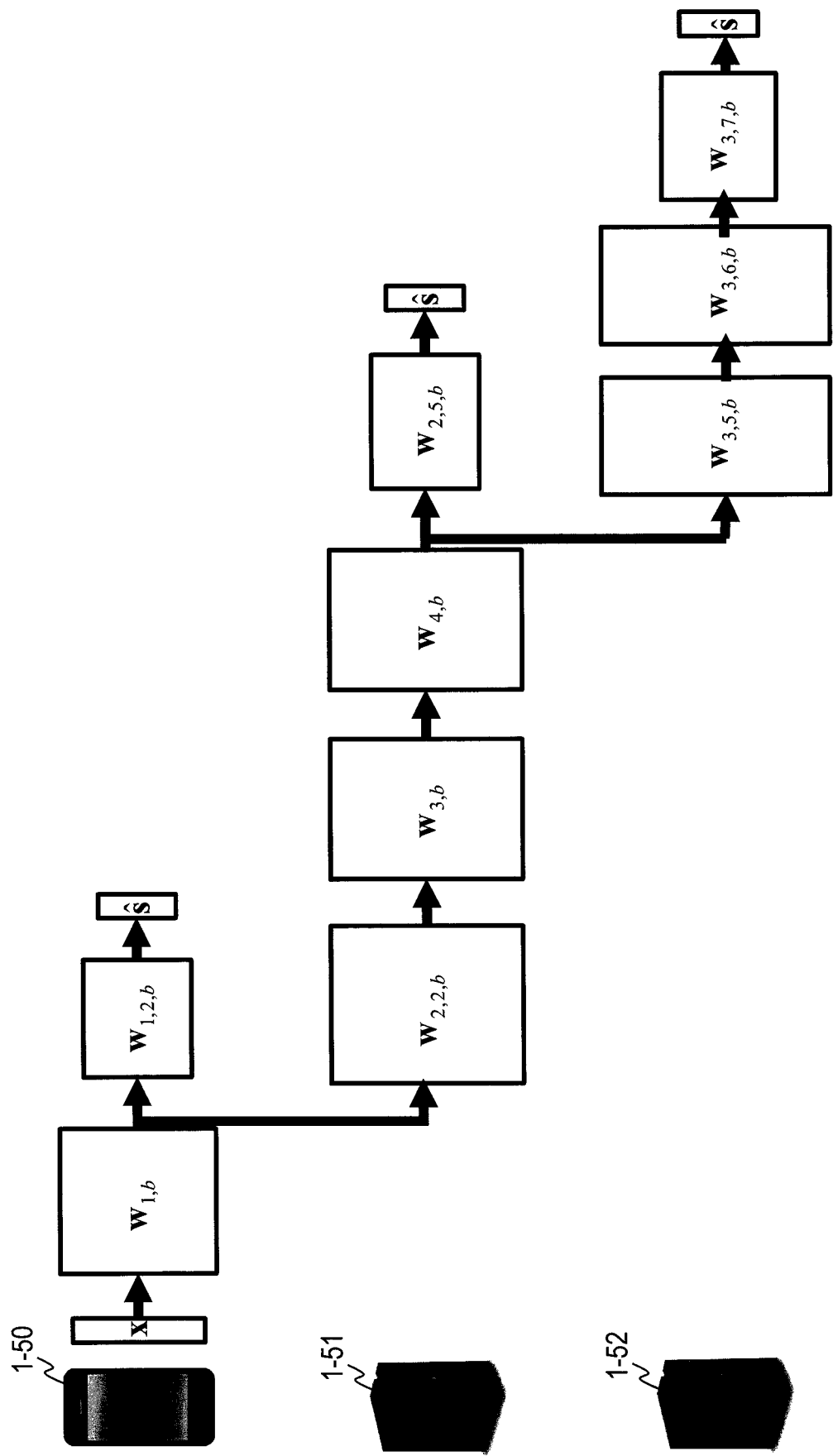
FIG. 7 is a diagram for describing an example of the neural network computation system and method.

One neural network computation apparatus may perform computations up to any layer of a certain model and send the computation results to another neural network computation apparatus, and the other neural network computation apparatus may perform the computation for the model by performing computations after that layer using the received computation results. For example, in a neural network corresponding to the three models in the example of FIG. 6, the information portable terminal 1-50 may perform the computations for the first model formed of two layers in the example of FIG. 6 and send the computation results of the first layer, which is equivalent among all the models in the example of FIG. 6, to the server 1-51, the server 1-51 may perform the computations for the remaining four layers of the second model in the example of FIG. 6 using the received computation results for the first layer and send the computation results for the fourth layer, which is equivalent between the second model and the third model in the example of FIG. 6, to the server 1-52, and the server 1-52 may perform the computations for the remaining three layers of the third model in the example of FIG. 6 using the received computation results for the fourth layer, as shown in the example of FIG. 7.

Figure 8:
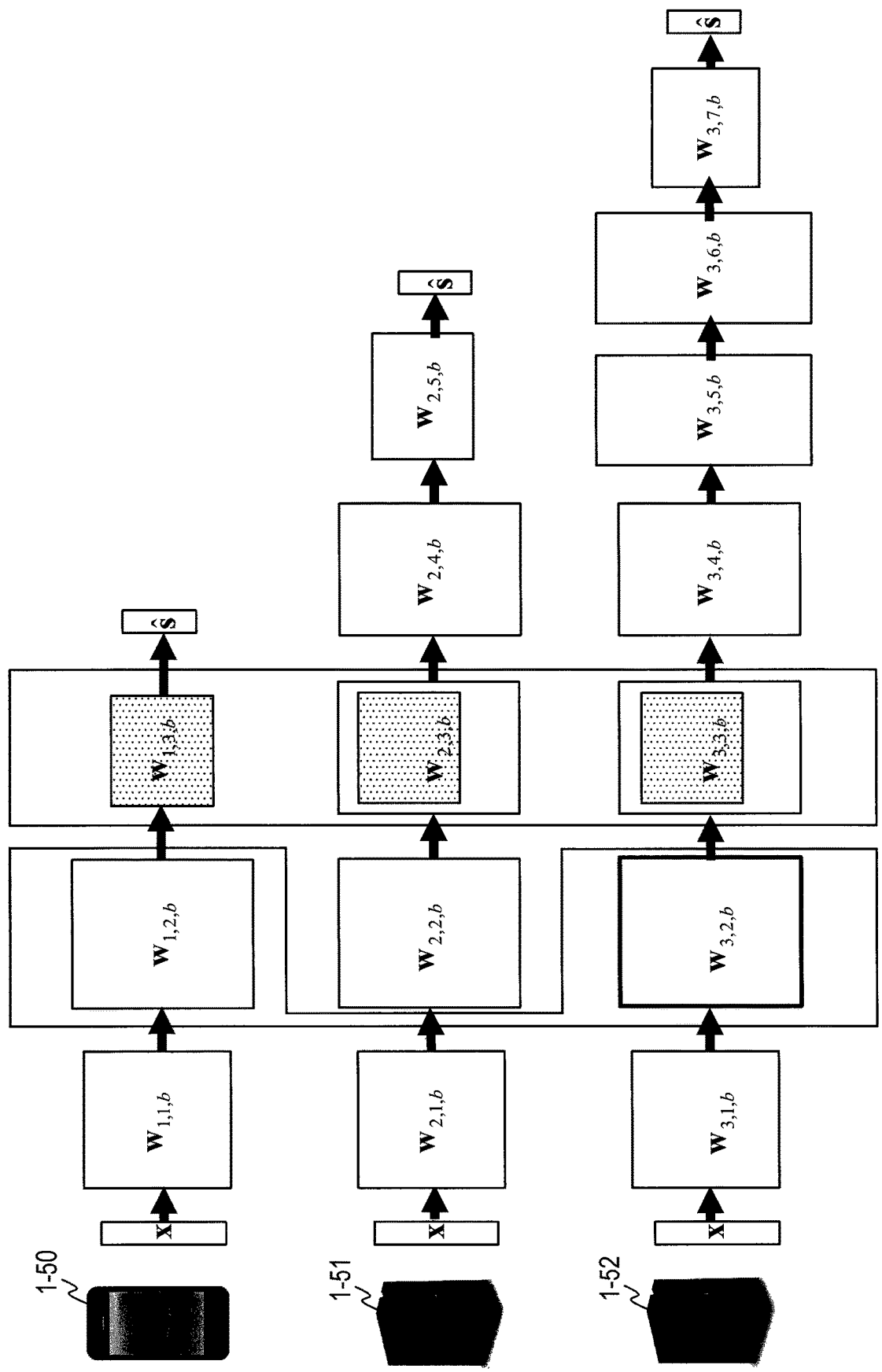
FIG. 8 is a diagram for describing an example of the neural network computation system and method.

It is not essential that model variables of one or consecutive multiple layers including the input layer are equivalent among multiple models as in the example of FIG. 6; the model variables of the input layer may not be equivalent among the multiple models as in FIG. 8, for example.

Also, as illustrated in FIG. 8, some of the multiple models may include layers for which all of the model variables are common. In the example of FIG. 8, the model variables of the second layer of the first model and the model variables of the second layer of the second model are common.

Also as illustrated in FIG. 8, all of the multiple models may include layers for which some of the model variables are common. In the example of FIG. 8, all or some of the model variables of the third layers of all the models (the portions filled with dots) are common.

Figure 9:
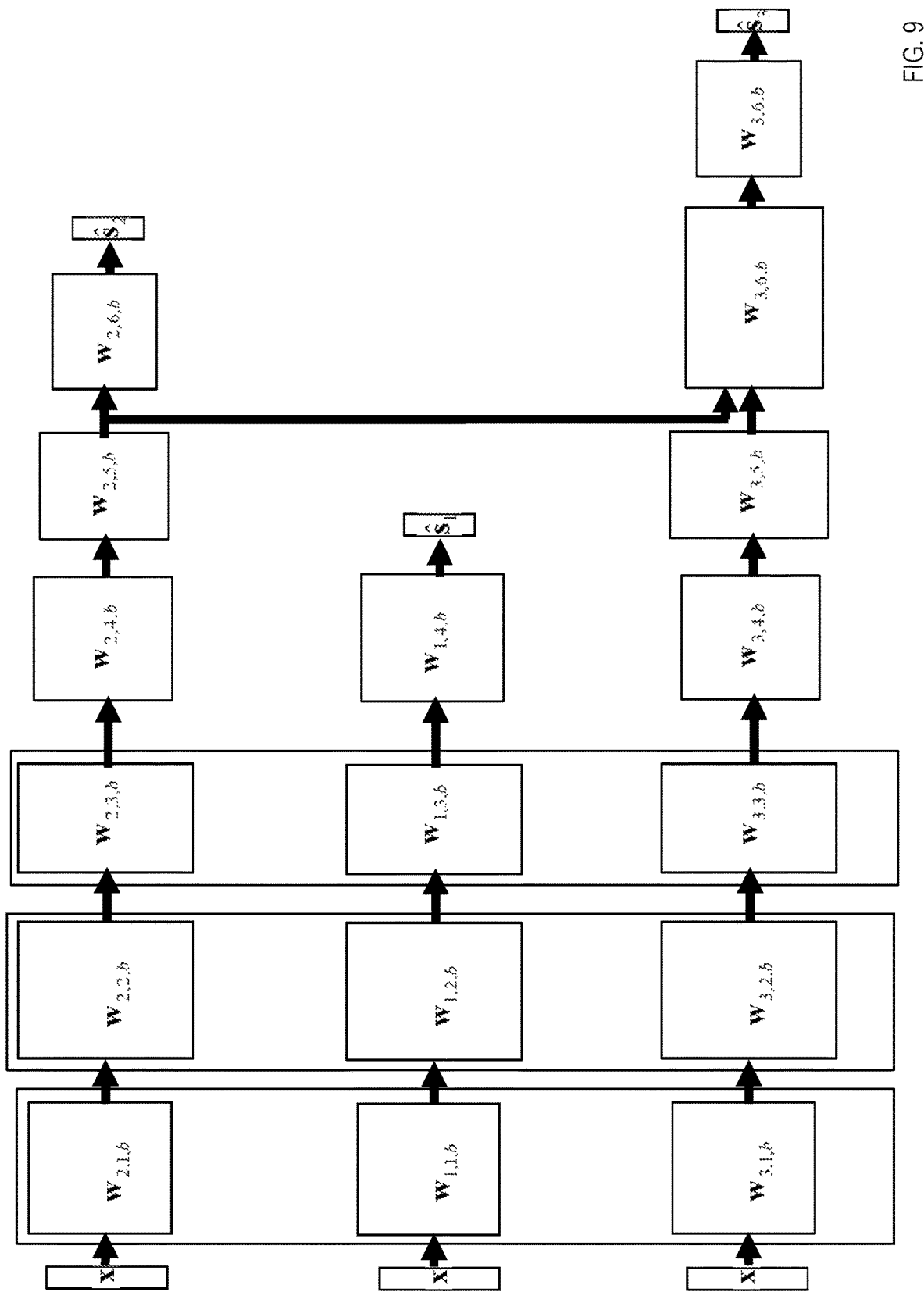
FIG. 9 is a diagram for describing an example of the neural network computation system and method.

The multiple models may also be tasks that are relevant but different from each other. For example, the outputs of the multiple models above may be different from each other. In the example of FIG. 9, three models exist, where the output of the first model (the middle model) is output $\hat{S}_1$, which is text of a recognition result for input speech, for example, the output of the second model (the topmost model) is output $\hat{S}_2$, which is text of a response corresponding to the input speech, for example, and the computation result of the neural network based on the third model (the bottom model) is output $\hat{S}_3$, which is a robot motion corresponding to the input speech. In the example of FIG. 9, the multiple models are different tasks from each other but they are related to the task of "acquiring some output related to the utterance content of the input speech", so that the model variables of the first to the third layers are made equivalent among all the models. With such a configuration, even for multiple models with different tasks, if they include layers for which some or all of the model variables are equivalent or common, a multi-task DNN with the multiple models contained therein more optimized can be achieved by operating the DNN while generating the model variables with the above-described model generation apparatus and method or previously generating the model variables with the above-described model generation apparatus and method for those layers.

Figure 10:
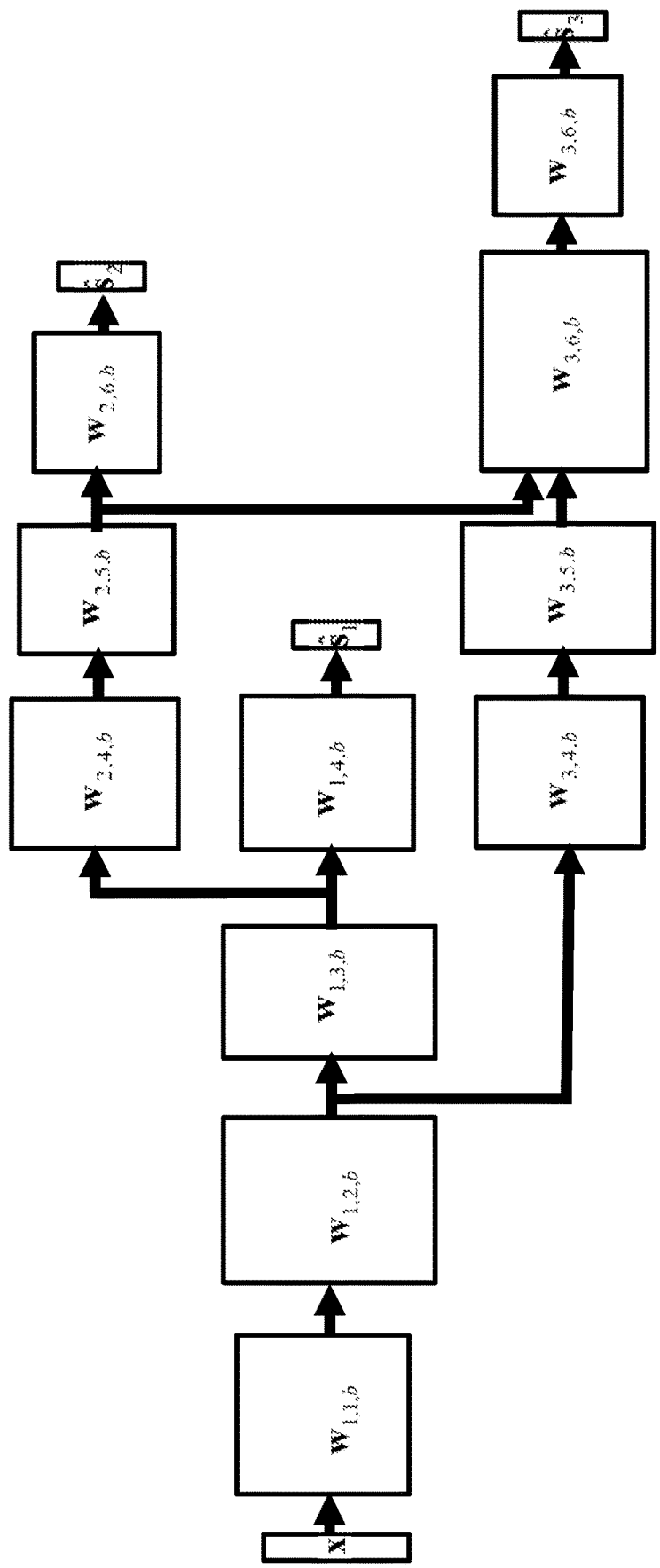
FIG. 10 is a diagram for describing an example of the neural network computation system and method.

Also, for the layers of the three models for which the model variables are equivalent in the example of FIG. 9, at least one model may compute the model variables for that layer and send the computation result to another model, which may then use the received result without computing the model variables for that layer, as shown in FIG. 10.

In a situation where such multiple related tasks exist and probably there is some information connection among them, it has conventionally been impossible to generate models in which the model variables of some layers are equivalent or common.

With the above-described model generation apparatus and method, such a multi-task DNN can be achieved.

Although FIG. 9 shows speech processing as an example, a multi-task DNN can be used for other kinds of processing, such as image processing, when multiple related tasks exist and there is some information connection among them.

«Neural Network System and Method»

Figure 11:
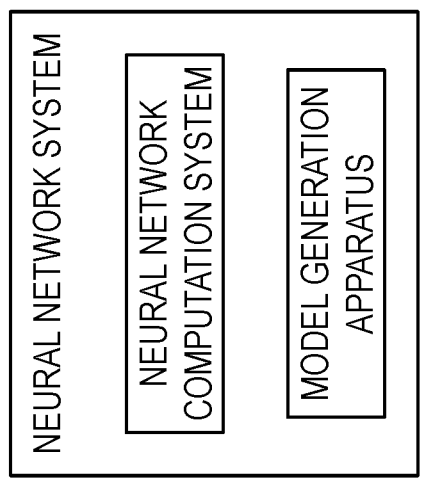
FIG. 11 is a block diagram for describing an example of a neural network system.
Figure 12:
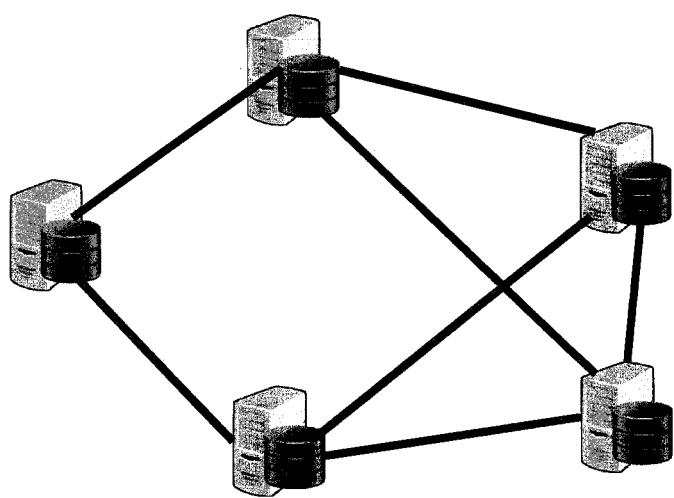
FIG. 12 shows an example of edge computing.
Figure 13A:
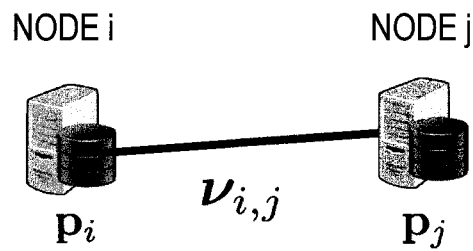
FIG. 13A shows how lifting of a dual variable is performed.
Figure 13B:
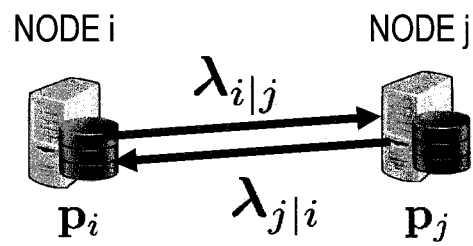
FIG. 13B shows how lifting of a dual variable is performed.

The neural network system is a system that includes at least one of the model generation apparatus and the neural network computation system discussed above, as shown in FIG. 11, for example.

That is, the neural network system and method includes multiple models. Each of these multiple models is in turn a DNN including multiple layers, and some or all of the multiple models include at least one layer for which some or all of the model variables are equivalent or common and also include at least one layer for which the model variables are not equivalent nor common. In other words, each one of the multiple models is a DNN including multiple layers, and some or all of the multiple models include at least one layer which shares at least some of the model variables and also include at least one layer which does not share the model variables.

«Programs and Recording Media»

The neural network system, the model generation apparatus, or the neural network computation system may be embodied by one computer. In this case, processing details of functions to be provided by the model generation apparatus or the neural network computation system are described by a program. By the program then being executed on the computer, the processing of the machine learning system is embodied on the computer.

The program describing the processing details can be recorded on a computer-readable recording medium. The computer-readable recording medium may be any kind, such as a magnetic recording device, an optical disk, a magneto-optical recording medium, or a semiconductor memory.

Processing by the units may be configured by executing a predetermined program on a computer or at least part of the processing may be embodied with hardware.

Second and third embodiments as embodiments of the present invention are now described in detail. Components having the same functionality are given the same reference characters and overlapping descriptions are omitted.

Before describing the embodiments, notation used in the present specification is described.

The symbol "_" (an underscore) represents a subscript. For example, $x^{y\_z}$ means that $y_z$ is a superscript to x, and $x_{y\_z}$ means that $y_z$ is a subscript to x.

TECHNICAL BACKGROUND

The present application uses a Bregman Resolvent operator or a Bregman Cayley operator, instead of using the Resolvent operator or the Cayley operator. That is, it configures a variable update rule based on monotone operator splitting with the Bregman Resolvent operator or the Bregman Cayley operator. This is described in more detail below.

«1: Definitions of Bregman Resolvent Operator and Bregman Cayley Operator»

First, Bregman divergence B is discussed. The Bregman divergence B is defined as shown below using a strictly convex function D, which is continuous and differentiable (hereinafter, a continuous and differentiable strictly convex function will be just called a strictly convex function).

$$B(w\|z) = D(w) - D(z) - \langle \partial D(z), w-z \rangle \quad (4\text{-}1)$$

The function D can be any strictly convex function. Euclidean distance is also a kind of Bregman divergence. For explicitly showing that the Bregman divergence B is defined using the function D, it is sometimes denoted as Bregman divergence $B_D$.

The strictly convex function D is a function having a sort of continuity. Specifically, the strictly convex function D has the properties of strong convex (SC) and Lipschitz smooth (LS). These properties can be represented as follows.

(Property 1) Using second-order Taylor expansion, the approximate formula below holds around a point w for the function D.

$$D(w+\delta) = D(w) + \langle \partial D(w), \delta \rangle + \frac{1}{2}\langle H_D(w)\delta, \delta \rangle + o(\|\delta\|_2^2) \quad (4\text{-}2)$$

$$(\delta \to 0)$$

Here, the Hessian matrix $H_D(w)$ ($H_D(w) \in R^{m \times m}$) is a positive definite matrix.

$$O \prec H_D(w) \prec +\infty$$

For matrices A, B, the formula below indicates that matrix B-A is positive definite.

$$A \prec B$$

(Property 2) The LS (upper bound) and SC (lower bound) of the function D can be represented as below using an arbitrary vector $h \in R^m$.

$$D(w) + \langle \partial D(w), h \rangle + \frac{1}{2}\langle K_D h, h \rangle \leq D(w+h) \quad (4\text{-}3)$$

$$D(w+h) \leq D(w) + \langle \partial D(w), h \rangle + \frac{1}{2}\langle M_D h, h \rangle \quad (4\text{-}4)$$

Here, the Hessian matrices $K_D$, $M_D$ ($K_D \in R^{m \times m}$, $M_D \in R^{m \times m}$) are positive definite matrices. With the Hessian matrix $H_D(w)$, the following relationship holds.

$$O \prec K_D \preceq H_D(w) \preceq M_D \prec +\infty$$

Next, using the Bregman divergence, the Resolvent operator and the Cayley operator are generalized. The generalized Resolvent operator and the generalized Cayley operator are respectively called Bregman Resolvent operator and Bregman Cayley operator. For the Bregman Resolvent operator, description can be found in Reference Non-patent Literature 2-2.

(Reference Non-patent Literature 2-2: H. H. Bauschke, J. M. Borwein, and P. L. Combettes, "Bregman Monotone Optimization Algorithms", SIAM Journal on Control and Optimization, Vol. 42, Issue 2, pp. 596-636, 2003.)

A Bregman Resolvent operator $R_n$, and a Bregman Cayley operator $C_n$ are given by the formulas below.

$$R_n = (\partial D + \partial G_n)^{-1} \partial D$$

$$C_n = 2R_n - I$$

Defining the function D with squared $L_2$ norm as below, the Bregman divergence B corresponds to Euclidean distance, and the Bregman Resolvent operator $R_n$ and the Bregman Cayley operator $C_n$ respectively correspond to the Resolvent operator $\Omega_n$ and the Cayley operator $\Psi_n$. This will be described more specifically. The subdifferential of the function D will be:

$$D(w) = \frac{1}{2\kappa}\|w\|_2^2$$

$$\partial D = \frac{1}{\kappa}I.$$

Substituting the subdifferential of the function D into the Bregman Resolvent operator $R_n$ and the Bregman Cayley operator $C_n$ gives the Resolvent operator $\Omega_n$ and the Cayley operator $\Psi_n$, respectively.

$$R_n = (\partial D + \partial G_n)^{-1} \partial D = \left(\frac{1}{\kappa}(I + \kappa \partial G_n)\right)^{-1} \frac{1}{\kappa}I = (I + \kappa \partial G_n)^{-1} = \Omega_n$$

$$C_n = 2R_n - I = 2\Omega_n - I = \Psi_n$$

«2: Convergence Rates of Bregman Resolvent Operator and Bregman Cayley Operator»

Here, two cases are described regarding the convergence rates of the Bregman Resolvent operator and the Bregman Cayley operator.

[Case 1]: A function $G_1$ is a strictly convex function, that is, strong convex (SC) and Lipschitz smooth (LS).

Then, the following properties hold as mentioned earlier.

(Property 1) Using second-order Taylor expansion, the approximate formula below holds around a point w for the function $G_1$.

$$G_1(w+\delta) = G_1(w) + \langle \partial G_1(w), \delta \rangle + \frac{1}{2}\langle H_{G_1}(w)\delta, \delta \rangle + o(\|\delta\|_2^2) \quad (4\text{-}5)$$

$$(\delta \to 0)$$

(Property 2) The LS (upper bound) and SC (lower bound) of the function $G_1$ can be represented as below using an arbitrary vector $h \in R^m$.

$$G_1(w) + \langle \partial G_1(w), h \rangle + \frac{1}{2}\langle K_{G_1} h, h \rangle \leq G_1(w+h) \quad (4\text{-}6)$$

$$G_1(w+h) \leq G_1(w) + \langle \partial G_1(w), h \rangle + \frac{1}{2}\langle M_{G_1} h, h \rangle \quad (4\text{-}7)$$

Here, the Hessian matrices $H_{G\_1}$ (w), $K_{G\_1}$, $M_{G\_1}$ have the following relationship.

$$0 \prec K_{G_1} \preceq H_{G_1}(w) \preceq M_{G_1} \prec +\infty$$

Using these two properties, Theorem 1 and Theorem 2 below can be proved.

(Theorem 1) When the function $G_i$ is both SC and LS, the Bregman Resolvent operator $R_1$ has the following convergence rate.

$$\frac{1}{1+\sigma_{max,1}} \|z^t - z^{t-1}\|_2 \leq \quad (4\text{-}8)$$

$$\|R_1(z^t) - R_1(z^{t-1})\|_2 \leq \frac{1}{1+\sigma_{min,1}} \|z^t - z^{t-1}\|_2$$

The coefficients $\sigma_{max,1}$, $\sigma_{min,1}$ contained in Formula (4-8) are given by the formulas below. Here, $\Lambda_{max}$ represents the maximum eigenvalue and $\Lambda_{min}$ represents the minimum eigenvalue.

$$\sigma_{max,1} = \Lambda_{max}(K_D^{-1} M_{G_1}) \quad (4\text{-}9)$$

$$\sigma_{min,1} = \Lambda_{min}(M_D^{-1} K_{G_1}) \quad (4\text{-}9)$$

For the strictly convex function D, one that satisfies the following condition is used.

$$0 < \sigma_{min,1} \leq \sigma_{max,1} \leq 1 \quad (4\text{-}11)$$

(Theorem 2) When the function $G_i$ is both SC and LS, the Bregman Cayley operator $C_1$ has the following convergence rate.

$$\|C_1(z^t) - C_1(z^{t-1})\|_2^2 \leq \eta_1 \|z^t - z^{t-1}\|_2^2 \quad (4\text{-}12)$$

The coefficient $\eta_1$ contained in Formula (4-12) is given by the formula below.

$$\eta_1 = 1 - \frac{4\sigma_{min,1}}{(1+\sigma_{max,1})^2} \quad (4\text{-}13)$$

The coefficients $\sigma_{max,1}$, $\sigma_{min,1}$ are respectively given by Formula (4-9) and Formula (4-10).

[Case 2]: The functions $G_1$, $G_2$ are both strictly convex functions, that is, both are strong convex (SC) and Lipschitz smooth (LS).

For the function $G_1$, the properties 1 and 2 represented by Formulas (4-5) to (4-7) hold. Similarly, for the function $G_2$, the properties 1 and 2 represented by Formulas (4-14) to (4-16) hold.

(Property 1) Using second-order Taylor expansion, the approximate formula below holds around a point w for the function $G_2$.

$$G_2(w+\delta) = G_2(w) + \langle \partial G_2(w), \delta \rangle + \frac{1}{2}\langle H_{G_2}(w)\delta, \delta \rangle + o(\|\delta\|_2^2) \quad (4\text{-}14)$$

$$(\delta \to 0)$$

(Property 2) The LS (upper bound) and SC (lower bound) of the function $G_2$ can be represented as below using an arbitrary vector $h \in R^m$.

$$G_2(w) + \langle \partial G_2(w), h \rangle + \frac{1}{2}\langle K_{G_2} h, h \rangle \leq G_2(w+h) \quad (4\text{-}15)$$

$$G_2(w+h) \leq G_2(w) + \langle \partial G_2(w), h \rangle + \frac{1}{2}\langle M_{G_2} h, h \rangle \quad (4\text{-}16)$$

Here, the Hessian matrices $H_{G\_2}$ (w), $K_{G\_2}$, $M_{G\_2}$ have the following relationship.

$$0 \prec K_{G_2} \preceq H_{G_2}(w) \preceq M_{G_2} \prec +\infty$$

A theorem similar to Theorem 1 and Theorem 2, which hold for the function $G_1$, also holds for the function $G_2$.

(Theorem 3) When the function $G_2$ is both SC and LS, the Bregman Resolvent operator $R_2$ has the following convergence rate.

$$\frac{1}{1+\sigma_{max,2}} \|x^t - x^{t-1}\|_2 \leq \quad (4\text{-}17)$$

$$\|R_2(x^t) - R_2(x^{t-1})\|_2 \leq \frac{1}{1+\sigma_{min,2}} \|x^t - x^{t-1}\|_2$$

The coefficients $\sigma_{max,2}$, $\sigma_{min,2}$ contained in Formula (4-17) are given by the formulas below.

$$\sigma_{max,2} = \Lambda_{max}(K_D^{-1} M_{G_2}) \quad (4\text{-}18)$$

$$\sigma_{min,2} = \Lambda_{min}(M_D^{-1} K_{G_2}) \quad (4\text{-}19)$$

For the strictly convex function D, one that satisfies the following condition is used.

$$0 < \sigma_{min,2} \leq \sigma_{max,2} \leq 1$$

(Theorem 4) When the function $G_2$ is both SC and LS, the Bregman Cayley operator $C_2$ has the following convergence rate.

$$\|C_2(x^t) - C_2(x^{t-1})\|_2^2 \leq \eta_2 \|x^t - x^{t-1}\|_2^2 \quad (4\text{-}20)$$

The coefficient 12 contained in Formula (4-20) is given by the formula below.

$$\eta_2 = 1 - \frac{4\sigma_{min,2}}{(1+\sigma_{max,2})^2} \quad (4\text{-}21)$$

The coefficients $\sigma_{max,2}$, $\sigma_{min,2}$ are respectively given by Formula (4-18) and Formula (4-19).

«3: Variable Update Rules of Generalized P-R Operator Splitting and Generalized D-R Operator Splitting and their Convergence Rates»

By transforming Formula (1-2) using the Bregman Resolvent operator and the Bregman Cayley operator, P-R operator splitting and D-R operator splitting are derived. The P-R operator splitting and D-R operator splitting described herein correspond to generalization of P-R operator splitting and D-R operator splitting by means of Bregman divergence. In the following, they will be respectively called generalized P-R operator splitting and generalized D-R operator splitting.

[Generalized P-R Operator Splitting]

Formula (1-2) is transformed in the following manner.

$$0 \in \partial G_1(w) + \partial G_2(w)$$

$$0 \in (\partial D + \partial G_2)(w) - (\partial D - \partial G_1)(w)$$

$$0 \in \partial D^{-1}(\partial D + \partial G_2)(w) - \partial D^{-1}(2\partial D - (\partial D + \partial G_1))(w)$$

$$0 \in \partial D^{-1}(\partial D + \partial G_2)(w) - \{2(\partial D + \partial G_1)^{-1} \partial D - I\} \partial D^{-1}(\partial D + \partial G_1)(w) \quad (1\text{-}2)$$

Here, an auxiliary variable z ($z \in R^m$) for w ($w \in R^m$) having the relationship below is introduced.

$$w \in R_1(z)$$

This is further transformed with the variable z.

$$0 \in \partial D^{-1}(\partial D + \partial G_2) R_1(z) - C_1(z)$$
$$0 \in R_1(z) - R_2 C_1(z)$$
$$0 \in \frac{1}{2}(C_1 + I)(z) - \frac{1}{2}(C_2 + I) C_1(z)$$
$$0 \in z - C_2 C_1(z)$$

This provides generalized P-R operator splitting as shown below.

$$z \in C_2 C_1(z) \quad (4\text{-}22)$$

From Formula (4-22) and Formula (3-1), it can be seen that Formula (3-1) with its Cayley operator replaced with the Bregman Cayley operator represents Formula (4-22).

The variable update rule for generalized P-R operator splitting is obtained by decomposing Formula (4-22) with the auxiliary variables x, y, z ($x \in R^m$, $y \in R^m$, $z \in R^m$) for w ($\in R^m$).

$$w^{t+1} = R_1(z^t) = (\partial D + \partial G_1)^{-1} \partial D(z^t) \quad (4\text{-}23)$$

$$x^{t+1} = C_1(z^t) = (2R_1 - I)(z^t) = 2w^{t+1} - z^t \quad (4\text{-}24)$$

$$y^{t+1} = R_2(x^{t+1}) = (\partial D + \partial G_2)^{-1} \partial D(x^{t+1}) \quad (4\text{-}25)$$

$$z^{t+1} = C_2(x^{t+1}) = (2R_2 - I)(x^{t+1}) = 2y^{t+1} - x^{t+1} \quad (4\text{-}26)$$

The operation of Formula (4-23) is substantiated. Specifically, it is transformed as follows.

$$(\partial D + \partial G_1)(w) \in \partial D(z)$$

$$0 \in \partial G_1(w) + \partial D(w) - \partial D(z)$$

Further rendering it into integral form gives the following.

$$w^{t+1} = \arg\min_w (G_1(w) + B(w \| z^t)) \quad (4\text{-}27)$$
$$= \arg\min_w (G_1(w) + D(w) - \langle \partial D(z^t), w \rangle)$$

Similar substantiation of the operation of Formula (4-25) gives the following.

$$y^{t+1} = \arg\min_y (G_2(y) + B(y \| x^{t+1})) \quad (4\text{-}28)$$
$$= \arg\min_y (G_2(y) + D(y) - \langle \partial D(x^{t+1}), y \rangle)$$

Next, the convergence rate of generalized P-R operator splitting is discussed. The convergence rate is derived for Case 1 and Case 2 separately. Case 1 is described first. For Case 1, only the nonexpansiveness of a Bregman Cayley operator $C_1$ can be assumed (that is, Theorem 2 holds but Theorem 4 does not hold). Therefore, from Formulas (4-23) to (4-26), the convergence rate of $z^t$ is represented by the inequality below.

$$\|z^{t+1} - z^t\|_2^2 \leq \eta_1 \|z^t - z_{t-1}\|_2^2 \quad (4\text{-}29)$$

From Formula (4-29), the error between $z^t$ and the stationary point $z^*$ of z can be evaluated as follows.

$$\|z^t - z^*\|_2^2 = \|z^t - z^{t+1} + z^{t+1} - z^{t+2} + \cdots - z^*\|_2^2 \leq \quad (4\text{-}30)$$
$$\sum_{l=t}^{\infty} \|z^l - z^{l+1}\|_2^2 \leq$$
$$\left(\sum_{j=1}^{\infty} \eta_1^j\right) \|z^{t+1} - z^{t+2}\|_2^2$$
$$= \frac{\eta_1}{1 - \eta_1} \|z^{t+1} - z^{t+2}\|_2^2$$

Similarly, the error between $z^{t+1}$ and the stationary point $z^*$ of z can be evaluated as follows.

$$\|z^{t+1} - z^*\|_2^2 = \|z^{t+1} - z^{t+2} + z^{t+2} - z^{t+3} + \cdots - z^*\|_2^2 \leq \quad (4\text{-}31)$$
$$\sum_{l=t}^{\infty} \|z^{l+1} - z^{l+2}\|_2^2 \leq$$
$$\left(\sum_{j=0}^{\infty} \eta_1^j\right) \|z^{t+1} - z^{t+2}\|_2^2$$
$$= \frac{1}{1 - \eta_1} \|z^{t+1} - z^{t+2}\|_2^2$$

From Formula (4-30) and Formula (4-31), the following relationship is obtained.

$$\|z^{t+1} - z^*\|_2^2 \leq \eta_1 \|z^t - z^*\|_2^2 \quad (4\text{-}32)$$

Thus, the error (convergence rate) after going through t updates is represented by the following.

$$\|z^t - z^*\|_2^2 \leq \eta_1^t \|z^0 - z^*\|_2^2 \quad (4\text{-}33)$$

Next, Case 2 is discussed. For Case 2, the nonexpansiveness of the Bregman Cayley operators $C_1$, $C_2$ can be ensured (that is, both Theorem 2 and Theorem 4 hold). Therefore, from Formulas (4-23) to (4-26), the convergence rate of $z^t$ is represented by the inequality below.

$$\|z^{t+1} - z^t\|_2^2 \leq \eta_1 \eta_2 \|z^t - z^{t-1}\|_2^2 \quad (4\text{-}34)$$

As with Case 1, the following relationship is obtained.

$$\|z^{t+1} - z^*\|_2^2 \leq \eta_1 \eta_2 \|z^t - z^*\|_2^2 \quad (4\text{-}35)$$

$$\|z^t - z^*\|_2^2 \leq \eta_1 \eta_2 \|z^t - z^0\|_2^2 \quad (4\text{-}36)$$

As can be seen from Formula (4-33) and Formula (4-36), the convergence rate can be increased both in Case 1 and Case 2 if $\eta_i$ can be made small.

[Generalized D-R Operator Splitting]

Generalized D-R operator splitting can be acquired by adding an averaging operator to Formula (4-22).

$$z \in \alpha C_2 C_1(z) + (1-\alpha) z \, (\alpha \in (0,1)) \quad (4\text{-}37)$$

From Formula (4-37) and Formula (3-2), it can be seen that Formula (3-2) with its Cayley operator replaced with the Bregman Cayley operator represents Formula (4-37).

The variable update rule for generalized D-R operator splitting is obtained by decomposing Formula (4-37) with the auxiliary variables x, y, z ($x \in R^m$, $y \in R^m$, $z \in R^m$) for w ($\in R^m$).

$$w^{t+1}+R_1(z^t)=(\partial D+\partial G_1)^{-1}\partial D(z^t) \qquad (4\text{-}38)$$

$$x^{t+1}=C_1(z^t)=2R_1-I)(z^t)=2w^{t+1}-z^t \qquad (4\text{-}39)$$

$$y^{t+1}=R_2(x^{t+1})=(\partial D+\tau G_2)^{-1}\partial D(x^{t+1}) \qquad (4\text{-}40)$$

$$z^{t+1}=\alpha C_2(x^{t+1})+(1-\alpha)z^t=\alpha(2y^{t+1}-x^{t+1})+(1-\alpha)z^t \qquad (4\text{-}41)$$

Next, the convergence rate of generalized D-R operator splitting is discussed. The convergence rate is derived for Case 1 and Case 2 separately. Case 1 is described first. For Case 1, only the nonexpansiveness of a Bregman Cayley operator $C_1$ can be assumed (that is, Theorem 2 holds but Theorem 4 does not hold). Therefore, from Formulas (4-38) to (4-41), the convergence rate of $z^t$ is represented by the inequality below.

$$\|z^{t+1}-z^*\|_2^2=\|\alpha C_1(z^t)+(1-\alpha)z^t-z^*\|_2^2 \le \alpha\|C_2C_1(z^t)-z^*\|_2^2+(1-\alpha)\|z^t-z^*\|_2^2 \le \alpha\eta_1\|z^t-z^*\|_2^2+(1-\alpha)\|z^t-z^*\|_2^2=(1-\alpha+\alpha\eta 1)\|z^t-z^*\|_2^2 \qquad (4\text{-}42)$$

Thus, the error (convergence rate) after going through t updates is represented by the following.

$$\|z^t-z^*\|_2^2 \le (1-\alpha+\alpha\eta_1)^t\|z^0-z^*\|_2^2 \qquad (4\text{-}43)$$

Next, Case 2 is discussed. For Case 2, the nonexpansiveness of the Bregman Cayley operators $C_1$, $C_2$ can be ensured (that is, both Theorem 2 and Theorem 4 hold). Therefore, from Formulas (4-38) to (4-41), the convergence rate of $z^t$ is represented by the inequality below.

$$\|z^{t+1}-z^*\|_2^2 \le (1-\alpha+\alpha\eta_1)\|z^t-z^*\|_2^2 \qquad (4\text{-}43)$$

$$\|z^t-z^*\|_2^2 \le (1-\alpha+\alpha\eta_1)^t\|z^0-z^*\|_2^2 \qquad (4\text{-}43)$$

As can be seen from Formula (4-43) and Formula (4-45), if $\eta_i$ can be made small, the convergence rate can be increased by bringing $\alpha$ close to 1 in both Case 1 and Case 2. Bringing $\alpha$ close to 1 means bringing generalized D-R operator splitting close to generalized P-R operator splitting.

«4: Bregman Divergence Design for Gaining High Convergence Rate»

An optimal solution can be determined by using a variable update rule based on generalized P-R operator splitting or generalized D-R operator splitting. Herein, design of Bregman divergence (design of the function D) with which the optimal solution can be determined faster is described. Specifically, two design methods are shown.

First, results from the foregoing discussion are summarized. In both Case 1 and Case 2, by bringing $\eta_1$ given by Formula (4-13) and 12 given by Formula (4-21) close to 0, the optimal solution is converged at a high convergence rate either with the variable update rule by generalized P-R operator splitting or with the variable update rule by generalized D-R operator splitting.

$$\eta_1 = 1 - \frac{4\sigma_{min,1}}{(1+\sigma_{max,1})^2} \qquad (4\text{-}13)$$

$$(0 < \sigma_{min,1} \le \sigma_{max,1} \le 1)$$

$$\eta_2 = 1 - \frac{4\sigma_{min,2}}{(1+\sigma_{max,2})^2} \qquad (4\text{-}21)$$

$$(0 < \sigma_{min,2} \le \sigma_{max,2} \le 1)$$

Such bringing of $\eta_i$ close to 0 can be achieved by bringing eigenvalues $\sigma_{max,i}$, $\sigma_{min,i}$, given by Formulas (4-9), (4-10), (4-18), and (4-19), close to 1. Bringing both the maximum eigenvalue $a_{max,i}$ and the minimum eigenvalue $\sigma_{min,i}$ close to 1 corresponds to smoothing of eigenvalue distribution.

$$\sigma_{max,i}=\sigma_{min,i}=1 \qquad (4\text{-}46)$$

In order to bring the eigenvalues close to 1, the design should be made such that the inverse matrix of the Hessian matrix $H_D$ of the function D will be the inverse matrix of a Hessian matrix $H_{G\_i}$ of the function $G_i$.

$$H_D^{-1}(w)H_{G_i}(w)=I \qquad (4\text{-}47)$$

As the function $G_i$ is represented by the approximate formulas of Formulas (4-5) and (4-14), Formula (4-47) can be achieved by representing the function D in a quadratic like the one below and appropriately designing the Hessian matrix $H_D$.

$$D(w) = \frac{1}{2}\langle H_D(w)w, w\rangle \qquad (4\text{-}48)$$

Substituting Formula (4-48) into Formula (4-1), which is the formula of definition of the Bregman divergence, gives the following.

$$B(w\|z) = D(w) - D(z) - \langle \partial D(z), w - z\rangle \qquad (4\text{-}49)$$

$$= \frac{1}{2}\langle H_D(z)(w-z), w-z\rangle$$

[Bregman Divergence Design Following Newton's Method]

In order to satisfy Formula (4-47) most faithfully in designing the Bregman divergence in accordance with Formula (4-49), the Hessian matrix $H_D$ should be designed so as to follow Formula (4-50). This design is analogous to Newton's method, which is well known as an optimization method for second-order convergence properties. Formula (4-50) may be replaced with an approximate calculation method for Hessian matrix, such as BFGS method.

$$H_D^{(2GD)}(w) = \begin{cases} H_{G_1}(w) + \varepsilon I & \text{(case1)} \\ \frac{1}{2}(H_{G_1}(w) + H_{G_2}(w)) + \varepsilon I & \text{(case2)} \end{cases} \qquad (4\text{-}50)$$

The real number $\varepsilon>0$ corresponds to a parameter that determines the step size of learning and need to be selected such that the eigenvalue of the Hessian matrix $H_D^{(2GD)}$ is in the range of greater than 0 and equal to or smaller than 1.

Also, while Formula (4-50) uses an arithmetic mean in (case2), a geometric means may be used instead of an arithmetic mean.

$$H_D^{(2GD)}(w) = \begin{cases} H_{G_1}(w) + \varepsilon I & \text{(case1)} \\ \sqrt{H_{G_1}(W)H_{G_2}(w)} + \varepsilon I & \text{(case2)} \end{cases} \qquad (4\text{-}50')$$

Formula (4-50) (Formula (4-50')) shows that the Hessian matrix $H_D$ is designed for Case 1 and Case 2 separately. In Case 2, it is ideal that Formula (4-47) is satisfied for both the functions $G_1$, $G_2$, but ensuring this is difficult in practice. Thus, for Case 2, design as in Formula (4-50) (Formula (4-50')) has been adopted. This design is preferable because the following mathematical property holds with regard to the Hessian matrix. This is described more specifically. First, the inverse matrix of the Hessian matrix $H_D$ is calculated.

$$H_D^{-1} = \left(\frac{1}{2}(H_{G_1}+H_{G_2})\right)^{-1} = \frac{1}{2}H_{G_1}^{-1}(H_{G_1}^{-1}+H_{G_2}^{-1})^{-1}H_{G_2}^{-1} = \frac{1}{2}H_{G_2}^{-1}(H_{G_1}^{-1}+H_{G_2}^{-1})^{-1}H_{G_1}^{-1}$$

Then, multiplication of $H_D^{-1}$ and $H_{G\_i}$ as in Formula (4-47) gives the following.

$$H_D^{-1}H_{G_1} = \frac{1}{2}(1+H_{G_1}^{-1}H_{G_2})^{-1}$$

$$H_D^{-1}H_{G_2} = \frac{1}{2}(1+H_{G_2}^{-1}H_{G_1})^{-1}$$

These two formulas show that Formula (4-47) is more likely to be satisfied as $H_{G\_1}$ and $H_{G\_2}$ are closer to each other.

[Bregman Divergence Design Following the Accelerated Gradient Method]

When the Bregman divergence design following Newton's method is used, the actual variable update rule requires calculation of the inverse matrix of the Hessian matrix $H_D$, which calculation involves very high cost. To overcome this calculation cost problem, the calculation cost for the inverse matrix of the Hessian matrix $H_D$ is to be decreased by trading off some of the reproducibility of Formula (4-47). As an example of such a design, Bregman divergence design following the accelerated gradient method is described. Briefly speaking, this design is to design the Hessian matrix $H_D$ so as to satisfy Formula (4-47) as much as possible while restricting the Hessian matrix $H_D$ to a diagonal matrix. This design is analogous to the accelerated gradient method, known as superlinear convergence.

Various methods for achieving the accelerated gradient method have been proposed. For example, they include momentum method, AdaGrad method, Adam method, and RMSProp method. Herein, design using the RMSProp method is described.

$$H_D^{(AGD)}(w) = \begin{cases} L_{G_1}(w)+\varepsilon I & \text{(case1)} \\ \frac{1}{2}(L_{G_1}(w)+L_{G_2}(w))+\varepsilon I & \text{(case2)} \end{cases} \quad (4-51)$$

The real number $\varepsilon>0$ corresponds to a parameter that determines the step size of learning and need to be selected such that the eigenvalue of the Hessian matrix $H_D^{(AGD)}$ is in the range of greater than 0 and equal to or smaller than 1.

Also, while Formula (4-51) uses an arithmetic mean in (case2), a geometric means may be used instead of an arithmetic mean.

$$H_D^{(AGD)}(w) = \begin{cases} L_{G_1}(w)+\varepsilon I & \text{(case1)} \\ \sqrt{L_{G_1}(W)L_{G_2}(w)}+\varepsilon I & \text{(case2)} \end{cases} \quad (4-51')$$

$L_{G\_1}$ and $L_{G\_2}$ are matrices that are basically assumed to be diagonal matrices, and are designed as follows in the RMSProp method.

$$L_{G_1}(w) \leftarrow \beta L_{G_1}(w)+(1-\beta)\text{diag}(\partial G_1(w)\partial G_1^T(w))$$

$$L_{G_2}(w) \leftarrow \beta L_{G_2}(w)+(1-\beta)\text{diag}(\partial G_2(w)\partial G_2^T(w))$$

$(\beta \in (0,1))$

However, if the calculation cost for the inverse matrix of the Hessian matrix $H_D$ can be traded off to some degree, $L_{G\_1}$ and $L_{G\_2}$ need not necessarily be diagonal matrices. They are designed as follows in the RMSProp method when using non-diagonal components as well.

$$L_{G_1}(w) \leftarrow \beta L_{G_1}(w)+(1-\beta)\partial G_1(w)\partial G_1^T(w)$$

$$L_{G_2}(w) \leftarrow \beta L_{G_2}(w)+(1-\beta)\partial G_2(w)\partial G_2^T(w)$$

$(\beta \in (0,1))$

«5: Application to Consensus Problem in Edge Computing»

In this section, taking the consensus problem in edge computing as an example, a variable updating algorithm which is a recursive variable update rule using monotone operator splitting generalized with Bregman divergence is described.

Recursive variable update rules corresponding to Formula (3-3) to Formula (3-6) are as follows.

$$w^{t+1} = R_1(z^t) = \operatorname*{argmin}_w(F_1^*(A^T w)+D(w)-\langle \partial D(z^t),w\rangle) \quad (4-52)$$

$$\lambda^{t+1} = C_1(z^t) = 2w^{t+1}-z^t \quad (4-53)$$

$$z^{t+1} = \begin{cases} C_2(\lambda^{t+1}) = \partial D^{-1}P\partial D(\lambda^{t+1}) & (4-54) \\ \alpha C_2(\lambda^{t+1})+(1-\alpha)z^t = \alpha\partial D^{-1}P\partial D(\lambda^{t+1})+(1-\alpha)z^t & (4-55) \end{cases}$$

Formula (4-54) corresponds to generalized P-R operator splitting, and Formula (4-55) corresponds to generalized D-R operator splitting.

In the derivation of the variable update rule, the fact that the Bregman Cayley operator $C_2$ satisfies the formula below was employed. While the proof thereof is omitted herein, it is a result that can be gained by applying a proof strategy shown in Non-patent Literature 2 to the Bregman Cayley operator.

$$C_2 = \partial D^{-1}P\partial D \quad (4\text{-}56)$$

The subdifferential of the function D and the inverse operator thereof when using Formula (4-48) are as follows.

$$\partial D = H_D(z) \quad (4\text{-}57)$$

$$\partial D^{-1} = H_D^{-1}(z) \quad (4\text{-}58)$$

Here, the Hessian matrix $H_D(z)$ and the inverse matrix $H_D^{-1}(z)$ thereof are both block diagonalized matrices as shown below.

$$H_D(z)=\text{diag}([H D_{1|2}(z),\ldots,H_{D_{1|V}}(z),H D_{2|1}(z),\ldots, H_{D_{2|V}}^{-1}(z),\ldots,H_{D_{V|1}}^{-1}(z),\ldots,H_{D_{V|V-1}}(z)]) \quad (4\text{-}59)$$

$$H_D^{-1}(z)=\text{diag}([H_{D_{1|2}}^{-1}(z),\ldots,H_{D_{1|V}}^{-1}(z), H_{D_{2|1}}^{-1}(z),\ldots,H_{D_{2|V}}^{-1}(z),\ldots, H_{D_{V|1}}^{-1}(z),\ldots,H_{D_{V|V-1}}^{-1}(z)]) \quad (4\text{-}60)$$

In the following, an algorithm that allows the recursive variable update rules of Formulas (4-52) to (4-55) to update the variables for each node asynchronously is described. Formula (4-52) contains updating of the latent variable p and the dual variable w, and for handling of the latent variable p and the dual variable w, the two methods shown below are possible.

[Method 1]

This method performs optimization of p with a penalty term and then optimization of w, as with the conventional methods.

First, optimization of p is performed using a penalty term.

$$p^{t+1} = \underset{p}{\operatorname{argmin}}\left(F_1(p) - \langle z^t, Ap \rangle + \frac{1}{2\gamma}\|Ap\|_2^2\right)(\gamma > 0) \quad (4\text{-}61)$$

Then, optimization of w is performed.

$$w^{t+1} = \underset{w}{\operatorname{argmin}}\left(F_1^*(A^T w) + D(w) - \langle \partial D(z^t), w \rangle\right) = \quad (4\text{-}61')$$

$$\underset{w}{\operatorname{argmin}}\left(\langle w, Ap^{t+1} \rangle - F_1(p^{t+1}) + \frac{1}{2}\langle H_D(z^t)w, w \rangle - \langle H_D(z^t)z^t, w \rangle\right) =$$

$$z^t - H_D^{-1}(z^t)Ap^{t+1}$$

Substituting the result of Formula (4-61') into Formula (4-53) gives the update rule for the dual variable λ below.

$$\lambda^{t+1} = 2w^{t+1} - z^t = z^t - 2H_D^{-1}(z^t)Ap^{t+1} + 1 \quad (4\text{-}62)$$

This formula indicates that the dual variable λ can be obtained without using the dual variable w.

Specific representations of the variable update rules of Formulas (4-52) to (4-55) will be as follows.

$$p^{t+1} = \underset{p}{\operatorname{argmin}}\left(F_1(p) - \langle z^t, Ap \rangle + \frac{1}{2\gamma}\|Ap\|_2^2\right) \quad (4\text{-}61)$$

$$\lambda^{t+1} = z^t - 2H_D^{-1}(z^t)Ap^{t+1} \quad (4\text{-}62)$$

$$\xi^{t+1} = PH_D(z^t)\lambda^{t+1} \quad (4\text{-}63)$$

$$z^{t+1} = \begin{cases} H_D^{-1}(z^t)\xi^{t+1} & (4\text{-}64) \\ \alpha H_D^{-1}(z^t)\xi^{t+1} + (1-\alpha)z^t & (4\text{-}65) \end{cases}$$

For Formula (4-54) and Formula (4-55), they have been divided into Formula (4-63), Formula (4-64), and Formula (4-65). This is for enabling updating of the variables for each node asynchronously.

Enabling these update rules to update the variables on each node provides the algorithm shown in FIG. 15. Preferably, the Hessian matrix $H_D$ in this algorithm is designed using Formula (4-50) or Formula (4-51).

[Method 2]

This method updates the dual variable w and, if necessary, updates the latent variable p.

To solve Formula (4-52), p is represented as a function of w and optimized.

Using second-order Taylor expansion, a function $F_1$ is approximately represented as follows.

$$F_1(p) = F_1(p^t) + \langle \partial F_1(p^t), p - p^t \rangle + \frac{1}{2}\langle H_{F_1}(p^t)(p-p^t), p - p^t \rangle$$

Substituting this into the function $F_1^*$ gives an optimal value p(w) with p being a function of w as below.

$$p(w) = \underset{p}{\operatorname{argmin}}(F_1(p) - \langle w, Ap \rangle) =$$

$$\underset{p}{\operatorname{argmin}}\left(F_1(p^t) + \langle \partial F_1(p^t), p - p^t \rangle + \frac{1}{2}\langle H_{F_1}(p^t)(p-p^t), p - p^t \rangle - \langle w, Ap \rangle\right)$$

Differentiating the inside of the parentheses on the right side with respect to p and finding a point where it is 0 (that is, the optimal point) result in the following.

$$p(w) = p^t - H_{F_1}^{-1}(p^t)(\partial F_1(p^t) - A^T w) \quad (4\text{-}66)$$

Substituting this into Formula (4-52) gives an update formula of w.

$$w^{t+1} = \underset{w}{\operatorname{argmin}}\left(F_1^*(A^T w) + D(w) - \langle \partial D(z^t), w \rangle\right) =$$

$$\underset{w}{\operatorname{argmin}}\left(\langle w, Ap(w) \rangle - F_1(p(w)) + \frac{1}{2}\langle H_D(z^t)w, w \rangle - \langle H_D(z^t)z^t, w \rangle\right)$$

Differentiating the inside of the parentheses on the right side with respect to w and finding a point where it is 0 (that is, the optimal point) result in the following.

$$w^{t+1} = z^t - H_D^{-1}(z^t)(A(p^t - H_{F_1}^{-1}(p^t)\partial F_1(p^t))) \quad (4\text{-}67)$$

As p is represented as a function of w from Formula (4-66), the update formula of p will be as follows.

$$p^{t+1} = p^t - H_{F_1}^{-1}(p^t)(\partial F_1(p^t) - A^T w^{t+1}) \quad (4\text{-}68)$$

Substituting Formula (4-67) into Formula (4-53) gives the following update formula.

$$\lambda^{t+1} = 2w^{t+1} - z^t = z^t - 2H_D^{-1}(z^t)(A(p^t - H_{F_1}^{-1}(p^t)\partial F_1(p^t))) \quad (4\text{-}69)$$

Specific representations of the variable update rules from Formula (4-68), Formula (4-69), Formula (4-54), and Formula (4-55) will be as follows.

$$\lambda^{t+1} = z^t - 2H_D^{-1}(z^t)\left(A(p^t - H_{F_1}^{-1}(p^t)\partial F_1(p^t))\right) \quad (4\text{-}70)$$

$$p^{t+1} = p^t - H_{F_1}^{-1}(p^t)\left(\partial F_1(p^t) - A^T w^{t+1}\right) \quad (4\text{-}71)$$

$$\xi^{t+1} = PH_D(z^t)\lambda^{t+1} \quad (4\text{-}72)$$

$$z^{t+1} = \begin{cases} H_D^{-1}(z^t)\xi^{t+1} & (4\text{-}73) \\ \alpha H_D^{-1}(z^t)\xi^{t+1} + (1-\alpha)z^t & (4\text{-}74) \end{cases}$$

Enabling these update rules to update the variables on each node provides the algorithm shown in FIG. 16. Preferably, the Hessian matrix $H_D$ in this algorithm is designed using Formula (4-50) or Formula (4-51).

Comparing the algorithm of FIG. 15 with that of FIG. 16, there is difference in the variables that are exchanged between nodes. That is, in the algorithm of FIG. 15, the latent variable and a transformation of the dual variable are exchanged, whereas in the algorithm of FIG. 16, only a transformation of the dual variable is exchanged. Requiring only a transformation of the dual variable to be exchanged, the algorithm of FIG. 16 can be said to be superior to the algorithm of FIG. 15 in terms of concealing/encryption of information.

«6: Experiment and Results Thereof»

Figure 17:
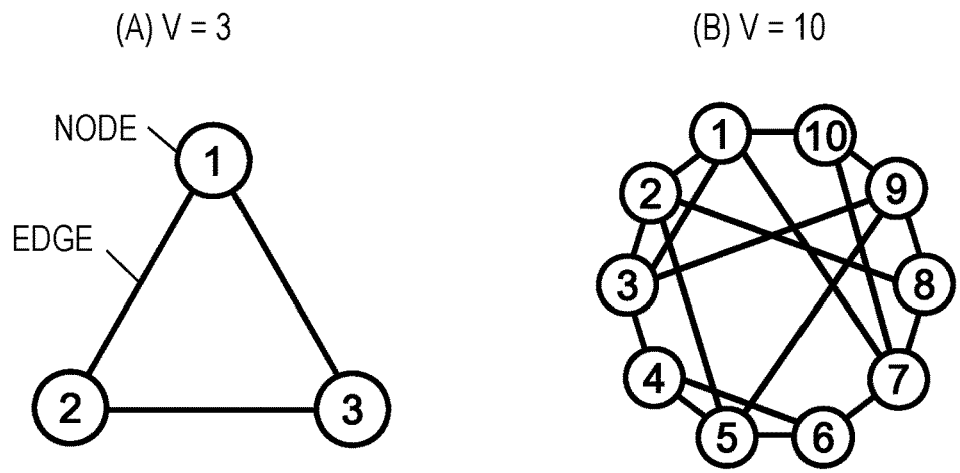
FIG. 17 shows structures of distributed computers used in an experiment.

In order to verify the effect of the variable update rule described thus far, an experiment on the convergence rate was conducted. In the experiment, a distributed computer (an edge computing system) having two kinds of graph structures as shown in FIG. 17 was used. A randomly generated, different data set was placed at each node of the distributed computer, and the convergence rate of the latent variable was measured.

For the cost function $F_i$ the following was used.

$$F_1(P) = \sum_{i \in vu} \sum_{\in u(i)} \frac{1}{2VU(i)} \|s_{i,u} - p_i^T v_{i,u}\|_2^2$$

Here, $v_{i,u}$ and $s_{i,u}$ are the tuple of input data and supervised data at the node i, and $p_i$, is the latent variable at the node i.

For a metric to measure an error of the latent variable, the following was used.

$$E^t = \sum_{i \in v} \frac{1}{2Vm} \|p^* - p_i^t\|_2^2$$

Here, p* is the optimal value of the latent variable p, $p_i^t$ is the value of the latent variable at the node i obtained after t updates, and m=p'V holds.

Figure 18:
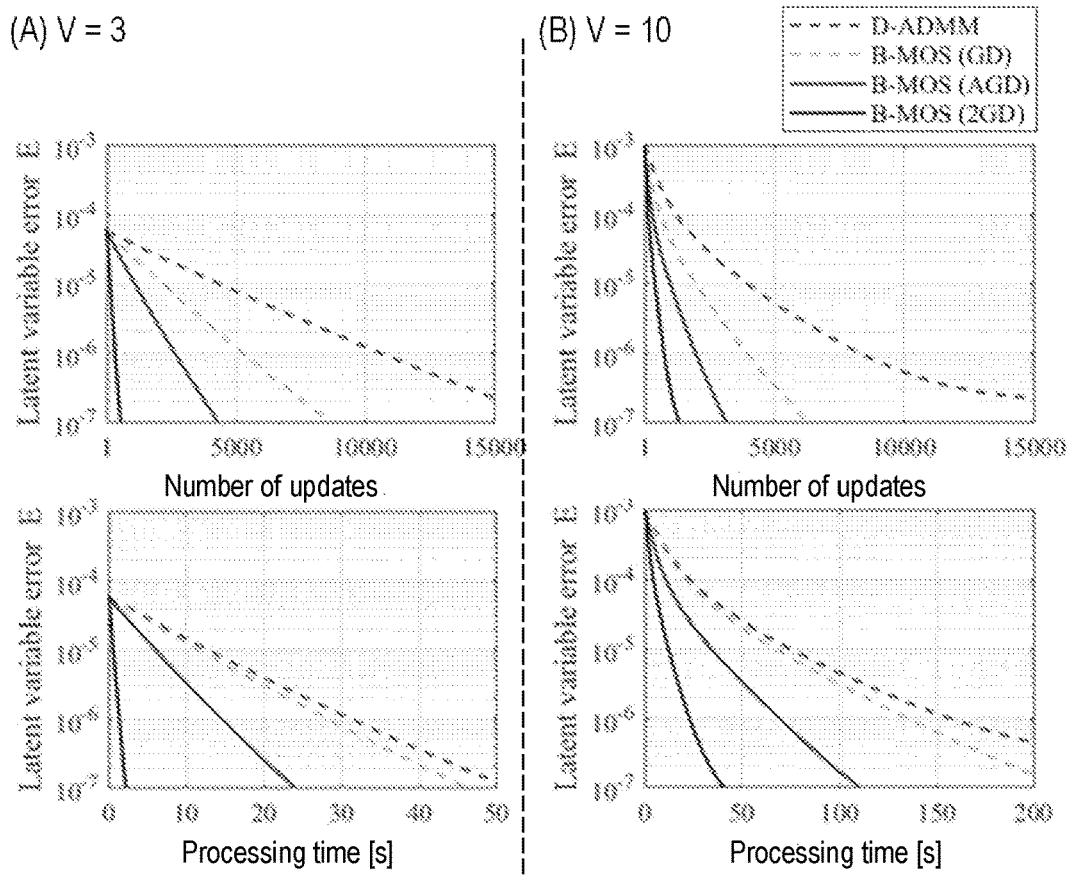
FIG. 18 shows results of the experiment.

FIG. 18 shows the experiment results. B-MOS (GD) indicates a conventional method (the algorithm of FIG. 14), B-MOS (AGD) indicates a method of the present application when the Hessian matrix is designed by the accelerated gradient method (AGD) (the algorithm of FIG. 16), and B-MOS (2GD) indicates a method of the present application when the Hessian matrix is designed by Newton's method (the algorithm of FIG. 16). D-ADMM indicates another conventional method different from B-MOS (GD). As can be seen from the drawings, the methods of the present application provide higher convergence rates than the conventional methods in both of the graph structures. Particularly when the Hessian matrix is designed in accordance with Newton's method, the highest convergence rate is achieved.

«7: Representation Using Differential»

As it was assumed that the function D was a differentiable strictly convex function at the beginning of «1: Definitions of Bregman Resolvent operator and Bregman Cayley operator», the discussions from «1: Definitions of Bregman Resolvent operator and Bregman Cayley operator» to «5: Application to consensus problem in edge computing» still hold if the subdifferential of the function D is replaced with the differential of the function D. Specifically, the description from «1: Definitions of Bregman Resolvent operator and Bregman Cayley operator» to «5: Application to consensus problem in edge computing» also holds with "the differential of the function D" in place of the description "the subdifferential of the function D". Major formulas with the subdifferential replaced by the differential are shown below.

When the differential of the function D is used, the Bregman divergence B is defined as follows.

$$B(w\|z) = D(w) - D(z) - \langle \nabla D(z), w - z \rangle \quad (4\text{-}1)^*$$

Here, $\nabla$ represents an operation to differentiate the function.

The (Property 1) and (Property 2) of the strictly convex function D can be represented as follows.

(Property 1) Using second-order Taylor expansion, the approximate formula below holds around a point w for the function D.

$$D(w + \delta) = D(w) + \langle \nabla D(w), \delta \rangle + \frac{1}{2} \langle H_D(w)\delta, \delta \rangle + o(\|\delta\|_2^2) \quad (4\text{-}2)^*$$
$$(\delta \to 0)$$

(Property 2) The LS (upper bound) and SC (lower bound) of the function D can be represented as below using an arbitrary vector $h \in R^m$.

$$D(w) + \langle \nabla D(w), h \rangle + \frac{1}{2} \langle K_D h, h \rangle \leq D(w + h) \quad (4\text{-}3)^*$$

$$D(w + h) \leq D(w) + \langle \nabla D(w), h \rangle + \frac{1}{2} \langle M_D h, h \rangle \quad (4\text{-}4)^*$$

A Bregman Resolvent operator $R_r$, and a Bregman Cayley operator $C_r$, are given by the formulas below.

$$R_n = (I + (\nabla D)^{-1} \partial G_n)^{-1} = (\Lambda D + \partial G_n)^{-1} \leftarrow D$$

$$C_n = (I + (\Lambda D)^{-1} \partial G_n)^{-1} (I - (\nabla D)^{-1} \partial G_n)^{-1} = 2R_n - I$$

When the function D is defined using the square of $L_2$ norm, the function D and the differential of the function D will be as follows.

$$D(w) = \frac{1}{2\kappa} \|w\|_2^2$$

$$\nabla D = \frac{1}{\kappa} I$$

In this case, the Bregman Resolvent operator $R_n$ and the Bregman Cayley operator $C_n$ will be the Resolvent operator $\Omega_n$ and the Cayley operator $\psi_n$ as in the case of using the subdifferential.

$$R_n = (\nabla D + \partial G_n)^{-1} \nabla D = \left(\frac{1}{\kappa}(I + \kappa \partial G_n)\right)^{-1} \frac{1}{\kappa} I = (I + \kappa \partial G_n)^{-1} = \Omega_n$$

$$C_n = 2R_n - I = 2\Omega_n - I = \Psi_n$$

Generalized P-R operator splitting will be like the formula below as in the case of subdifferential.

$$z \in C_2 C_1(z) \quad (4\text{-}22)^*$$

The variable update rule for generalized P-R operator splitting is obtained by decomposing Formula (4-22)* with the auxiliary variables x, y, z ($x \in R^m$, $y \in R^m$, $z \in R^m$) for w ($\in R^m$).

$$w^{t+1} = R_1(z^t) = \nabla D + \partial G_1)^{-1} \nabla D(z^t) \quad (4\text{-}23)$$

$$x^{t+1} = C_1(z^t) = (2R_1 - I)(z^t) = 2w^{t+1} - z^t \quad (4\text{-}24)^*$$

$$y^{t+1} = R_2(x^{t+1}) = (\nabla D + \partial G_2)^{-1} \nabla D(x^{t+1}) \quad (4\text{-}25)^*$$

$$z^{t+1} = C_2(x^{t+1}) = 2R_2 - I)(x_{t+1}) = 2y^{t+1} - x^{t+1} \quad (4\text{-}26)^*$$

Transformation of Formula (4-23)* gives the formula below.

$$w^{t+1} = \quad (4\text{-}27)^*$$
$$\operatorname*{argmin}_w (G_1(w) + B(w\|z^t)) = \operatorname*{argmin}_w (G_1(w) + D(w) - \langle \nabla D(z^t), w \rangle)$$

Similar transformation of Formula (4-25)* gives the formula below.

$$y^{t+1} = \quad (4\text{-}28)^*$$
$$\operatorname*{argmin}_y \left(G_2(y) + B(y\|x^{t+1})\right) = \operatorname*{argmin}_y \left(G_2(y) + D(y) - \langle \nabla D(x^{t+1}), y \rangle\right)$$

Generalized D-R operator splitting will also be like the formula below as with the case of subdifferential.

$$z \in \alpha C_2 C_1(z) + (1-\alpha)z (\alpha \in (0,1)) \quad (4\text{-}37)^*$$

The variable update rule for generalized D-R operator splitting is obtained by decomposing Formula (4-37)* with the auxiliary variables x, y, z ($x \in R^m$, $y \in R^m$, $z \in R^m$) for w ($\in R^m$).

$$w^{t+1} = R_1(z^t) = (\nabla D + \partial G_1)^{-1} \nabla D(z^t) \quad (4\text{-}38)^*$$

$$x^{t+1} = C_1(z^t) = (2R_1 - I)(z^t) = 2w^{t+1} - z^t \quad (4\text{-}39)^*$$

$$y^{t+1} = R_2(x^{t+1}) = (\nabla D + \partial G_2)^{-1} \nabla D(x^{t+1}) \quad (4\text{-}40)^*$$

$$z^{t+1} = \alpha C_2(x^{t+1}) + (1-\alpha)z^t = \alpha(2y^{t+1} - x^{t+1}) + (1-\alpha)z^t \quad (4\text{-}41)^*$$

As with the case of subdifferential, representing the function D in the quadratic of Formula (4-48) and substituting it into Formula (4-1)*, which is the formula of definition of the Bregman divergence, gives the following.

$$B(w\|z) = D(w) - D(z) - \langle \nabla D(z), w - z \rangle = \frac{1}{2} \langle H_D(z)(w - z), w - z \rangle \quad (4\text{-}49)^*$$

However, update of the function D in Formula (4-48) is not performed at every step. Specifically, in order to satisfy the function D being strong convex, an update of the differential $\nabla D$ of the function D is performed at a certain timing only if the condition represented by the formula below is satisfied. Therefore, an update of the differential $\nabla D$ of the function D is not performed if the condition is not satisfied.

$$\nabla D^t - \nabla D^{t-1} = D_H(w^t) - H_D(w^{t-1}) \succeq O$$

Recursive variable update rules corresponding to Formula (3-3) to Formula (3-6) when applied to the consensus problem in edge computing will be as follows.

$$w^{t+1} = R_1(z^t) = \operatorname*{argmin}_w \left( F_1^*(A^T w) + D(w) - \langle \nabla D(z^t), w \rangle \right) \quad (4\text{-}52)^*$$

$$\lambda^{t+1} = C_1(z^t) = 2w^{t+1} - z^t \quad (4\text{-}53)^*$$

$$z^{t+1} = \begin{cases} C_2(\lambda^{t+1}) = \nabla D^{-1} P \nabla D(\lambda^{t+1}) & (4\text{-}54)^* \\ \alpha C_2(\lambda^{t+1}) + (1-\alpha)z^t = \alpha \nabla D^{-1} P \nabla D(\lambda^{t+1}) + (1-\alpha)z^t & (4\text{-}55)^* \end{cases}$$

In the derivation of the variable update rule, the fact that the Bregman Cayley operator $C_2$ satisfies the formula below was employed.

$$C_2 = \nabla D^{-1} P \nabla D \quad (4\text{-}56)^*$$

The differential of the function D and the inverse operator thereof when using Formula (4-48) are as follows.

$$\nabla D = H_D(z) \quad (4\text{-}57)^*$$

$$\nabla D^{-1} = H_D^{-1}(z) \quad (4\text{-}58)^*$$

«8: Bregman Divergence Design with High Order Convexity»

The two Bregman divergence design schemes described in «4: Bregman divergence design for gaining high convergence rate» discussed how the function D should be designed when the function D to determine the metric of Bregman divergence is limited to a quadratic. In this section, a design of the function D that enables even faster convergence using high order convexity of the second order or higher is described. While the design of a differential $\nabla D$ of the function D is described below, generality is not lost with the description on the design of $\nabla D$ because it is $\nabla D$ that is used in the updating of the variables.

Although they have been implicitly assumed in Formula (4-48) and Formula (4-49)*, in order to prevent the stationary point from being changed with the design of the function D, two aspects are focused: that the function D satisfies $\nabla D(0) = 0$ and that the function D is a differentiable strictly convex function. The function $G_i$ is assumed to be differentiable. That is, it is assumed that a differential $\nabla G_i$ of the function $G_i$ exists. Even if the function $G_i$ itself is not differentiable, the function $G_i$ can be safely assumed to be differentiable because the function $G_i$ can be turned into a differentiable function via processing such as smoothing, for example.

Then, by updating $\nabla D$ under the condition represented by the formula below, fast convergence is expected when the function $G_i$ contains convexity of the second order or higher.

$$\nabla D(w) = \nabla G_i(w) - \nabla G_i(0)$$

However, in order to satisfy the function D being strong convex, an update of $\nabla D$ is performed at a certain timing only if the condition represented by the formula below is satisfied. Therefore, an update of $\nabla D$ is not performed if the condition is not satisfied.

$$\nabla D^t - \nabla D^{t-1} \succeq (0)$$

Practically, when the function $G_i$ is represented as the sum of multiple high-order (the third order or higher) convexities (for example, when the function $G_i$ is represented as a strictly convex function using high-order Taylor expansion), it is often difficult to obtain the optimal solution of w analytically. In such a case, one useful implementation is to represent the function D using a single high-order term only, instead of using a sum. Then, the function D can be represented by the following formula.

$$D(w) = \|w\|_p^p (1 \leq p < \infty)$$

Second Embodiment

Figure 19:
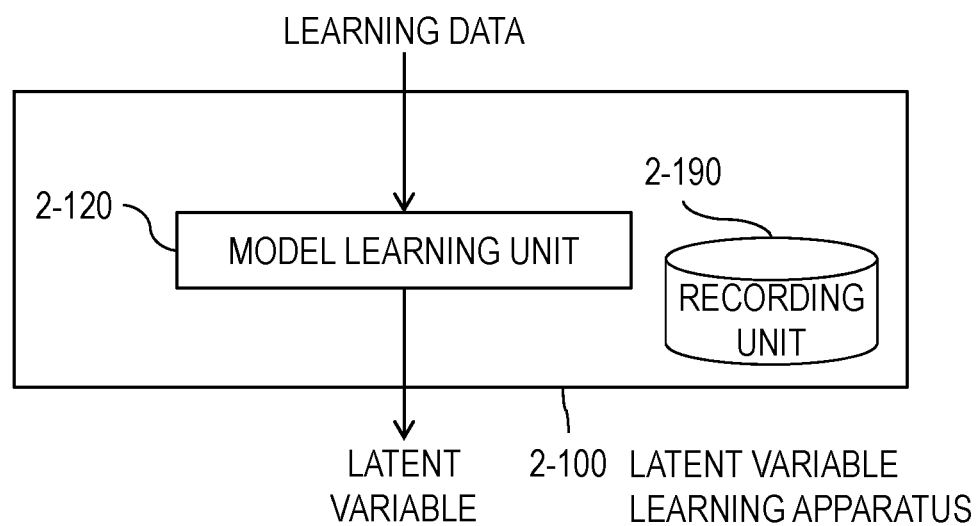
FIG. 19 is a block diagram showing a configuration of a latent variable learning apparatus 2-100.
Figure 20:
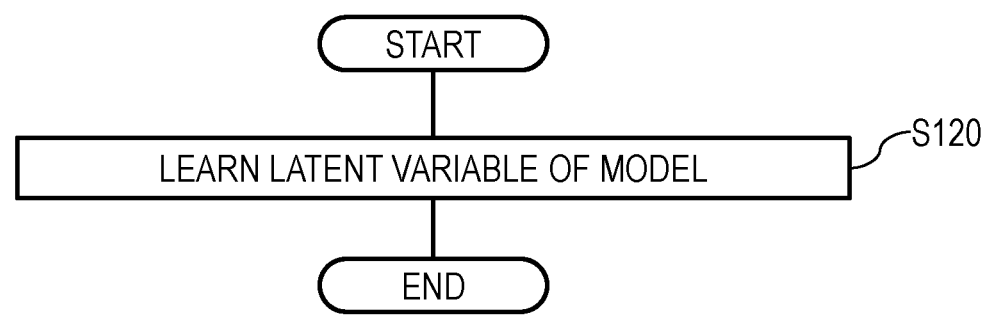
FIG. 20 is a flowchart illustrating operations of the latent variable learning apparatus 2-100.

Now referring to FIGS. 19 and 20, a latent variable learning apparatus 2-100 is described. FIG. 19 is a block diagram showing a configuration of the latent variable learning apparatus 2-100. FIG. 20 is a flowchart illustrating operations of the latent variable learning apparatus 2-100. As shown in FIG. 19, the latent variable learning apparatus 2-100 includes a model learning unit 2-120 and a recording unit 2-190.

The latent variable learning apparatus 2-100 uses learning data to learn a latent variable $w \in R^m$ (m being an integer equal to or greater than 1) of a model subjected to machine learning. Herein, a model refers to a function that takes input data as input and outputs output data, and learning data refers to input data for use in the learning of the latent variable of the model or a tuple of input data and output data for use in the learning of the latent variable of the model. When a tuple of input data and output data is used as learning data, the output data may be called supervised data.

According to FIG. 20, the operation of the latent variable learning apparatus 2-100 is described.

At S120, the model learning unit 2-120 uses learning data to learn the latent variable w in a predetermined procedure. The procedure is described below specifically.

(Procedure 1)

A learning procedure using Bregman divergence is described here.

First, the model learning unit 2-120 uses learning data to calculate setup data which is used in the learning of the latent variable w. For example, one example is a cost function G(w): $R^m \to R$ for optimizing the latent variable w, calculated using the learning data (where $G(w)=E_i G_i(w)$ holds and a function $G_i(w)$ (N being an integer equal to or greater than 2 and i being an integer satisfying $1 \le i \le N$ (that is, i is an index)) is a closed proper convex function).

Next, using Bregman divergence $B_D(w_1 \| w_2) = D(w_1) - D(w_2) - \langle \partial D(w_2), w_1 - w_2 \rangle$ ($w_1, w_2 \in R^m$) defined with the function D (where D: $R^m \to R$ is a strictly convex function), the model learning unit 2-120 learns the latent variable w such that Bregman divergence $B_D$ ($B_D(w \| w^*)$ or $B_D(w^* \| w)$) with respect to a stationary point $w^* \in R^m$ of w that minimizes the cost function G(w) approaches 0. The function D is a strictly convex function, which may be designed as desired. The stationary point $w^*$ is also called fixed point $w^*$.

(Procedure 2)

This section describes a learning procedure using an update rule for the latent variable which is configured with monotone operator splitting, as described in <Technical background>. Although <Technical background> detailed the case of N=2, the learning procedure described below can be configured for any N that can constitute the update rule for the latent variable using monotone operator splitting. For example, for the case of N=3, a similar learning procedure can also be configured because it can be mathematically proved that transformation of monotone operator splitting is possible as in the case of N=2.

First, the model learning unit 2-120 uses the learning data to calculate setup data which is used in the learning of the latent variable w. For example, in addition to the cost function G(w) mentioned above, it calculates a Bregman Resolvent operator $R_i$ ($1 \le i \le N$) defined using the function D and the function G and a Bregman Cayley operator $C_i$ ($1 \le i \le N$) defined using the Bregman Resolvent operator $R_i$ as setup data.

Then, using the Bregman Resolvent operator $R_i$ ($1 \le i \le N$) and the Bregman Cayley operator $C_i$ ($1 \le i \le N$), the model learning unit 2-120 calculates the value of the latent variable w recursively. Specifically, with t being a variable used for counting the number of updates (hereinafter also called a counter), the model learning unit 2-120 recursively calculates $w^{t+1}$, which is the result of the t+1th update of the latent variable w, using the Bregman Resolvent operator $R_i$ ($1 \le i \le N$) and the Bregman Cayley operator $C_i$ ($1 \le i \le N$).

The counter t will assume an integer value equal to or greater than 0.

Figure 21:
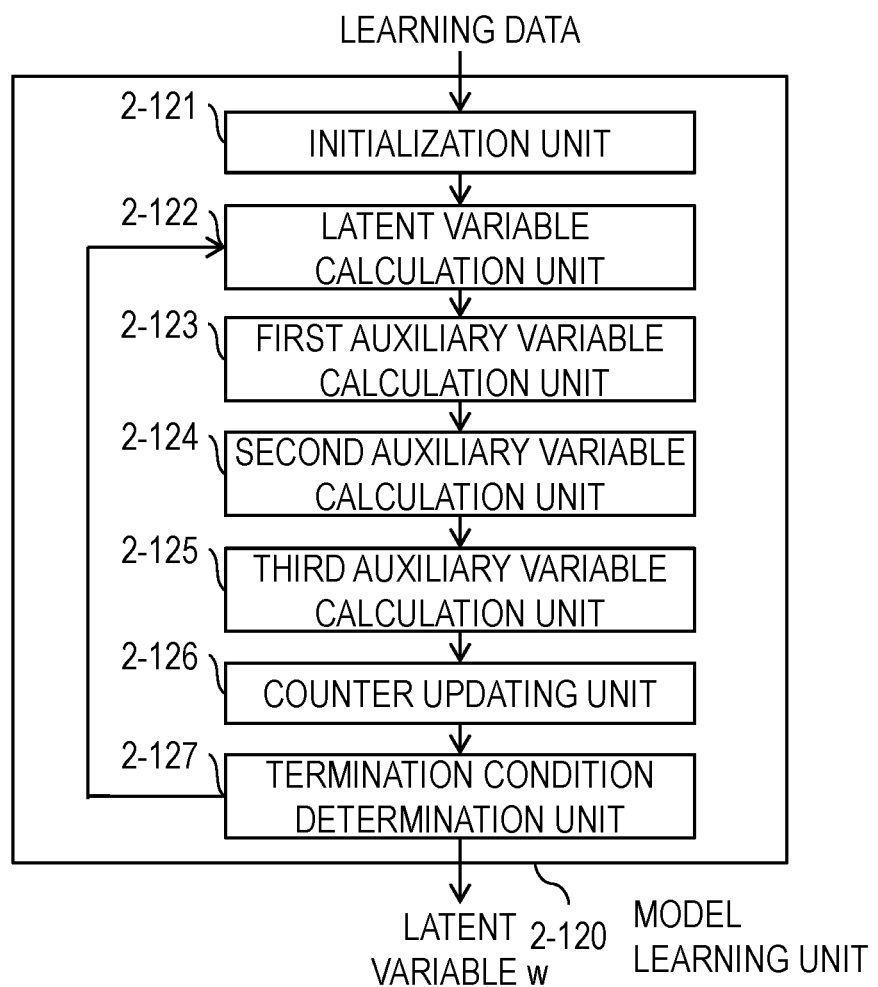
FIG. 21 is a block diagram showing a configuration of a model learning unit 2-120.
Figure 22:
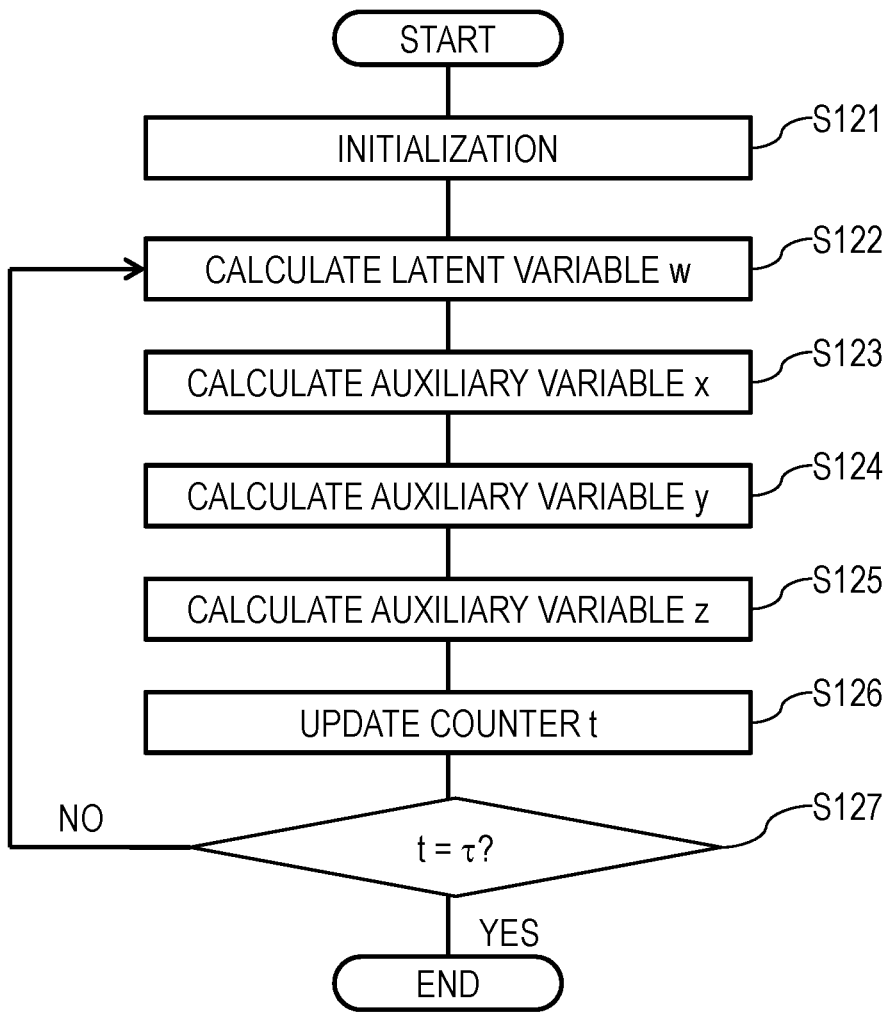
FIG. 22 is a flowchart illustrating operations of the model learning unit 2-120.

The model learning unit 2-120 which executes a learning procedure using an update rule for the latent variable which is configured with generalized P-R operator splitting and generalized D-R operator splitting in the case of N=2 is described. Now referring to FIGS. 21 and 22, the model learning unit 2-120 is described. FIG. 21 is a block diagram showing a configuration of the model learning unit 2-120. FIG. 22 is a flowchart illustrating operations of the model learning unit 2-120. As shown in FIG. 21, the model learning unit 2-120 includes an initialization unit 2-121, a latent variable calculation unit 2-122, a first auxiliary variable calculation unit 2-123, a second auxiliary variable calculation unit 2-124, a third auxiliary variable calculation unit 2-125, a counter updating unit 2-126, and a termination condition determination unit 2-127.

According to FIG. 22, the operation of the model learning unit 2-120 is described. Here, the auxiliary variables x, y, $z \in R^m$ for the latent variable w are used.

At S121, the initialization unit 2-121 initializes the counter t. Specifically, t=0 holds. The initialization unit 2-121 also calculates setup data.

At S122, the latent variable calculation unit 2-122 calculates $w^{t+1}$, which is the result of the t+1th update of the latent variable w, from $z^t$, which is the result of the tth update of the auxiliary variable z, according to Formula (5-1).

At S123, the first auxiliary variable calculation unit 2-123 calculates $x^{t+1}$, which is the result of the t+1th update of the auxiliary variable x, from the $z^t$ used at S122 and the $w^{t+01}$ calculated at S122, according to Formula (5-2).

At S124, the second auxiliary variable calculation unit 2-124 calculates $y^{t+1}$, which is the result of the t+1th update of the auxiliary variable y, from the $x^{t+1}$ calculated at S123, according to Formula (5-3).

At S125, the third auxiliary variable calculation unit 2-125 calculates $z^{t+1}$, which is the result of the t+1th update of the auxiliary variable z. This is described more specifically. When generalized P-R operator splitting is used, the third auxiliary variable calculation unit 2-125 calculates $z^{t+1}$, which is the result of the t+1th update of the auxiliary variable z, from the $x^{t+1}$ calculated at S123 and the $y^{t+1}$ calculated at S124, according to Formula (5-4). When generalized D-R operator splitting is used, the third auxiliary variable calculation unit 2-125 calculates $z^{t+1}$, which is the result of the t+1th update of the auxiliary variable z, from the $z^t$ used at S122, the $x^{t+1}$ calculated at S123, and the $y^{t+1}$ calculated at S124, according to Formula (5-5) (where a is a real number satisfying $0 < \alpha < 1$).

At S126, the counter updating unit 2-126 increments the counter t by one. Specifically, $t \leftarrow t+1$ holds.

At S127, if the counter t has reached a predetermined number of updates τ (τ is an integer equal to or greater than 1) (that is, if t=τ, satisfying the termination condition), the termination condition determination unit 2-127 outputs a current value $w^\tau$ of the latent variable w and ends the processing. Otherwise, it returns to the processing at S122. That is, the model learning unit 2-120 repeats the calculations from S122 to S125. The $z^{t+1}$ calculated at S125 is used at S122 and S123 in the next repeated calculation.

$$w^{t+1} = \underset{w}{\mathrm{argmin}}(G_1(w) + D(w) - \langle \partial D(z^t), w \rangle) \qquad (5\text{-}1)$$

$$x^{t+1} = 2w^{t+1} - z^t \qquad (5\text{-}2)$$

$$y^{t+1} = \underset{y}{\mathrm{argmin}}(G_2(y) + D(y) - \langle \partial D(x^{t+1}), y \rangle) \qquad (5\text{-}3)$$

$$z^{t+1} = \begin{cases} 2y^{t+1} - x^{t+1} & (5\text{-}4) \\ \alpha(2y^{t+1} - x^{t+1}) + (1-\alpha)z^t & (5\text{-}5) \end{cases}$$

«Condition of Function D for Achieving High Convergence Rate»

To increase the convergence rate to the stationary point $w^*$ of w that minimizes the cost function G(w), the function D should be a function satisfying the following condition.

(Condition) The function D is a function such that its Hessian matrix is close to the inverse matrix of the Hessian matrix of the function $G_i(w)$.

This condition can also be said as "the function D is a function such that the product of the inverse matrix of its Hessian matrix and the Hessian matrix of the function $G_i(w)$ is close to the identity matrix".

In the case of N=2, the Hessian matrix of the function D may be calculated as follows in accordance with Newton's method or the accelerated gradient method as described in <Technical background>.

[Case 1]: The function $G_i$ is a strictly convex function, that is, strong convex (SC) and Lipschitz smooth (LS).

$$H_D(w) = H_{G_1}(w) + \varepsilon I \quad (5\text{-}6)$$

$$H_D(w) = L_{G_1}(w) + \varepsilon I \quad (5\text{-}7)$$

(Where $\varepsilon > 0$ is a real number)

The real number $\varepsilon$ is chosen such that the eigenvalue of the Hessian matrix $H_D$ is in the range of greater than 0 and equal to or smaller than 1.

[Case 2]: The functions $G_1$, $G_2$ are both strictly convex functions, that is, both are strong convex (SC) and Lipschitz smooth (LS).

$$H_D(w) = \frac{1}{2}\left(H_{G_1}(w) + H_{G_2}(w)\right) + \varepsilon I \quad (5\text{-}8)$$

$$H_D(w) = \frac{1}{2}\left(L_{G_1}(W) + L_{G_2}(w)\right) + \varepsilon I \quad (5\text{-}9)$$

(Where $\varepsilon > 0$ is a real number)

The real number $\varepsilon$ is chosen such that the eigenvalue of the Hessian matrix $H_D$ is in the range of greater than 0 and equal to or smaller than 1.

Formula (5-6) and Formula (5-8) are the case of following Newton's method, and Formula (5-7) and Formula (5-9) are the case of following the accelerated gradient method. The matrices $L_{G\_1}$, $L_{G\_2}$ are matrices given by Formula (5-10) and Formula (5-11), respectively.

$$L_{G_1}(w) \leftarrow \beta L_{G_1}(w) + (1-\beta)\mathrm{diag}(\partial G_1(w)\partial G_1^T(w)) \quad (5\text{-}10)$$

$$L_{G_2}(w) \leftarrow \beta L_{G_2}(w) + (1-\beta)\mathrm{diag}(\partial G_2(w) \leftarrow G_2^T(w)) \quad (5\text{-}11)$$

($\beta \in (0,1)$)

Alternatively, the matrices $L_{G\_1}$, $L_{G\_2}$ are matrices given by Formula (5-12) and Formula (5-13), respectively.

$$L_{G_1}(w) \leftarrow \beta L_{G_1}(w) + (1-\beta)\leftarrow G_1(w)\partial G_1^T(w) \quad (5\text{-}12)$$

$$L_{G_2}(w) \leftarrow \beta L_{G_2}(w) + (1-\beta)\partial G_2(w)\partial G_2^T(w) \quad (5\text{-}13)$$

($\beta \in (0,1)$)

The matrix $L_{G\_1}$ in Formula (5-10) and Formula (5-12) is a matrix calculated using the gradient of the function $G_1(w)$. The matrix $L_{G\_2}$ in Formula (5-11) and Formula (5-13) is a matrix calculated using the gradient of a function $G_2(w)$.

Instead of Formula (5-8) and Formula (5-9) in [Case 2], geometric means such as the formulas below may be used.

$$H_D(w) = \sqrt{H_{G_1}(w)H_{G_2}(w)} + \varepsilon I \quad (5\text{-}8')$$

$$H_D(w) = \sqrt{L_{G_1}(w)L_{G_2}(w)} + \varepsilon I \quad (5\text{-}9')$$

Although the function $G_1(w)$ and the function $G_2(w)$ were described as being strictly convex functions in the description of Case 1 and Case 2 above, they need not necessarily be strictly convex functions in a mathematically strict sense. That is, the Hessian matrix of the function D can also be calculated by Formula (5-6) to Formula (5-9) when the function $G_1(w)$ or function $G_2(w)$ may be handled as a strictly convex function. More particularly, this can be expressed as below.

[Case 1]: The function $G_1$ is a strictly convex function (is strong convex (SC) and Lipschitz smooth (LS)) or can be assumed to be a strictly convex function (be strong convex (SC) and Lipschitz smooth (LS)).

In this case, the Hessian matrix of the function D can be calculated by Formula (5-6) or Formula (5-7).

[Case 2]: Each one of the functions $G_1$, $G_2$ is a strictly convex function (is strong convex (SC) and Lipschitz smooth (LS)) or can be assumed to be a strictly convex function (be strong convex (SC) and Lipschitz smooth (LS)).

In this case, the Hessian matrix of the function D can be calculated by Formula (5-8) or Formula (5-9).

While the description of the second embodiment used subdifferential, differential may be used in place of subdifferential as described in <Technical background>. In that case, the formulas below may be used instead of Formula (5-1) to Formula (5-5).

$$w^{t+1} = \arg\min_w (G_1(w) + D(w) - \langle \nabla D(z^t), w\rangle) \quad (5\text{-}1)^*$$

$$x^{t+1} = 2w^{t+1} - z^t \quad (5\text{-}2)^*$$

$$y^{t+1} = \arg\min_y (G_2(y) + D(y) - \langle \nabla D(x^{t+1}), y\rangle) \quad (5\text{-}3)^*$$

$$z^{t+1} = \begin{cases} 2y^{t+1} - x^{t+1} & (5\text{-}4)^* \\ \alpha(2y^{t+1} - x^{t+1}) + (1-\alpha)z^t & (5\text{-}5)^* \end{cases}$$

When differential is used, $\nabla D$ may be updated under the condition represented by the formula below.

$$\nabla D(w) = \nabla G_i(w) - \nabla G_i(0)$$

However, an update of $\nabla D$ is performed at a certain timing only if the condition represented by the formula below is satisfied.

$$\nabla D^t - \nabla D^{t-1} \succeq O$$

The embodiment according to the present invention enables fast learning of latent variables of a model to be subjected to machine learning. The embodiment according to the present invention enables the latent variables to be updated so as to accelerate the convergence to a stationary point (the optimal solution) by configuring the variable update rule based on monotone operator splitting using the Bregman Resolvent operator or the Bregman Cayley operator. Also, by appropriately configuring the convex function for use in the definition of Bregman divergence, it is possible to configure a variable update rule based on monotone operator splitting using the Bregman Resolvent operator or the Bregman Cayley operator such that the convergence to the stationary point is accelerated.

Third Embodiment

In this section, an embodiment corresponding to the two variable updating algorithms described in «5: Application to consensus problem in edge computing» in <Technical background> (the algorithms in FIG. 15 and FIG. 16) is described.

Figure 23:
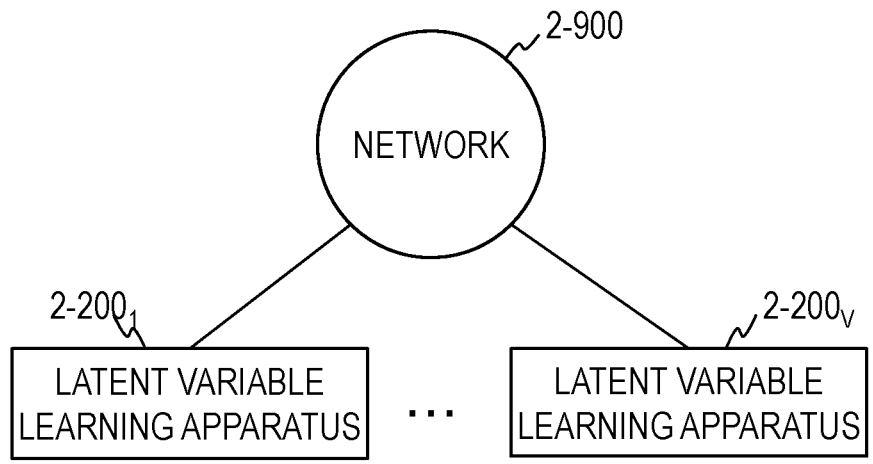
FIG. 23 is a block diagram showing a configuration of a latent variable learning system 2-20.

Now referring to FIG. 23, a latent variable learning system 2-20 is described. FIG. 23 is a block diagram showing a configuration of the latent variable learning system 2-20. As shown in FIG. 23, the latent variable learning system 2-20 includes V (V being an integer equal to or greater than 1) latent variable learning apparatuses $2\text{-}200_1, \ldots, 2\text{-}200_V$. A latent variable learning apparatus $2\text{-}200_j$ ($i \in v = \{1, \ldots, V\}$) corresponds to a node in the foregoing description on the consensus problem in edge computing.

Each latent variable learning apparatus 2-200$_i$ is connected with a network 2-900 and communicates with a latent variable learning apparatus 2-200$_j$ (j≠i) as necessary. The network 2-900 can be the internet, for example.

Figure 24:
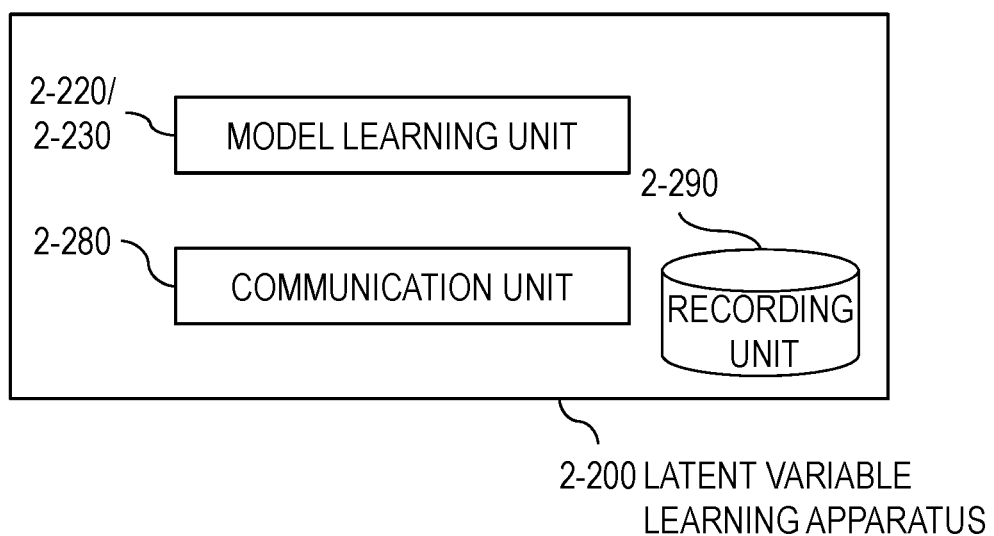
FIG. 24 is a block diagram showing a configuration of a latent variable learning apparatus 2-200.

Now referring to FIG. 24, a latent variable learning apparatus 2-200 is described. FIG. 24 is a block diagram showing a configuration of the latent variable learning apparatus 2-200. As shown in FIG. 24, the latent variable learning apparatus 2-200 includes a model learning unit 2-220, a communication unit 2-280, and a recording unit 2-290.

The latent variable learning apparatus 2-200$_i$ uses learning data to learn a latent variable $p_i \in R^{p'}$ (p' being an integer equal to or greater than 1) of a model to be subjected to machine learning. The learning data may be common to all latent variable learning apparatus 2-200 or may be different for each latent variable learning apparatus 2-200$_i$.

Figure 25:
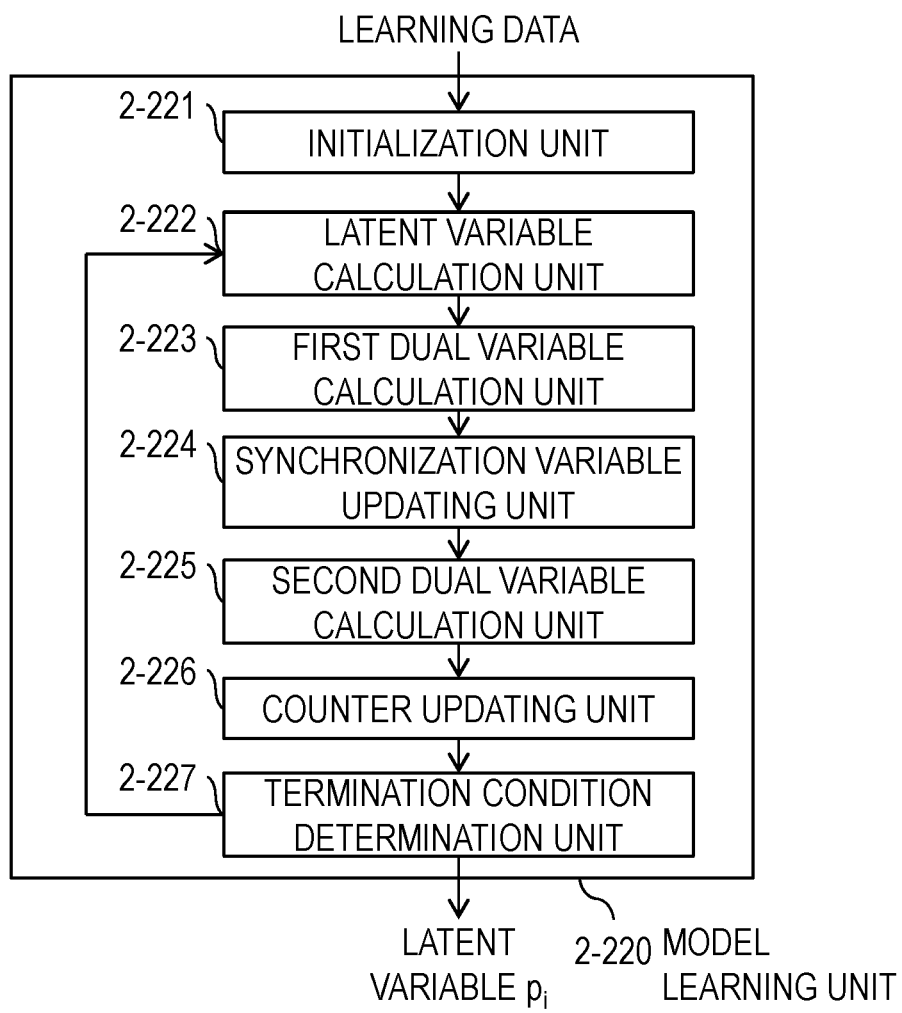
FIG. 25 is a block diagram showing a configuration of a model learning unit 2-220.
Figure 26:
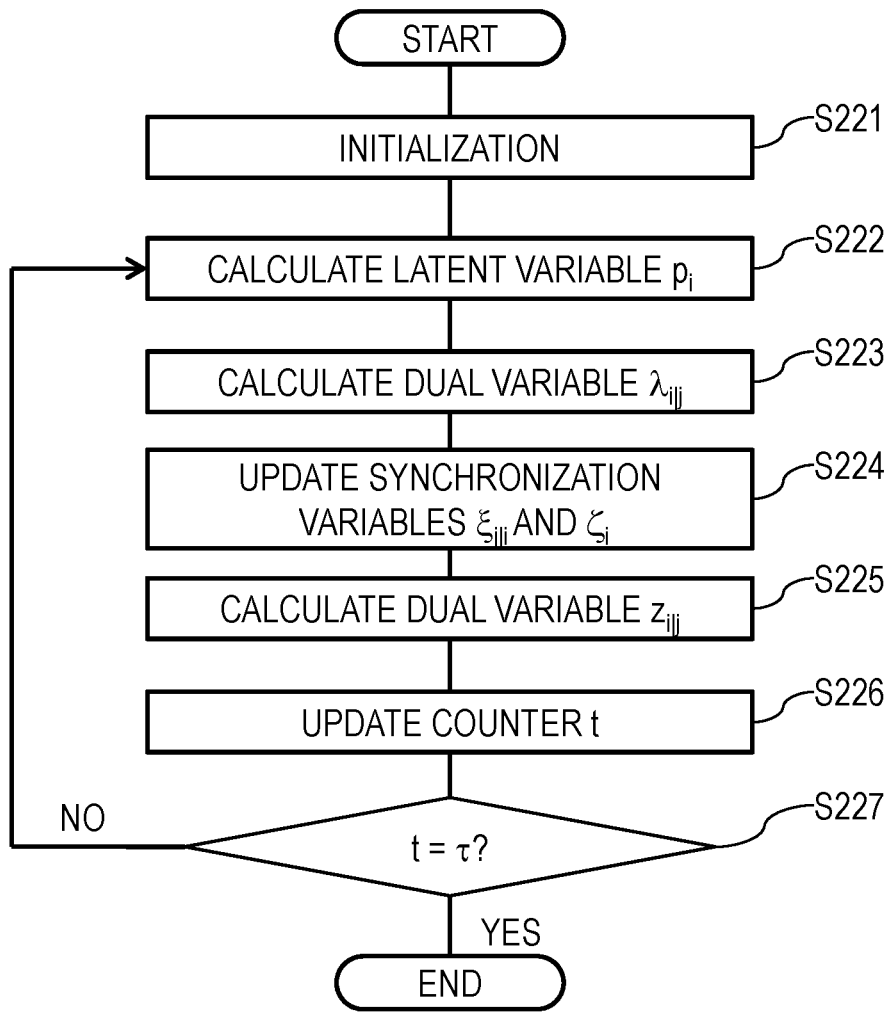
FIG. 26 is a flowchart illustrating operations of the model learning unit 2-220.

Next, referring to FIGS. 25 and 26, the model learning unit 2-220 is described. FIG. 25 is a block diagram showing a configuration of the model learning unit 2-220. FIG. 26 is a flowchart illustrating operations of the model learning unit 2-220. As shown in FIG. 25, the model learning unit 2-220 includes an initialization unit 2-221, a latent variable calculation unit 2-222, a first dual variable calculation unit 2-223, a synchronization variable updating unit 2-224, a second dual variable calculation unit 2-225, a counter updating unit 2-226, and a termination condition determination unit 2-227.

According to FIG. 26, the operation of the model learning unit 2-220 is described. Before proceeding to specific description, description on several symbols is provided. These symbols have been used in the discussion so far; and the following description serves to summarize them.

v={1, . . . , V} represents a set of the indices of the latent variable learning apparatuses 2-200. N(i) represents a set of the indices of the latent variable learning apparatuses 2-200 communicating with the latent variable learning apparatus 2-200$_i$.

For latent variables $p_i$, $p_j$ (where je N(i)), let $\lambda_{i|j} \in R^{p'}$ be a dual variable belonging to the latent variable learning apparatus 2-200 and let $\lambda_{j|i} \in R^{p'}$ be a dual variable belonging to the latent variable learning apparatus 2-200$_j$. Similarly, for the latent variables $p_i$, $p_j$ (where je N(i)), let $z_{i|j} \in R^{p'}$ be a dual variable belonging to the latent variable learning apparatus 2-200$_i$, and let $z_{j|i} \in R^{p'}$ be a dual variable belonging to the latent variable learning apparatus 2-200$_j$.

Let function $F_{1,i}(p_i)$: $R^{p'} \to R$ be a cost function (where $F_{1,i}(p_i)$ is a closed proper convex function) for optimizing the latent variable $p_i$ calculated using the learning data.

Let $A_{i|j} \in R^{p' \times p'}$ be a real number matrix of p'×p' given by the formula below.

$$A_{i|j} = \begin{cases} I & (i > j, \, j \in N(i)) \\ -I & (j > i, \, j \in N(i)) \end{cases}$$

Let a function $D_{i|j}$: $R^{p'} \to R$ (where je N(i)) be a strictly convex function belonging to the latent variable learning apparatus 2-200$_i$.

Let $\xi_{i|j}$ and $\zeta_i$ be variables of the latent variable learning apparatus 2-200$_i$ for storing data transmitted from the latent variable learning apparatus 2-200$_j$ (where je N(i)). $\xi_{i|j}$ and $\zeta_i$ are also called synchronization variables hereinbelow. Let t be a variable for counting the number of times a variable is updated (hereinafter, also called a counter), and let τ (τ is an integer equal to or greater than 1) be a predetermined number of updates. This τ represents the upper limit on the number of repeated calculations at S222 to S225 described later.

In the following description, $S_i$ (i∈v={1, . . . , V}) is assumed to indicate V latent variable learning apparatuses 2-200$_1$, . . . , 2-200$_V$. Therefore, the latent variable learning system 2-20 includes a latent variable learning apparatus $S_i$ (i∈v), and the latent variable learning apparatus $S_i$ (i∈v) uses learning data to learn the latent variable $p_i$ by a predetermined procedure. Referring to FIG. 26, the procedure is described below.

At S221, the initialization unit 2-221 initializes the counter t. Specifically, t=0 holds. The initialization unit 2-221 also calculates setup data. For example, one example is the cost function $F_{1,i}(p_i)$.

At S222, the latent variable calculation unit 2-222 calculates $p_i^{t+1}$, which is the result of the t+1th update of the latent variable $p_i$, from $z_{i|j}^t$, which is the result of the tth update of the dual variable $z_{i|j}$ and from $\zeta_i^t$, which is the result of the tth update of the variable $\zeta_i$, according to the formula below.

$$p_i^{t+1} = \underset{p_i}{\operatorname{argmin}} \left( F_{1,i}(p_i) - \sum_{j \in N(i)} \langle z_{i|j}^t, A_{i|j} p_i \rangle + \frac{1}{2\gamma} \| A_{i|j} P_i + A_{i|j} \zeta_i^t \|_2^2 \right)$$

Note that appropriate initial values have been set in $z_{i|j}^0$ and $\zeta_i^0$. Also, γ(γ>0) is assumed to be a predetermined real number.

At S223, the first dual variable calculation unit 2-223 calculates $\lambda_{i|j}^{t+1}$, which is the result of the t+1th update of the dual variable $\lambda_{i|j}$ (je N(i)) from the $z_{i|j}^t$ used at S222 and the $p_i^{t+1}$ calculated at S222, for je N(i) according to the formula below.

$$\lambda_{i|j}^{t+1} = z_{i|j}^t - 2 H_{D_{i|j}}^{-1}(z_{i|j}^t) A_{i|j} p_i^{t+1}$$

Here, represents the Hessian matrix of the function $D_{i|j}$. That is, $H_{D\_i|j}^{-1}$ is the inverse matrix thereof.

At S224, the synchronization variable updating unit 2-224 uses the communication unit 2-280 to receive values produced by learning of the latent variable learning apparatus $S_j$ (je N(i)) as $\xi_{i|j}^{t+1}$ and $\xi_i^{t+1}$, which are the results of t+1th update of the variables $\xi_{i|j}$, $\xi_i$ (je N(i)), and updates the variables $\xi_{i|j}$, $\zeta_i$ according to the formula below.

$$\xi_{i|j}^{t+1} = \operatorname{Transmit}_{j \to i} \{ H_{D_{j|i}}(z_{j|i}^t) \lambda_{j|i}^{t+1} \}$$

$$\xi_i^{t+1} = \operatorname{Transmit}_{j \to i} \{ p_j^{t+1} \}$$

At S225, the second dual variable calculation unit 2-225 calculates $z_{i|j}^{t+1}$, which is the result of the t+1th update of the dual variable $z_{i|j}$ (je N(i)) for je N(i) according to the formula below.

$$z_{i|j}^{t+1} = \begin{cases} H_{D_{i|j}}^{-1}(z_{i|j}^t) \xi_{i|j}^{t+1} & (6\text{-}1) \\ \alpha H_{D_{i|j}}^{-1}(z_{i|j}^t) \xi_{i|j}^{t+1} + (1-\alpha) z_{i|j}^t & (6\text{-}2) \end{cases}$$

Here, α is a real number satisfying 0<α<1.

Formula (6-1) corresponds to the case of using generalized P-R operator splitting, and Formula (6-2) corresponds to the case of using generalized D-R operator splitting.

At S226, the counter updating unit 2-226 increments the counter t by one. Specifically, t←t+1 holds.

At S227, if the counter t has reached a predetermined number of updates τ (that is, if t=τ, satisfying the termination condition), the termination condition determination unit 2-227 outputs a current value $p_i^\tau$ of the latent variable $p_i$ and ends the processing. Otherwise, it returns to the processing at S222. That is, the model learning unit 2-220 repeats the calculations from S222 to S225. The $z_{ilj}^{t+1}$ calculated at S225 is used at S222 and S223 in the next repeated calculation.

Preferably, the Hessian matrix $H_{D\_ilj}$ is designed using Formula (5-6) to Formula (5-9).

First Modification

The foregoing procedure corresponds to the algorithm of FIG. 15. A procedure corresponding to the algorithm of FIG. 16 is described here. This procedure does not use the variable $\zeta_i$ because it is not necessary to exchange latent variables.

Figure 27:
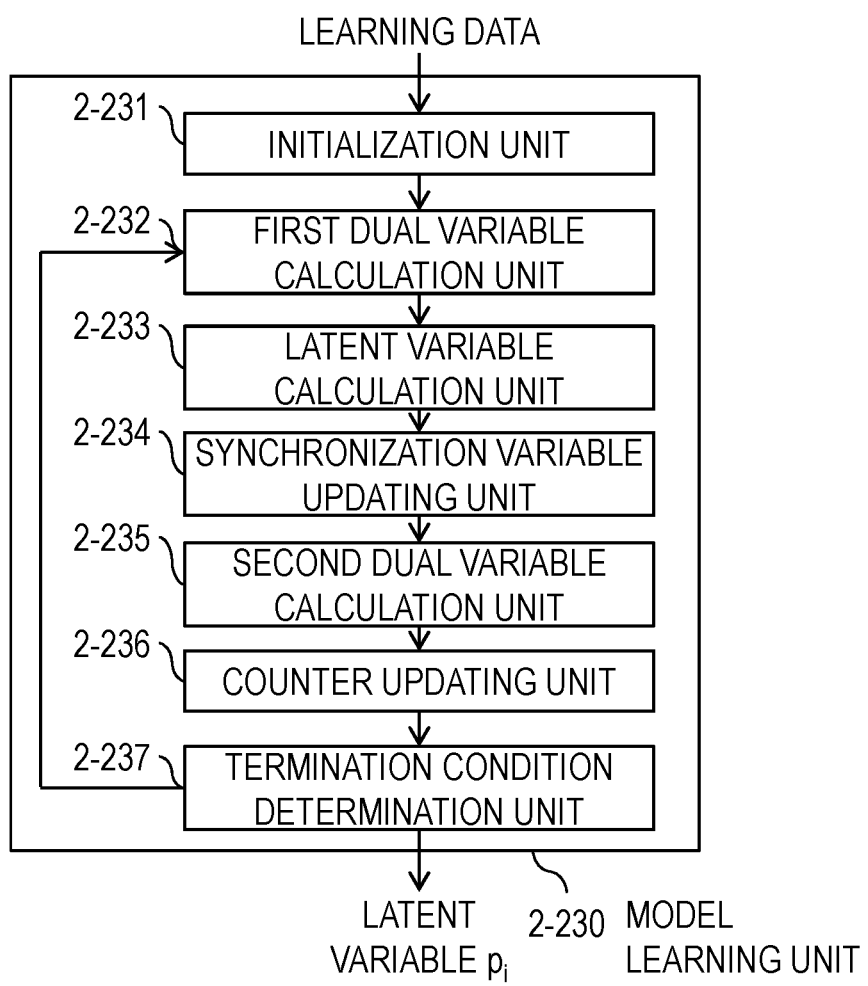
FIG. 27 is a block diagram showing a configuration of a model learning unit 2-230.
Figure 28:
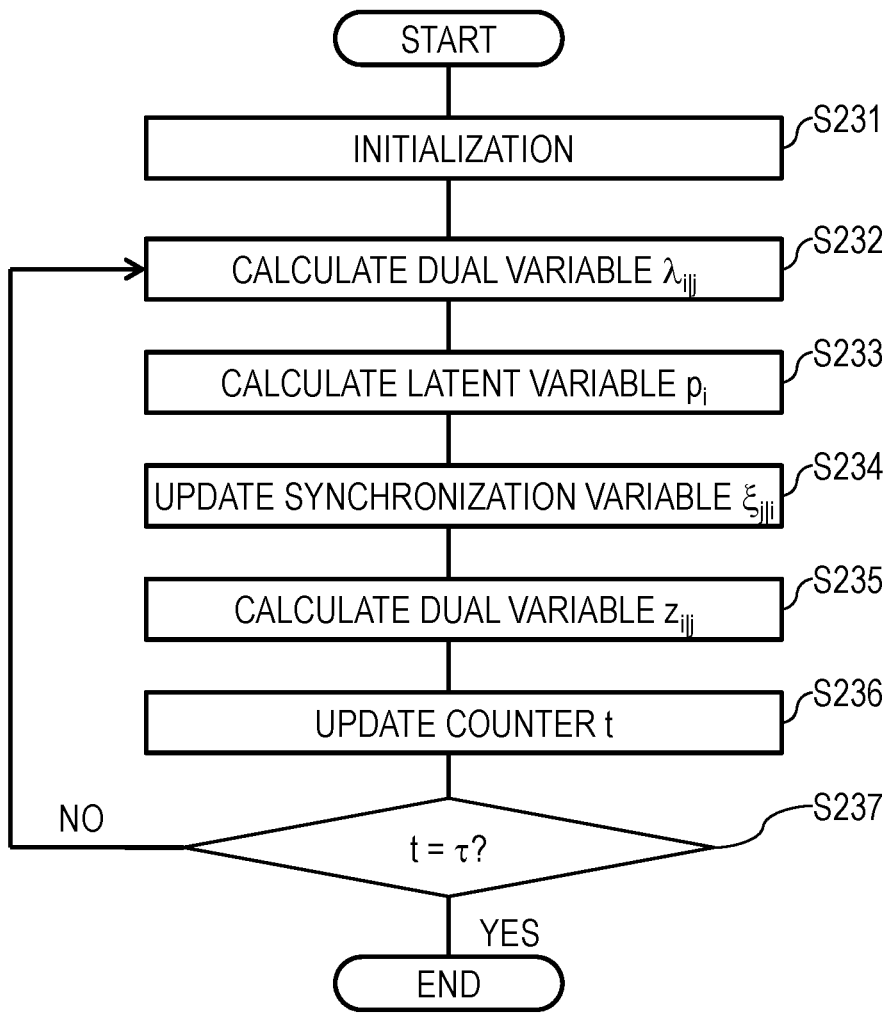
FIG. 28 is a flowchart illustrating operations of the model learning unit 2-230.

The latent variable learning apparatus 2-200 includes a model learning unit 2-230 in place of the model learning unit 2-220, as shown in FIG. 24. Now referring to FIGS. 27 and 28, the model learning unit 2-230 is described. FIG. 27 is a block diagram showing a configuration of the model learning unit 2-230. FIG. 28 is a flowchart illustrating operations of the model learning unit 2-230. As shown in FIG. 27, the model learning unit 2-230 includes an initialization unit 2-231, a first dual variable calculation unit 2-232, a latent variable calculation unit 2-233, a synchronization variable updating unit 2-234, a second dual variable calculation unit 2-235, a counter updating unit 2-236, and a termination condition determination unit 2-237.

According to FIG. 28, the operation of the model learning unit 2-230 is described.

At S231, the initialization unit 2-231 initializes the counter t. Specifically, t=0 holds. The initialization unit 2-231 also calculates setup data.

At S232, the first dual variable calculation unit 2-232 calculates $\lambda_{ilj}^{t+1}$, which is the result of the t+1th update of the dual variable $\lambda_{ilj}$ ($j \in N(i)$), from $z_{ilj}^{t}$, which is the result of the tth update of the dual variable $z_{ilj}$ and from $p_i^t$, which is the result of the tth update of the latent variable $p_i$ for $j \in N(i)$ according to the formula below.

$$\lambda_{ilj}^{t+1} = z_{ilj}^{t} - 2H_{D_{ilj}}^{-1}(z_{ilj}^{t})A_{ilj}^{t} - H_{F_1,i}^{-1}(p_i^t)\partial F_{1,i}(p_i^t)))$$

Note that appropriate initial values have been set in $z_{ilj}^{0}$ and $p_i^{0}$. $H_{D\_ilj}$ represents the Hessian matrix of the function $D_{ilj}$, and $H_{F\_1,i}$ represents the Hessian matrix of the function $F_{1,i}$. That is, $H_{D\_ilj}^{-1}$ and are the inverse matrices of them. $\partial F_{1,i}$ represents the subdifferential of the function $F_{1,i}$.

At S233, the latent variable calculation unit 2-233 calculates $p_i^{t+1}$, which is the result of the t+1th update of the latent variable $p_i$, according to the formula below.

$$p_i^{t+1} = p_i^t - H_{F_1,i}^{-1}(p_i^t)(\partial F_{1,i}(p_i^t) - \Sigma_{j \in N(i)} A_{ilj}^T w_{ilj}^{t+1}$$

Here, $w_{ilj}^t$ represents the result of the tth update of the dual variable $w_{ilj}$.

At S234, the synchronization variable updating unit 2-234 uses the communication unit 2-280 to receive a value produced by learning of the latent variable learning apparatus $S_j$ ($j \in N(i)$) as $\xi_{ilj}^{t+1}$, which is the result of t+1th update of the variable $\xi_{ilj}$ ($j \in N(i)$), and updates the variable $\xi_{ilj}$ according to the formula below.

$$\xi_{ilj}^{t+1} = \text{Transmit}_{j \to i}\{H_{D_{jli}}(z_{jli}^t)\lambda_{jli}^{t+1}\}$$

At S235, the second dual variable calculation unit 2-235 calculates $z_{ilj}^{t+1}$, which is the result of the t+1th update of the dual variable $z_{ilj}$ ($j \in N(i)$) for $j \in N(i)$ according to the formula below.

$$z_{ilj}^{t+1} = \begin{cases} H_{D_{ilj}}^{-1}(z_{ilj}^t)\xi_{ilj}^{t+1} & (6\text{-}1) \\ \alpha H_{D_{ilj}}^{-1}(z_{ilj}^t)\xi_{ilj}^{t+1} + (1-\alpha)z_{ilj}^t & (6\text{-}2) \end{cases}$$

Here, $\alpha$ is a real number satisfying $0 < \alpha < 1$.

Formula (6-1) corresponds to the case of using generalized P-R operator splitting, and Formula (6-2) corresponds to the case of using generalized D-R operator splitting.

At S236, the counter updating unit 2-236 increments the counter t by one. Specifically, $t \leftarrow t+1$ holds.

At S237, if the counter t has reached a predetermined number of updates $\tau$ (that is, if $t=\tau$, satisfying the termination condition), the termination condition determination unit 2-237 outputs a current value $p_i^\tau$ of the latent variable $p_i$ and ends the processing. Otherwise, it returns to the processing at S232. That is, the model learning unit 2-230 repeats the calculations from S232 to S235. The $z_{ilj}^{t+1}$ calculated at S235 is used at S232 and S233 in the next repeated calculation.

Preferably, the Hessian matrix $H_{D\_ilj}$ is designed using Formula (5-6) to Formula (5-9).

The embodiment according to the present invention enables fast learning of latent variables of a model to be subjected to machine learning. The embodiment according to the present invention enables the latent variables to be updated so as to accelerate the convergence to a stationary point (the optimal solution) by configuring the variable update rule based on monotone operator splitting using the Bregman Resolvent operator or the Bregman Cayley operator. Also, by appropriately configuring the convex function for use in the definition of Bregman divergence, it is possible to configure a variable update rule based on monotone operator splitting using the Bregman Resolvent operator or the Bregman Cayley operator such that the convergence to the stationary point is accelerated.

APPENDIX

Each apparatus according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the apparatus executing the processing or any necessity.

As already mentioned, when the processing functions of the hardware entities described in the embodiments (the apparatuses of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A model generation apparatus for generating a plurality of models, wherein
   each one of the plurality of models is a Deep Neural Network (hereinafter referred to as "DNN") including a plurality of layers,
   two or more models of the plurality of models include at least one shared layer for which one or more model variables are equivalent or common, and
   the two or more models of the plurality of models further include at least one unshared layer for which the model variables are not equivalent nor common; and
   the model generation apparatus comprising a processor configured to execute operations comprising:
   updating the model variables in the shared layer by exchanging values of auxiliary variables between corresponding layers of the plurality of models,
      wherein the auxiliary variables are distinct from the model variables and are used as an adjunct to update the model variables,
      the exchanging of the values of the auxiliary variables causes optimizing values of the model variables between corresponding layers of the plurality of models, and
      the plurality of models are a solution of an optimization problem using a proxy convex cost function that is equivalent to an original optimization problem using a non-convex cost function, and the proxy convex cost function represents an upper bound of the non-convex cost function, wherein the optimization problem using the proxy convex cost function $G_i$ as represented in the following:

$$\min_{w_{i,j,k}} \max_{\lambda_{i|n,j,k}} L_G(w_{i,j,k}, \lambda_{i|n,j,k})$$

$$\forall i \in \bar{I}, \forall j \in J(i), \forall k \in \bar{K}(i,j), \forall n \in \bar{N}(i,j)$$

$$L_G(w_{i,j,k}, \lambda_{i|n,j,k}) =$$

$$\sum_{i \in \bar{I}} G_i(w_{i,j,k}) + \sum_{j \in J(i)} \sum_{k \in \bar{K}(i,j)} \sum_{n \in \bar{N}(i,j)} \lambda_{i|n,j,k}^T (A_{i|n,j} w_{i,j,k} + A_{n|i,j} w_{n,j,k}).$$

wherein W represents the model variables, λ is a dual variable comprising the auxiliary variables, A is a matrix representing consensus parameters, T represents transposition, Ĩ is a set of indices of the plurality of models, Ĩ(i) is a set of indices representing layers constituting model i, K̃(i,j) is a set of indices representing nodes in a jth layer of the model i, and Ñ(i,j) is a set of the indices of models that have constraint relationship with the jth layer of the model i.

2. The model generation apparatus according to claim 1, wherein the shared layer is an input layer or a plurality of consecutive layers including the input layer.

3. The model generation apparatus according to claim 2, wherein the plurality of models are DNNs respectively performing a same task and having distinct numbers of layers from each other.

4. The model generation apparatus according to claim 2, wherein the plurality of models are DNNs respectively performing distinct tasks from each other.

5. The model generation apparatus according to claim 2, wherein one same layer is used in common among the plurality of models as the shared layer.

6. The model generation apparatus according to claim 1, wherein the plurality of models are DNNs respectively performing a same task; and having distinct numbers of layers from each other.

7. The model generation apparatus according to claim 1, wherein the plurality of models are DNNs respectively performing distinct tasks from each other.

8. The model generation apparatus according to claim 1, wherein one same layer is used in common among the plurality of models as the shared layer.

9. A non-transitory computer-readable storage medium which stores a program for causing a computer to function as the model generation apparatus according to claim 1.

10. A computer implemented method for generating a plurality of models, wherein
each one of the plurality of models is a Deep Neural Network (hereinafter referred to as "DNN") including a plurality of layers,
two or more models of the plurality of models include at least one shared layer for which one or more model variables are equivalent or common, and
the two or more models of the plurality of models further include at least one unshared layer for which the model variables are not equivalent nor-common; and
the computer implemented method comprising:
updating the model variables in the shared layer by exchanging values of auxiliary variables between corresponding layers of the plurality of models,
wherein the auxiliary variables are distinct from the model variables and are used as an adjunct to update the model variables,
the exchanging of the values of the auxiliary variables causes optimizing values of the model variables between corresponding layers of the plurality of models, and
the plurality of models are a solution of an optimization problem using a proxy convex cost function that is equivalent to an original optimization problem using a non-convex cost function, and the proxy convex cost function represents an upper bound of the non-convex cost function, wherein the optimization problem using the proxy convex cost function $G_i$ as represented in the following:

$$\min_{w_{i,j,k}} \max_{\lambda_{i|n,j,k}} L_G(w_{i,j,k}, \lambda_{i|n,j,k})$$

$$\forall i \in \tilde{I}, \forall j \in \tilde{J}(i), \forall k \in \tilde{K}(i, j), \forall n \in \tilde{N}(i, j)$$

$$L_G(w_{i,j,k}, \lambda_{i|n,j,k}) =$$

$$\sum_{i \in \tilde{I}} G_i(w_{i,j,k}) + \sum_{j \in \tilde{J}(i)} \sum_{k \in \tilde{K}(i,j)} \sum_{n \in \tilde{N}(i,j)} \lambda^T_{i|n,j,k}(A_{i|n,j} w_{i,j,k} + A_{n|i,j} w_{n,j,k}).$$

wherein W represents the model variables, λ is a dual variable comprising the auxiliary variables, A is a matrix representing consensus parameters, T represents transposition, Ĩ is a set of indices of the plurality of models, Ĩ(i) is a set of indices representing layers constituting model i, K̃(i,j) is a set of indices representing nodes in a ith layer of the model i, and Ñ(i,j) is a set of the indices of models that have constraint relationship with the jth layer of the model i.

* * * * *

UNITED STATES PATENT AND TRADEMARK OFFICE
CERTIFICATE OF CORRECTION

| | | |
|---|---|---|
| PATENT NO. | : 12,450,465 B2 | Page 1 of 2 |
| APPLICATION NO. | : 17/046292 | |
| DATED | : October 21, 2025 | |
| INVENTOR(S) | : Kenta Niwa et al. | |

It is certified that error appears in the above-identified patent and that said Letters Patent is hereby corrected as shown below:

In the Claims

In Column 50, Line 66 in Claim 1, the text reading:
- wherein W represents the model variables -
Should read:
-- wherein w represents the model variables --

In Column 51, Line 3 in Claim 1, the text reading:
- $\tilde{I}$ (i) is a set of indices -
Should read:
-- $\tilde{J}$ (i) is a set of indices --

In Column 51, Line 24 in Claim 6, the text reading:
- performing a same task; -
Should read:
-- performing a same task --

In Column 52, Line 33 in Claim 10, the text reading:
- wherein W represents the model variables -
Should read:
-- wherein w represents the model variables --

In Column 52, Line 37 in Claim 10, the text reading:
- $\tilde{I}$ (i) is a set of indices representing -
Should read:
-- $\tilde{J}$ (i) is a set of indices representing --

Signed and Sealed this
Thirtieth Day of December, 2025

John A. Squires
*Director of the United States Patent and Trademark Office*

CERTIFICATE OF CORRECTION (continued)
U.S. Pat. No. 12,450,465 B2

In Column 52, Line 39 in Claim 10, the text reading:
    - nodes in a ith layer of the model i -
    Should read:
    -- nodes in a jth layer of the model i --